(12) United States Patent
Morii et al.

(10) Patent No.: US 11,740,072 B2
(45) Date of Patent: Aug. 29, 2023

(54) INNER SURFACE SHAPE MEASUREMENT DEVICE, AND ALIGNMENT METHOD AND MAGNIFICATION CALIBRATION METHOD FOR INNER SURFACE SHAPE MEASUREMENT DEVICE

(71) Applicant: Tokyo Seimitsu Co., Ltd., Tokyo (JP)

(72) Inventors: Hideki Morii, Tsuchiura (JP); Katsufumi Moriyama, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 17/939,080

(22) Filed: Sep. 7, 2022

(65) Prior Publication Data

US 2023/0003510 A1 Jan. 5, 2023

Related U.S. Application Data

(63) Continuation of application No. PCT/JP2021/008942, filed on Mar. 8, 2021.

(30) Foreign Application Priority Data

| Mar. 17, 2020 | (JP) | 2020-046501 |
| Mar. 17, 2020 | (JP) | 2020-046503 |
| Jan. 13, 2021 | (JP) | 2021-003450 |

(51) Int. Cl.
    *G01B 11/12* (2006.01)
    *G01B 11/00* (2006.01)
    (Continued)

(52) U.S. Cl.
    CPC .............. *G01B 11/12* (2013.01); *G01B 5/201* (2013.01); *G01B 11/002* (2013.01); *G01B 21/042* (2013.01)

(58) Field of Classification Search
    CPC .... G01B 11/2408; G01B 11/002; G01B 11/12
    See application file for complete search history.

(56) References Cited

U.S. PATENT DOCUMENTS

| 5,134,781 A * | 8/1992 | Baker | .................. G01B 21/042 |
| | | | 73/1.79 |
| 6,519,860 B1 * | 2/2003 | Bieg | ........................ B23H 7/26 |
| | | | 73/1.79 |

(Continued)

FOREIGN PATENT DOCUMENTS

| JP | 10-339623 A | 12/1998 |
| JP | 2006-145344 A | 6/2006 |

(Continued)

OTHER PUBLICATIONS

International Preliminary Report on Patentability, issued in PCT/JP2021/008942, PCT/IPEA/409, dated Apr. 19, 2022.

(Continued)

*Primary Examiner* — Michael P LaPage
(74) *Attorney, Agent, or Firm* — Birch, Stewart, Kolasch & Birch, LLP

(57) ABSTRACT

The inner surface shape measurement device, which measures an inner surface shape of a small hole formed in a workpiece, includes: a rotating body for rotating the workpiece around a rotation axis, and a linear-and-tilting-motion stage; an elongated probe capable of being inserted into the small hole of the workpiece; a probe linear-and-tilting-motion mechanism capable of adjusting posture of the probe; a camera, configured to be rotatable integrally with the rotating body, for imaging the probe from at least three circumferential positions on a rotation trajectory centered on a rotation axis; and a controller for adjusting the posture of the probe using the probe linear-and-tilting-motion mechanism based on an image taken by the camera at each of the circumferential positions.

20 Claims, 48 Drawing Sheets

(51) Int. Cl.
*G01B 21/04* (2006.01)
*G01B 5/20* (2006.01)

(56) References Cited

U.S. PATENT DOCUMENTS

| | | |
|---|---|---|
| 2006/0101660 A1 | 5/2006 | Takanashi |
| 2016/0370172 A1 | 12/2016 | Christoph et al. |
| 2017/0003113 A1 | 1/2017 | Pettersson et al. |
| 2017/0191822 A1 | 7/2017 | Becker et al. |
| 2017/0248411 A1* | 8/2017 | Yamazaki ............... G01B 11/30 |
| 2017/0312875 A1* | 11/2017 | Kunihiro ................ B25J 11/005 |
| 2018/0018778 A1 | 1/2018 | Haverkamp et al. |
| 2018/0096485 A1 | 4/2018 | Held |
| 2018/0106595 A1 | 4/2018 | Christoph et al. |
| 2019/0368855 A1 | 12/2019 | Morii |

FOREIGN PATENT DOCUMENTS

| | | |
|---|---|---|
| JP | 2008-292359 A | 12/2008 |
| JP | 2011-174779 A | 9/2011 |
| JP | 2018-84488 A | 5/2018 |
| JP | 2018-163093 A | 10/2018 |
| WO | WO 2016/084638 A1 | 6/2016 |

OTHER PUBLICATIONS

International Search Report, issued in PCT/JP2021/008942, PCT/ISA/210, dated May 25, 2021.
International Search Report, issued in PCT/JP2021/008943, PCT/ISA/210, dated May 25, 2021.
Written Opinion of the International Preliminary Examining Authority, PCT/IPEA/408, issued in PCT/JP2021/008942, dated Dec. 21, 2021.
Written Opinion of the International Searching Authority, issued in PCT/JP2021/008942, PCT/ISA/237, dated May 25, 2021.
Written Opinion of the International Searching Authority, issued in PCT/JP2021/008943, PCT/ISA/237, dated May 25, 2021.
U.S. Office Action for U.S. Appl. No. 17/939,226, dated Dec. 20, 2022 (Non-Final Office Action).
U.S. Notice of Allowance for U.S. Appl. No. 17/939,226, dated Apr. 5, 2023.

* cited by examiner

FIG.7
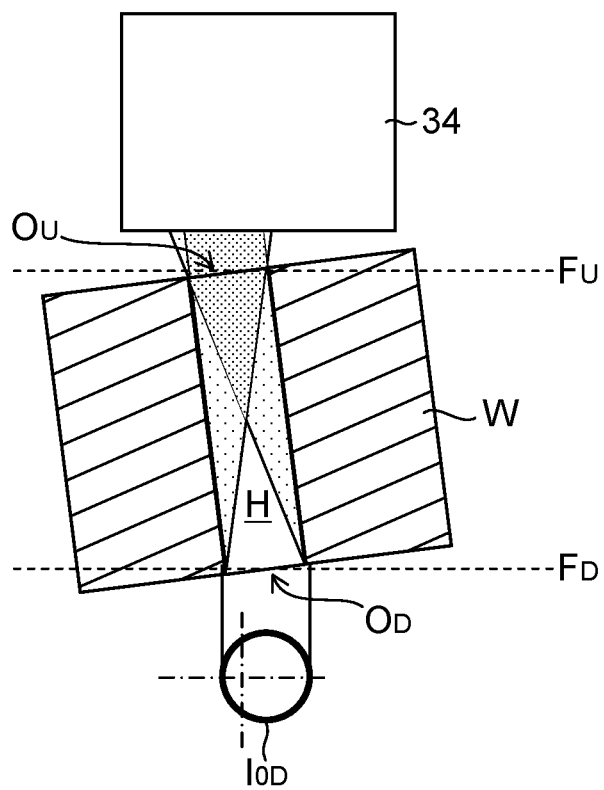
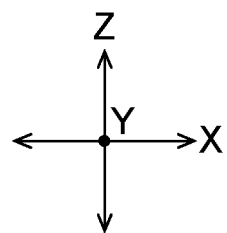

FIG.14
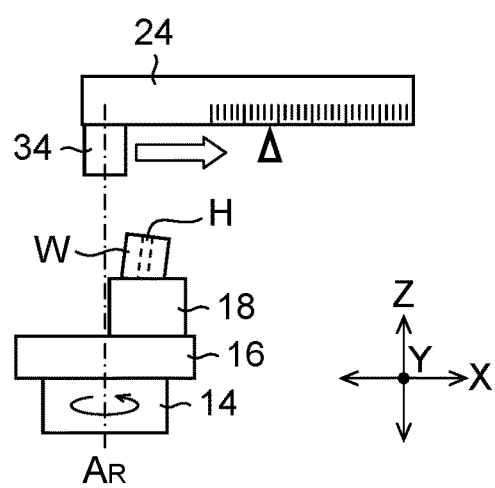
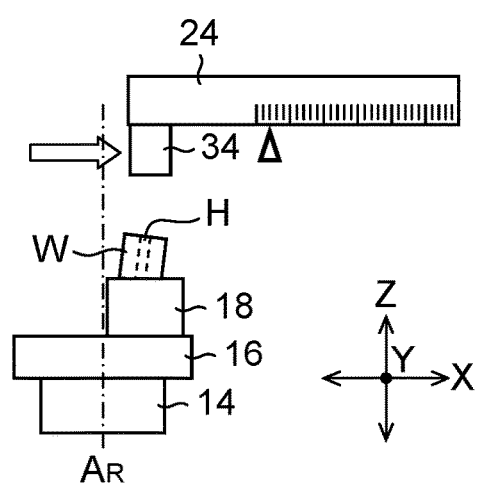
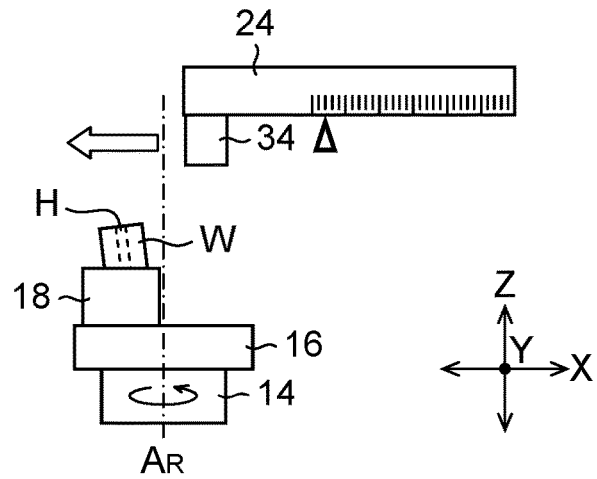
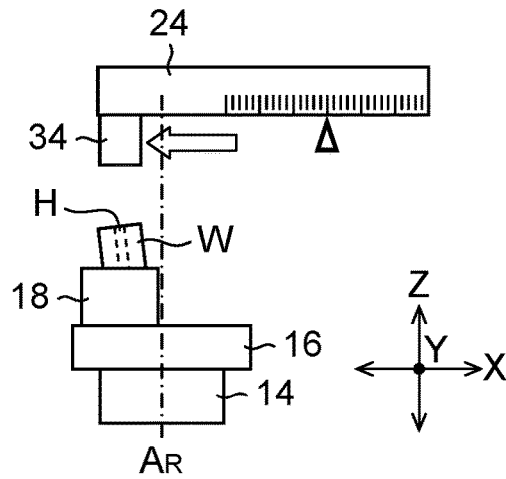

FIG.20
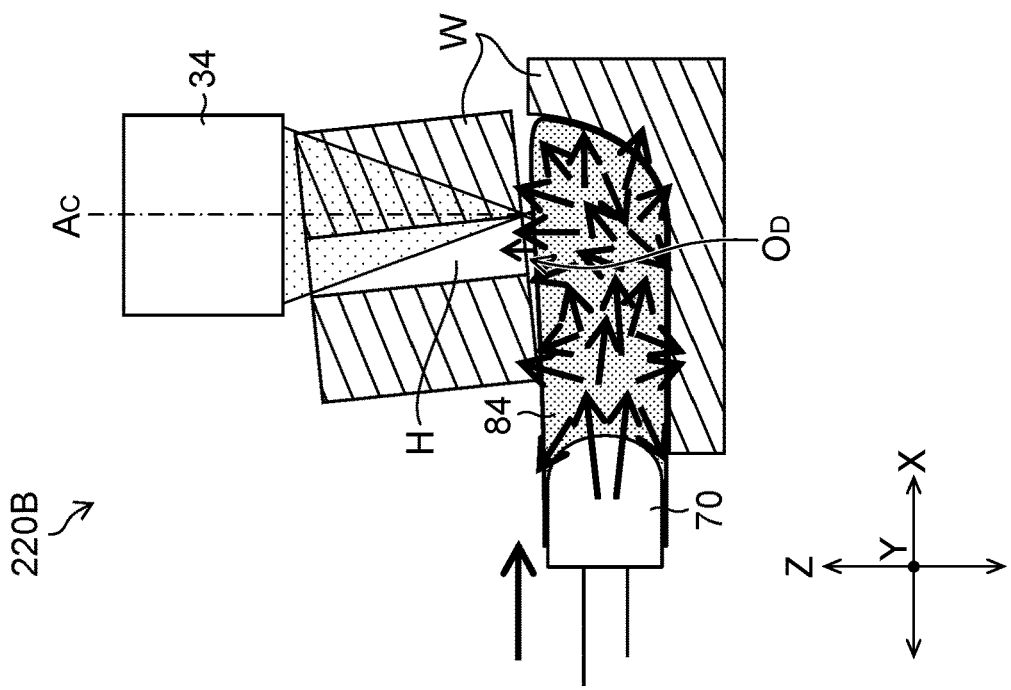
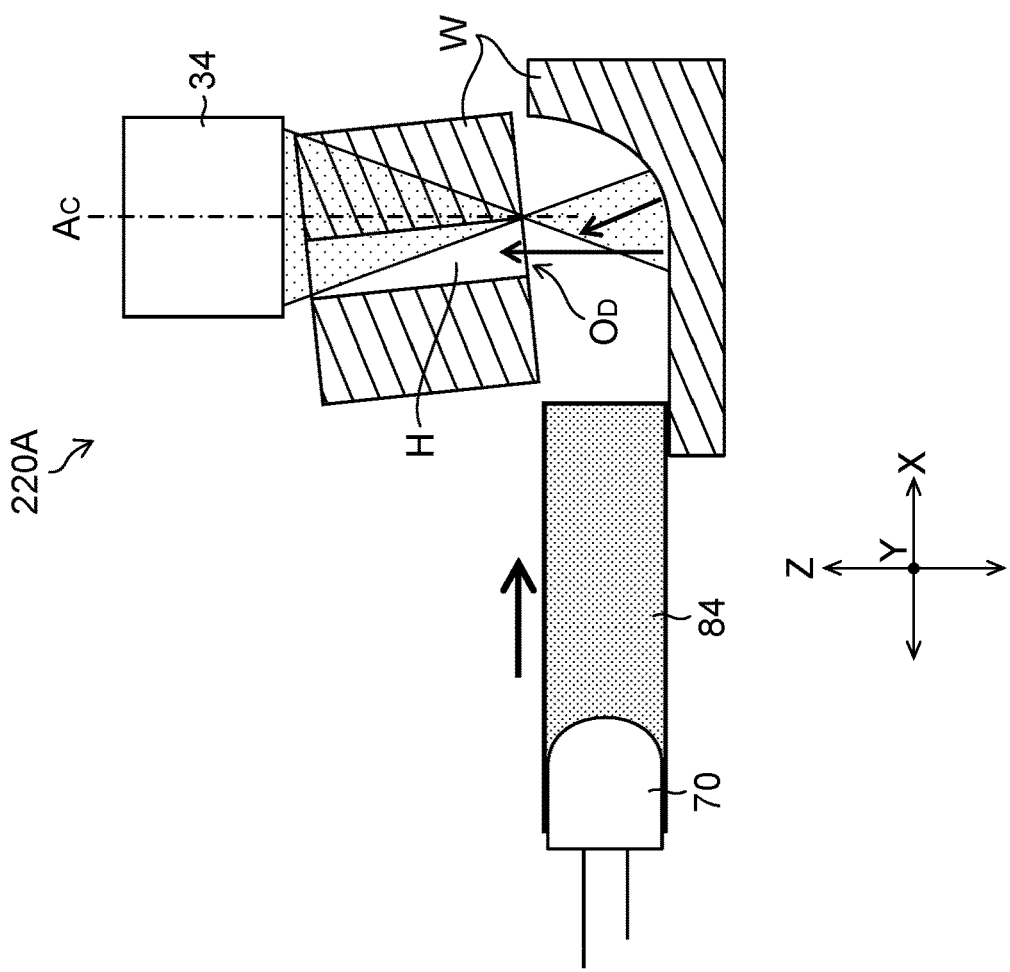

FIG.25
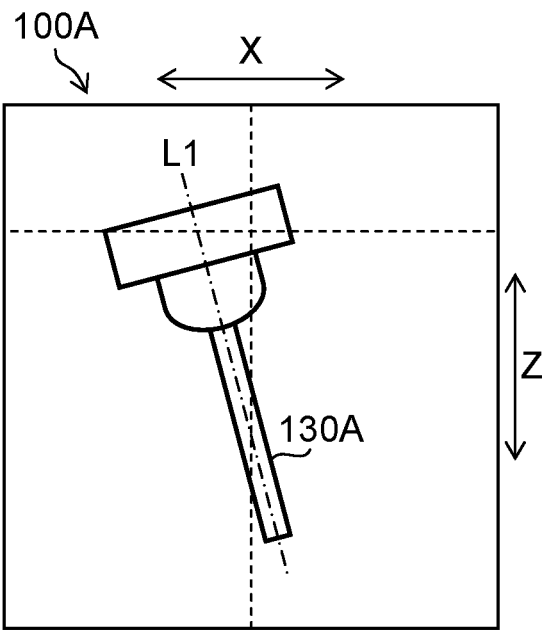
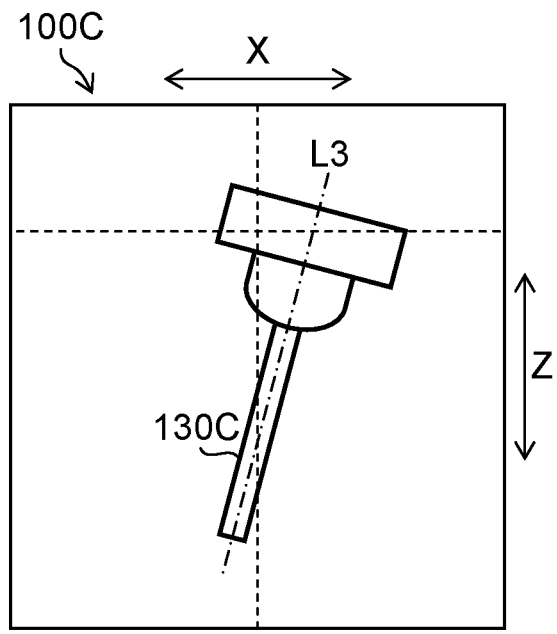
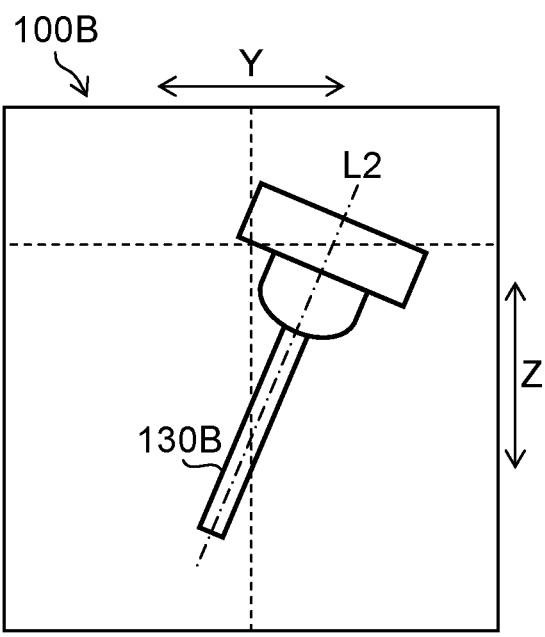
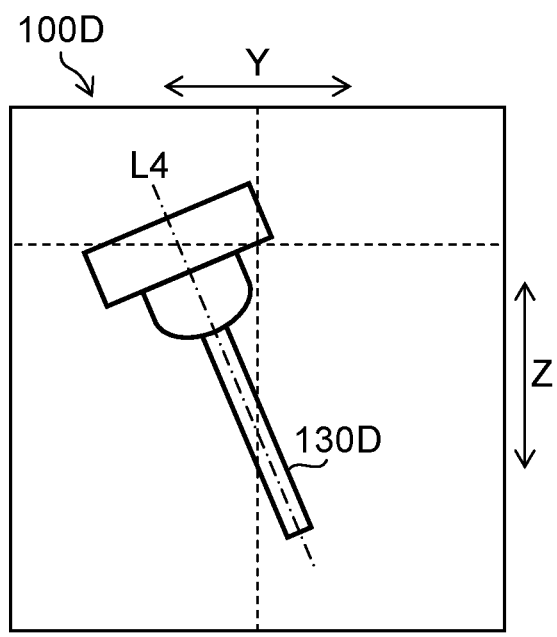

FIG.39
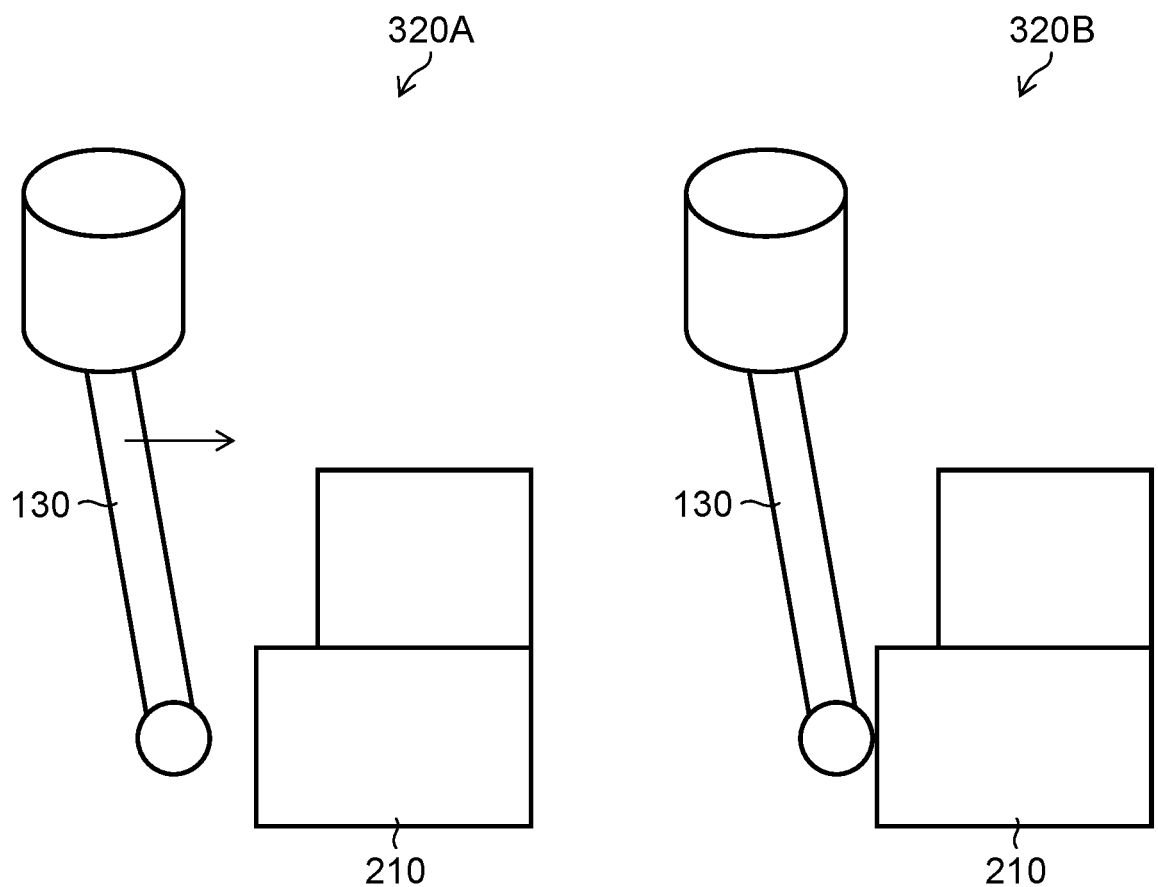
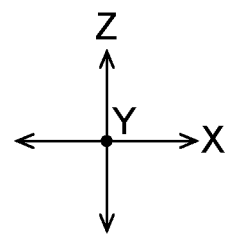

INNER SURFACE SHAPE MEASUREMENT DEVICE, AND ALIGNMENT METHOD AND MAGNIFICATION CALIBRATION METHOD FOR INNER SURFACE SHAPE MEASUREMENT DEVICE

CROSS-REFERENCE TO RELATED APPLICATIONS

The present application is a Continuation of PCT International Application No. PCT/JP2021/008942 filed on Mar. 8, 2021 claiming priority under 35 U.S.C § 119(a) to Japanese Patent Application No. 2020-046501 filed on Mar. 17, 2020, Japanese Patent Application No. 2020-046503 filed on Mar. 17, 2020 and Japanese Patent Application No. 2021-003450 filed on Jan. 13, 2021. Each of the above applications is hereby expressly incorporated by reference, in their entirety, into the present application.

BACKGROUND OF THE INVENTION

1. Field of the Invention

The present invention relates to a technique for measuring an inner surface shape of a small hole formed in a workpiece.

2. Description of the Related Art

Conventionally, there has been known a shape measurement device that relatively rotates a probe of a detector and a workpiece around a rotation axis and thereby measures an inner surface shape (roundness, etc.) of a cylindrical workpiece (for example, see Patent Literature 1). To measure the inner surface shape of the workpiece using such a shape measurement device, it is necessary to align the rotation axis and a central axis of the workpiece.

Patent Literature 1 discloses a technique for bringing a probe (contactor) of a detector into contact with an inner peripheral surface of a cylindrical workpiece placed on a rotating table, and thereby measuring an inner surface shape of the inner peripheral surface of the workpiece. In the technique described in Patent Literature 1, to align a rotation axis and a central axis of the workpiece, the probe of the detector is brought into contact with an outer peripheral surface of the workpiece in advance, runout of the workpiece is observed at a low magnification with the rotating table rotating, and the placement position of the workpiece is adjusted so that the runout decreases.

Patent Literature 1: Japanese Patent Application Laid-Open No. 2006-145344

SUMMARY OF THE INVENTION

In measuring the inner surface shape of a small hole in a workpiece using a shape measurement device as described above, relative position adjustment between the probe and the rotation axis (probe alignment) is important. Specifically, if the rotation axis and the central axis of the workpiece are aligned as in Patent Literature 1 described above, there is a problem in which any relative positional deviation between the probe and the rotation axis may cause the probe to collide with a part other than the small hole of the workpiece when the probe is inserted into the small hole.

Such a problem can be solved by a worker inserting the probe into the small hole of the workpiece while checking with an observation microscope, but the skill of the worker is required. In this case, automation is difficult, and an operation error may cause the probe to collide with a part other than the small hole of the workpiece.

The present invention has been made in view of such circumstances, and an object of the present invention is to provide an inner surface shape measurement device capable of accurately and easily aligning a probe, and an alignment method for the inner surface shape measurement device.

Further, such a shape measurement device is required to perform a work of magnification calibration for the probe to associate an output signal from the probe with an actual calibrated displacement amount. Typically, magnification calibration uses a calibration instrument such as a block gauge or a flick master, but there is a concern in which a collision of the probe with the calibration instrument may damage the probe. The problem is more serious especially when the minimum working distance between the probe and the workpiece is small and the measurement range is small. Against this, there may be a countermeasure such that the operator operates it while visually checking the vicinity of the probe end position with a microscope or the like to avoid the collision. However, in that case, skill is required for the operator, and any human error may damage the probe.

The present invention has been made in view of such circumstances, and another object of the present invention is to provide a magnification calibration method for an inner surface shape measurement device and an inner surface shape measurement device capable of easily and reliably performing magnification calibration of a probe without depending on skill of an operator.

The inventions below are provided to achieve the above object.

An inner surface shape measurement device according to a first aspect of the present invention is an inner surface shape measurement device for measuring an inner surface shape of a small hole formed in a workpiece, and includes: a workpiece rotation unit configured to rotate the workpiece around a rotation axis; a probe, having an elongated shape that can be inserted into the small hole of the workpiece, the probe configured to detect the inner surface shape of the small hole; an adjustment unit capable of adjusting posture of the probe; an acquisition unit configured to be rotatable integrally with the workpiece rotation unit, the acquisition unit configured to acquire probe posture information from at least three circumferential positions on a rotation trajectory centered on the rotation axis; and a controller configured to adjust posture of the probe, using the adjustment unit, based on the probe posture information acquired by the acquisition unit.

The inner surface shape measurement device according to a second aspect of the present invention is configured according to the first aspect in which the controller adjusts posture of the probe using the adjustment unit so as to eliminate a relative deviation between the probe and the rotation axis.

The inner surface shape measurement device according to a third aspect of the present invention is configured according to the first aspect or the second aspect in which the acquisition unit acquires the probe posture information from four circumferential positions spaced apart from each other by 90 degrees on the rotation trajectory.

The inner surface shape measurement device according to a fourth aspect of the present invention is configured according to any one of the first aspect to the third aspect in which the acquisition unit includes a camera configured to image the probe.

The inner surface shape measurement device according to a fifth aspect of the present invention is configured according to the fourth aspect, and further includes a surface-emitting lighting unit, the surface-emitting lighting unit being configured to be rotatable integrally with the workpiece rotation unit and being capable of surface emission from a position facing the camera toward the probe.

An alignment method for an inner surface shape measurement device according to a sixth aspect of the present invention is an alignment method for an inner surface shape measurement device for measuring an inner surface shape of a small hole formed in a workpiece, in which the inner surface shape measurement device has: a workpiece rotation unit configured to rotate the workpiece around a rotation axis; a probe, having an elongated shape that can be inserted into the small hole of the workpiece, the configured to detect the inner surface shape of the small hole. The alignment method includes: an acquisition step of acquiring probe posture information from at least three circumferential positions on a rotation trajectory centered on the rotation axis; and an adjustment step of adjusting posture of the probe, based on the probe posture information acquired in the acquisition step, so that the probe is coaxial with the rotation axis.

The alignment method for the inner surface shape measurement device according to a seventh aspect of the present invention is configured according to the sixth aspect in which, in the acquisition step, the probe posture information is acquired from four circumferential positions spaced apart from each other by 90 degrees on the rotation trajectory.

A magnification calibration method for an inner surface shape measurement device according to a eighth aspect of the present invention is a magnification calibration method for an inner surface shape measurement device for measuring an inner surface shape of a small hole formed in a workpiece, in which the inner surface shape measurement device includes: a workpiece rotation unit configured to rotate the workpiece around a rotation axis parallel to a first direction; and a probe, having an elongated shape that can be inserted into the small hole, the probe configured to detect the inner surface shape of the small hole. The magnification calibration method includes: a standard rotation step of rotating a calibration standard around the rotation axis using the workpiece rotation unit, the calibration standard including a cylindrical surface with a first radius on a side surface, the calibration standard including a flat surface parallel to an axis of the cylindrical surface, the calibration standard including a calibration small hole on a first end surface orthogonal to the axis of the cylindrical surface, the flat surface having a distance from the axis of the cylindrical surface, the distance being smaller than the first radius, the calibration small hole being coaxial with the cylindrical surface; a standard posture information acquisition step of observing at least one position of the calibration small hole of the calibration standard, using a first camera, and acquiring posture information of the calibration standard, the calibration standard having been rotated in the standard rotation step, the first camera having an optical axis parallel to the first direction; a standard posture control step of aligning an axis of the calibration small hole with the rotation axis, based on the posture information of the calibration standard acquired in the standard posture information acquisition step; a probe posture information acquisition step of acquiring probe posture information indicating a relative position of an axis of the probe with respect to the rotation axis; a probe posture control step of aligning the axis of the probe with the rotation axis, based on the probe posture information acquired in the probe posture information acquisition step; a probe moving step of moving the probe based on the first radius, in a second direction, the axis of the probe having been aligned with the rotation axis in the probe posture control step; and a standard detection step of rotating the calibration standard using the workpiece rotation unit, and detecting the cylindrical surface and the flat surface using the probe moved in the probe moving step, the axis of the small hole of the calibration standard having been aligned with the rotation axis in the standard posture control step.

The magnification calibration method for the inner surface shape measurement device according to a ninth aspect of the present invention is configured such that the probe is a non-contact probe having a second radius in the second direction, and, in the probe moving step, the probe is moved from a position of the rotation axis to a position apart in the second direction by a sum of the first radius, the second radius, and a working distance of the probe.

The magnification calibration method for the inner surface shape measurement device according to a tenth aspect of the present invention is configured such that the standard posture information acquisition step includes: an observation control step of observing, using the first camera, a first position and a second position of the calibration small hole of the calibration standard at a first rotation angle of the workpiece rotation unit, and the first position and the second position of the calibration small hole of the calibration standard at a second rotation angle of the workpiece rotation unit, the second position being a position different from the first position in the first direction, the second rotation angle being an angle different from the first rotation angle; a position-and-tilt calculation step of calculating a position and a tilt of the calibration small hole from coordinates of the observed first position and the observed second position of the calibration small hole at the first rotation angle of the workpiece rotation unit, and from coordinates of the observed first position and the observed second position of the calibration small hole at the second rotation angle of the workpiece rotation unit; and an output step of outputting small hole information as posture information of the calibration standard, the small hole information including the calculated position and tilt of the small hole.

The magnification calibration method for the inner surface shape measurement device according to an eleventh aspect of the present invention is configured such that the standard detection step detects positions on the side surface between the first position and the second position in the first direction, using the probe.

The magnification calibration method for the inner surface shape measurement device according to a twelfth aspect of the present invention is configured such that a probe posture information acquisition unit that is rotatable integrally with the workpiece rotation unit acquires the probe posture information from at least three circumferential positions on a rotation trajectory centered on the rotation axis, in the probe posture information acquisition step.

The magnification calibration method for the inner surface shape measurement device according to a thirteenth aspect of the present invention is configured such that, in the probe posture information acquisition step, the probe posture information is acquired from four circumferential positions spaced apart from each other by 90 degrees on the rotation trajectory.

The magnification calibration method for the inner surface shape measurement device according to a fourteenth aspect of the present invention is configured such that the probe posture information acquisition unit includes a second camera configured to image the probe.

The magnification calibration method for an inner surface shape measurement device according to a fifteenth aspect of the present invention is configured such that the calibration standard includes a light guide hole in a second end surface, the light guide hole being coaxial with the cylindrical surface and communicating with the calibration small hole, the second end surface being different from the first end surface and being orthogonal to the axis of the cylindrical surface.

The magnification calibration method for an inner surface shape measurement device according to a sixteenth aspect of the present invention is configured such that the standard posture control step includes an incident step of causing light emitted from a light source to be incident on the light guide hole.

An inner surface shape measurement device according to a seventeenth aspect of the present invention is an inner surface shape measurement device for measuring an inner surface shape of a small hole formed in a workpiece, and includes: a workpiece rotation unit configured to rotate a workpiece, in which a small hole is formed, around a rotation axis parallel to a first direction; a workpiece adjustment unit capable of adjusting posture of the workpiece; a probe, having an elongated shape that can be inserted into the small hole, the probe configured to detect the inner surface shape of the small hole; a probe adjustment unit capable of adjusting posture of the probe; a probe moving unit capable of moving the probe in the first direction and a second direction orthogonal to the first direction; a standard rotation controller configured to rotate a calibration standard around the rotation axis using the workpiece rotation unit, the calibration standard including a cylindrical surface with a first radius on a side surface, the calibration standard including a flat surface parallel to an axis of the cylindrical surface, the calibration standard including a calibration small hole on a first end surface orthogonal to the axis of the cylindrical surface, the flat surface having a distance from the axis of the cylindrical surface, the distance being smaller than the first radius, the calibration small hole being coaxial with the cylindrical surface; a standard posture information acquisition unit configured to observe at least one position of the calibration small hole of the rotated calibration standard, using a first camera, and acquire posture information of the calibration standard, the first camera having an optical axis parallel to the first direction; a standard posture controller configured to align an axis of the calibration small hole with the rotation axis using the workpiece adjustment unit, based on the acquired posture information of the calibration standard; a probe posture information acquisition unit configured to acquire probe posture information; a probe posture controller configured to align the axis of the probe with the rotation axis using the probe adjustment unit, based on the acquired probe posture information; a probe movement controller configured to move the probe based on the first radius, in the second direction, using the probe moving unit, the axis of the probe having been aligned with the rotation axis; and a standard detection controller configured to rotate the calibration standard using the workpiece rotation unit, and detect the cylindrical surface and the flat surface using the moved probe, the axis of the small hole of the calibration standard having been aligned with the rotation axis.

According to the present invention, probe alignment can be performed accurately and easily.

Further, according to the present invention, magnification calibration of the probe can be easily and reliably performed without depending on the skill of the operator.

BRIEF DESCRIPTION OF THE DRAWINGS

FIG. 7 is a schematic diagram illustrating observation of a lower opening of the small hole using the camera;

FIG. 14 is a schematic diagram illustrating observation of the small hole using the camera when a position of the small hole of the workpiece is largely deviated from the rotation axis;

FIG. 20 is a diagram illustrating insertion of a scatterer into the lower opening side of the small hole in the workpiece;

FIG. 25 is an explanatory diagram illustrating an example of images taken by the camera at imaging positions;

FIG. 39 is a schematic diagram illustrating states of an auto-stop function of the probe;

DESCRIPTION OF THE EMBODIMENTS

The following describes preferred embodiments of the present invention in detail with reference to the accompanying drawings.

First Embodiment

<Configuration of Inner Surface Shape Measurement Device>

Figure 1:
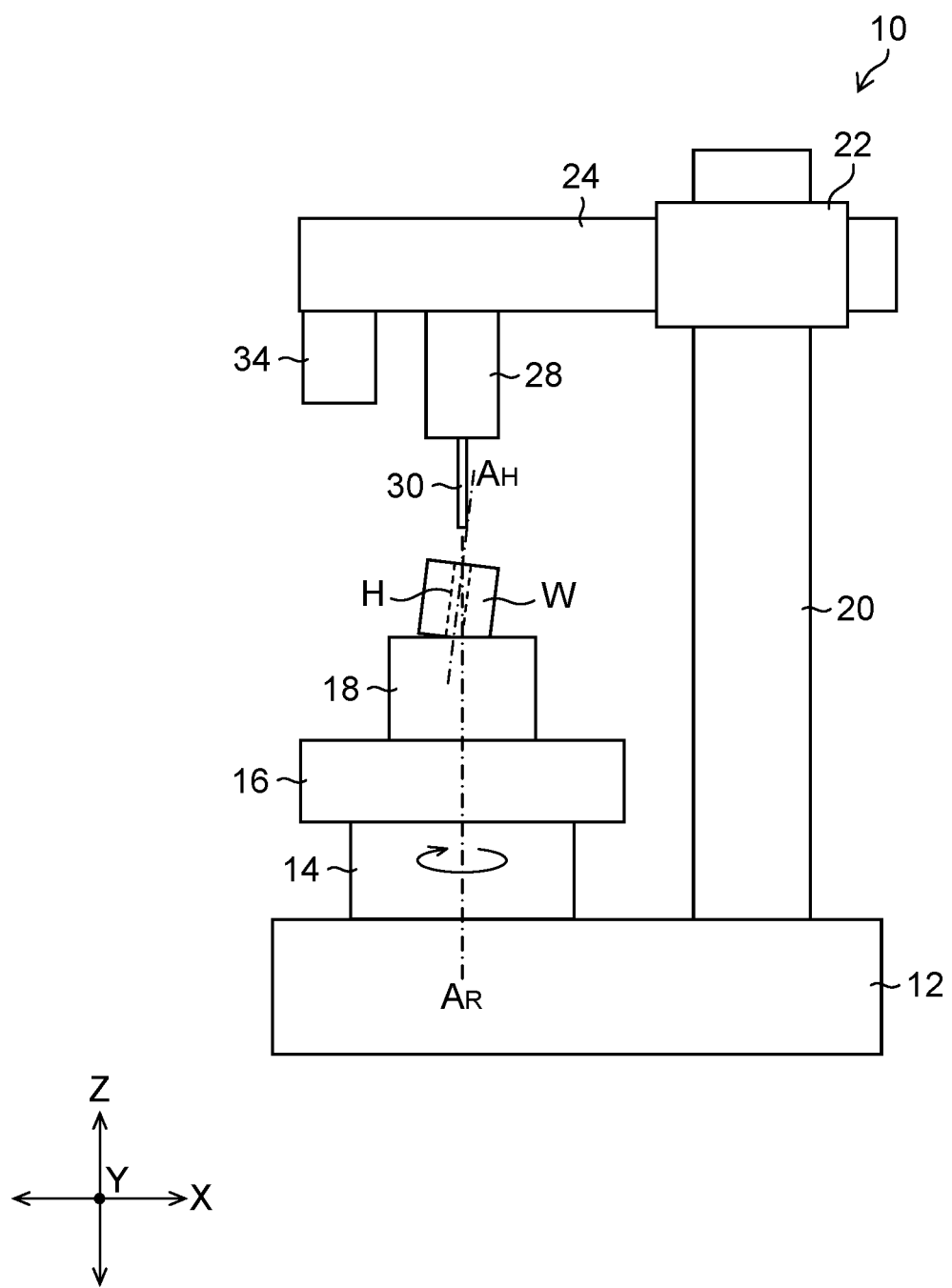
FIG. 1 is a schematic diagram illustrating a configuration of an inner surface shape measurement device.

FIG. 1 is a schematic diagram illustrating a configuration of an inner surface shape measurement device 10 according to a first embodiment. The inner surface shape measurement device 10 is a device for measuring an inner surface shape (roundness, etc.) of a small hole H formed in a workpiece W. In this example, the small hole H is a small hole formed along the central axis of the workpiece W. The inner diameter of the small hole H is an extremely small diameter (for example, the inner diameter is 500 μm or less). In FIG. 1, an X direction, a Y direction, and a Z direction are directions orthogonal to each other, the X direction is the horizontal direction, the Y direction is the horizontal direction orthogonal to the X direction, and the Z direction is the vertical direction.

As illustrated in FIG. 1, the inner surface shape measurement device 10 includes a main body base 12, a rotating body 14, a linear-and-tilting-motion stage 16, a workpiece installation jig 18, a column 20, a carriage 22, an arm 24, a displacement detector 28, and a camera 34.

The rotating body 14 is fixed on the main body base 12. Inside the main body base 12, there are provided a motor (not illustrated) connected to the rotating body 14, an encoder (not illustrated), and a high-accuracy rotation mechanism (not illustrated). The rotating body 14 is driven by the motor to rotate with high accuracy around a rotation axis $A_R$ parallel to the Z direction (an example of a first direction). Further, the rotation angle of the rotating body 14 is detected by the rotation angle signal output from the encoder.

The linear-and-tilting-motion stage 16 (an example of a linear-and-tilting-motion stage) is supported by the rotating body 14 so as to be relatively movable with respect to the rotating body 14. The linear-and-tilting-motion stage 16 are driven by a motor (not illustrated) to move in parallel to the X and Y directions, and can change the position of the workpiece W fixed to the linear-and-tilting-motion stage 16 in the flat surface orthogonal to the Z direction (in the XY plane). Further, the linear-and-tilting-motion stage 16 is driven by a motor (not illustrated) to tilt with respect to the X direction and the Y direction, and can change the tilt of the workpiece W fixed to the linear-and-tilting-motion stage 16 with respect to the XY plane.

The workpiece installation jig 18 is placed on the linear-and-tilting-motion stage 16. The workpiece W is installed on the workpiece installation jig 18. In other words, the workpiece W is fixed to the linear-and-tilting-motion stage 16 via the workpiece installation jig 18. The workpiece W has a small hole H having an extremely small diameter. The small hole H penetrates the inside of the workpiece W straight from the upper opening $O_U$ (see FIG. 5) to the lower opening $O_D$ (see FIG. 7).

To measure the inner surface shape such as the roundness of the small hole H of the workpiece W in the inner surface shape measurement device 10, it is necessary to align the workpiece W so that the central axis $A_H$ of the small hole H of the workpiece W is coaxial with the rotation axis $A_R$ of the rotating body 14. The alignment of the workpiece W is to be described below. FIG. 1 illustrates a state before the alignment of the workpiece W. The aligned workpiece W rotates around the rotation axis $A_R$ together with the rotating body 14.

Further, a column (post) 20 extending in parallel to the Z direction is erected on the main body base 12. The lower end portion of the column 20 is fixed to the upper surface of the main body base 12.

The carriage 22 is supported by the column 20 so as to be movable in the Z direction. The carriage 22 is driven by a motor (not illustrated) to move in the Z direction. The carriage 22 corresponds to a vertical linear-motion mechanism (an example of a first linear-motion mechanism) for moving the displacement detector 28 and the camera 34 in the Z direction.

The arm 24 is supported by the carriage 22 so as to be movable in the X direction (an example of a second direction orthogonal to the first direction). The arm 24 is driven by a motor (not illustrated) to move in the X direction. The arm 24 corresponds to a horizontal linear-motion mechanism for moving the displacement detector 28 and the camera 34 in the X direction.

The displacement detector 28 is supported by the arm 24. The displacement detector 28 includes a non-contact or contact probe 30.

Figure 2:
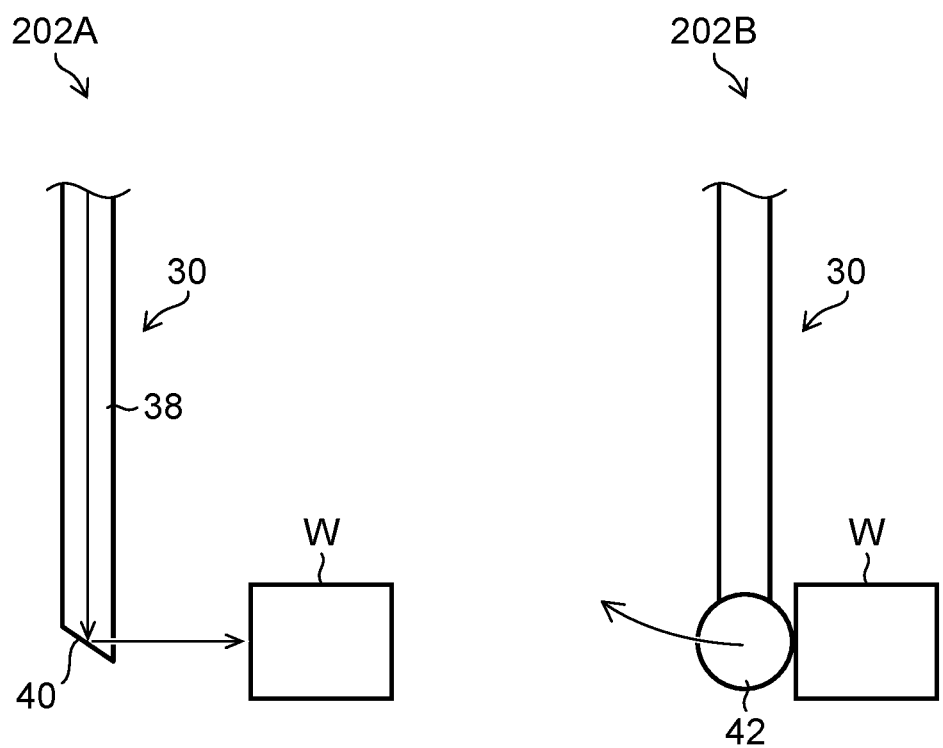
FIG. 2 is a schematic diagram illustrating an example of a non-contact probe and a contact probe.

FIG. 2 is a schematic diagram illustrating an example of the probe 30. In 202A in FIG. 2, a non-contact probe 30 is illustrated. The displacement detector 28 (see FIG. 1) including the non-contact probe 30 includes: a light emitting element (not illustrated) that emits detection light; and a light receiving element (not illustrated) that receives the reflected light of the detection light emitted from the light emitting element. The non-contact probe 30 includes an optical fiber 38 and a reflective mirror 40. The light emitted from the light emitting element (not illustrated) of the displacement detector 28 (see FIG. 1) is guided by the optical fiber 38 to the reflective mirror 40, reflected by the reflective surface of the reflective mirror 40, and incident on the workpiece W. The reflected light reflected by the workpiece W is incident on the reflective mirror 40, reflected on the reflective surface of the reflective mirror 40, and guided to the optical fiber 38. The reflected light guided to the optical fiber 38 is input to a light receiving element (not illustrated) of the displacement detector 28. The displacement detector 28 detects the displacement of the workpiece W based on the reflected light received by the light receiving element.

Techniques of the non-contact type displacement detectors 28 to be applied can be known methods such as a laser interferometer, a white interferometer, an SD-OCT (Spectral Domain-Optical Coherence Tomography), and an SS-OCT (Swept Source-Optical Coherence Tomography).

Note that the displacement detector 28 may detect the displacement of the workpiece W by a contact type. In 202B in FIG. 2, a contact probe 30 is illustrated. The contact probe 30 includes a contactor 42 at its end that is urged toward the workpiece W. When the contactor 42 comes into contact with the workpiece W, the contactor 42 is displaced according to the shape of the workpiece W. The displacement of the contactor 42 is transmitted to the displacement detector 28 via the probe 30. The displacement detector 28 detects the displacement of the workpiece W based on the displacement of the contactor 42.

Displacement detection mechanisms of the contact type displacement detectors 28 to be applied can be known mechanisms such as a LVDT (Linear Variable Differential Transformer), an interferometer, an optical triangulation method, and a thin film strain measurement. Further, the displacement detector 28 may use a method using a fact in which the contactor 42 is vibrated at the resonance frequency and then the contact changes the resonance point.

Returning to the description of FIG. 1, when the inner surface shape measurement device 10 measures the roundness of the small hole H of the workpiece W, the probe 30 is moved in the Z direction together with the displacement detector 28 by the carriage 22, and inserted into the small hole H of the workpiece W. The displacement detector 28 detects the displacement of the hole wall (inner side surface) of the small hole H using the probe 30.

The camera 34 is supported by the arm 24 with the optical axis $A_C$ (see FIG. 12) parallel and downward in the Z direction.

The camera 34 includes: a coaxial epi-illumination optical system 35 (see FIG. 3, an example of a coaxial illumination optical system); and a magnifying optical system (microscope, not illustrated) that magnifies and projects an object to be observed. The coaxial epi-illumination optical system 35 includes an illumination light source (not illustrated) and a half mirror (not illustrated) that emits light from the illumination light source as illumination light coaxial with the optical axis $A_C$ of the camera 34. The camera 34 can irradiate an object to be observed with illumination light coaxially with the optical axis $A_C$ of the camera and take an enlarged image of the object to be observed. Although coaxial epi-illumination is used here, oblique lighting may be used.

The inner surface shape measurement device 10 configured in this way aligns the workpiece W, inserts the probe 30 into the small hole H of the workpiece W, rotates the rotating body 14 to relatively move the workpiece W and the probe 30, detects the displacement of the hole wall of the small hole H with the displacement detector 28, and thereby can measure the roundness of the small hole H.

<Electrical Configuration of Inner Surface Shape Measurement Device>

Figure 3:
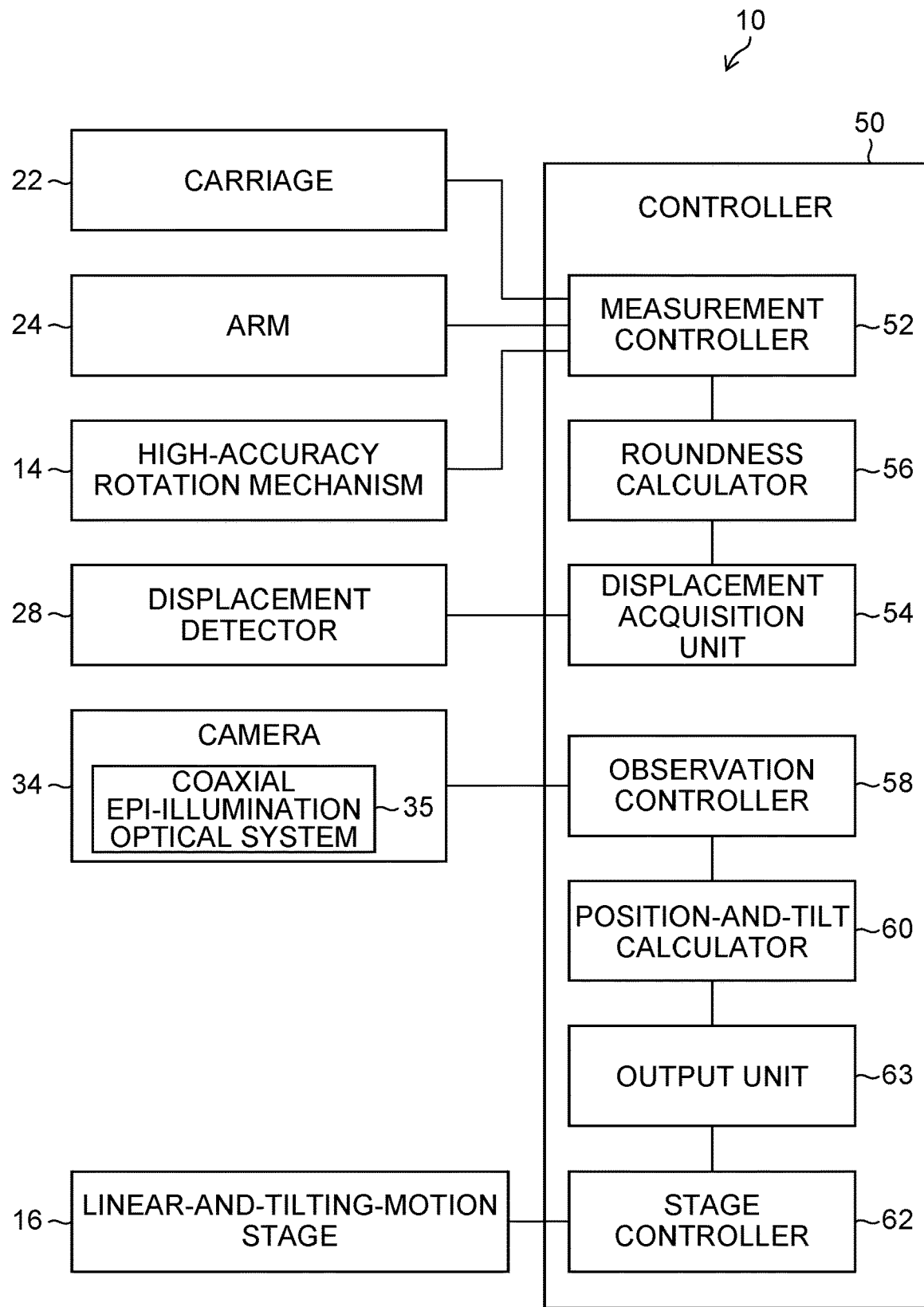
FIG. 3 is a block diagram illustrating an electrical configuration of the inner surface shape measurement device.

FIG. 3 is a block diagram illustrating an electrical configuration of the inner surface shape measurement device 10. The inner surface shape measurement device 10 includes a controller 50.

The controller 50 is implemented by a general-purpose computer such as a personal computer or a microcomputer. The controller 50 includes a CPU (Central Processing Unit), a ROM (Read Only Memory), a RAM (Random Access Memory), and an input/output interface. In the controller 50, various programs such as control programs stored in the ROM are expanded in the RAM, and the programs expanded in the RAM are executed by the CPU to realize the functions of each part in the inner surface shape measurement device 10. Then, various arithmetic processes and control processes are executed via the input/output interface.

As illustrated in FIG. 3, the controller 50 includes a measurement controller 52, a displacement acquisition unit 54, a roundness calculator 56, an observation controller 58, a position-and-tilt calculator 60, a stage controller 62, and an output unit 63.

The measurement controller 52 controls the respective motors (not illustrated) connected to the carriage 22, the arm 24, and the rotating body 14; and controls the relative position between the probe 30 of the displacement detector 28 and the small hole H of the workpiece W.

The displacement acquisition unit 54 controls the displacement detector 28, and acquires the displacement of the hole wall of the small hole H detected by the displacement detector 28.

The roundness calculator 56 calculates the roundness of the small hole H from the relative position between the probe 30 and the workpiece W acquired from the measurement controller 52 and the displacement detected by the displacement detector 28.

The observation controller 58 controls the camera 34, and acquires an image taken by the camera 34. The position-and-tilt calculator 60 calculates the position and tilt of the small hole H of the workpiece W from the image acquired by the observation controller 58. The stage controller 62 controls the motor (not illustrated) that drives the linear-and-tilting-motion stage 16 based on the position and tilt of the small hole H calculated by the position-and-tilt calculator 60, and changes the position and tilt of the linear-and-tilting-motion stage 16. The output unit 63 outputs the small hole information including the position and tilt of the small hole H acquired from the position-and-tilt calculator 60 to an output interface (not illustrated).

<Alignment Method>

As described above, to measure the inner surface shape such as the roundness of the small hole H of the workpiece W, alignment is required for aligning the central axis $A_H$ of the small hole H with the rotation axis $A_R$ of the rotating body 14. The alignment includes centering that adjusts the position in the XY plane and tilting that adjusts the tilt with respect to the XY plane. The inner surface shape measurement device 10 can perform centering and tilting using the linear-and-tilting-motion stage 16.

Figure 4:
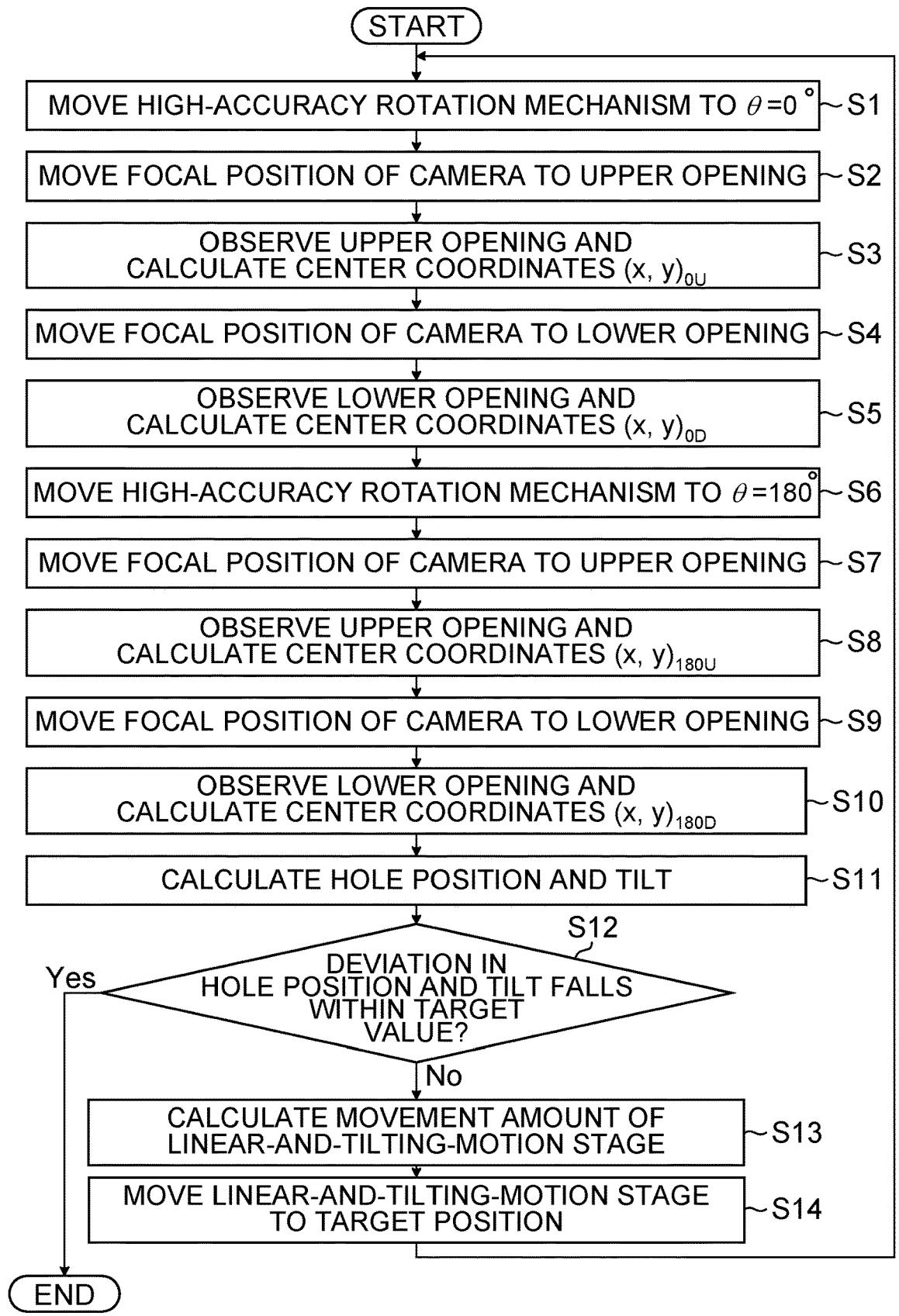
FIG. 4 is a flowchart illustrating an example of processing in an alignment method of an inner surface shape measurement device.

FIG. 4 is a flowchart illustrating an example of processing of the alignment method of the inner surface shape measurement device 10. Here, it is assumed that the workpiece W having a small hole H is installed on the workpiece installation jig 18 in advance. The workpiece installation jig 18 fixes the workpiece W with a gap provided at the lower opening $O_D$ (see FIG. 7) of the small hole H of the workpiece W (with the lower opening $O_D$ not blocked).

In step S1, the measurement controller 52 drives the motor (not illustrated) according to the result detected by the encoder (not illustrated) of the rotating body 14, and moves (rotates) the rotating body 14 to a position where the rotation angle is a set angle $\theta=0°$ (an example of a first rotation angle).

In step S2, the measurement controller 52 drives the motor (not illustrated) of the arm 24 to move the camera 34 upward in the Z direction of the workpiece W. Further, the measurement controller 52 drives the motor (not illustrated) of the carriage 22 to move the camera 34 in the Z direction, and aligns the focal position of the camera 34 with the upper opening $O_U$ (an example of a first position) of the small hole H.

In the following step S3 (an example of an observation control step), the observation controller 58 observes (images) the upper opening $O_U$ of the small hole H using the camera 34. Further, the position-and-tilt calculator 60 calculates the center coordinates $(x, y)_{0U}$ of the upper opening $O_U$ of the small hole H at the set angle $\theta=0°$.

Figure 5:
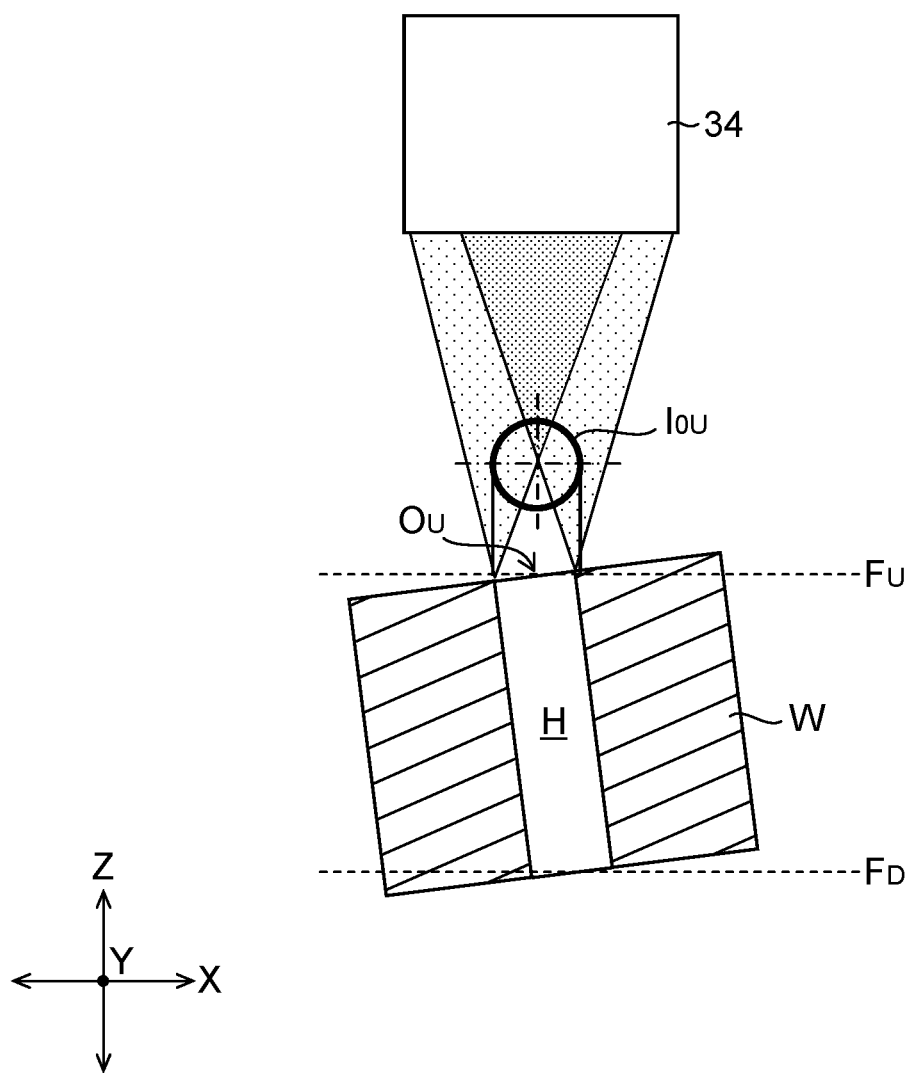
FIG. 5 is a schematic diagram illustrating observation of an upper opening of a small hole using a camera.

FIG. 5 is a schematic diagram illustrating the observation of the upper opening $O_U$ of the small hole H using the camera 34. In FIG. 5, the workpiece W is illustrated in cross section. The focal plane $F_U$ illustrated in FIG. 5 is a plane orthogonal to the optical axis $A_C$ of the camera 34 and includes the focal point of the camera 34, and is aligned with the position of the upper opening $O_U$ of the small hole H here. Further, the dot hatch part illustrated in FIG. 5 is an optical path of light, incident on the camera 34, for observing the upper opening $O_U$, and the image $I_{0U}$ illustrated in FIG. 5 is an image (in the Z direction view) of the edge portion of the upper opening $O_U$ observed by the camera 34.

Figure 6:
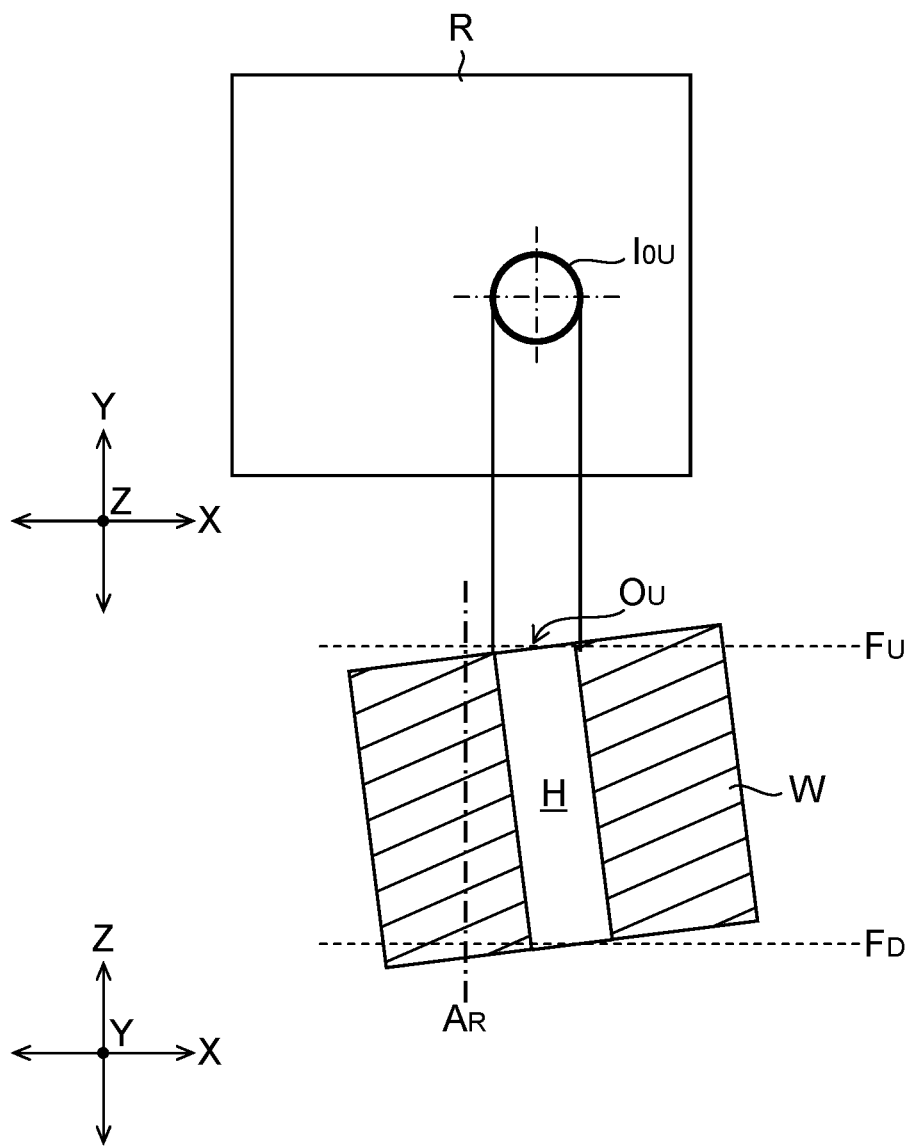
FIG. 6 is a diagram illustrating a positional relationship among a rotation axis of a rotating body, the upper opening at a set angle θ=0° of the rotating body, and an image of the upper opening in an imaging range of the camera.

FIG. 6 is a diagram illustrating the rotation axis $A_R$ of the rotating body 14, the upper opening $O_U$ of the small hole H of the workpiece W at the set angle $\theta=0°$ of the rotating body 14, the positional relationship between the imaging range R of the camera 34 and the image $I_{0U}$ observed in step S3 in the imaging range R. In FIG. 6, the imaging range R is illustrated in the Z direction view, and the workpiece W is illustrated in cross section in the Y direction view.

The position-and-tilt calculator 60 calculates the center coordinates $(x, y)_{0U}$ of the upper opening $O_U$ of the small hole H at the set angle $\theta=0°$, from the image $I_{0U}$.

Next, in step S4, the measurement controller 52 drives the motor (not illustrated) of the carriage 22 to move the camera 34 in the Z direction, and adjusts the focal position of the camera 34 to the lower opening $O_D$ (an example of a second position) whose position in the Z direction is different from that of the upper opening $O_U$ of the small hole H.

In the following step S5 (an example of the observation control step), the observation controller 58 observes the lower opening $O_D$ of the small hole H using the camera 34. Further, the position-and-tilt calculator 60 calculates the center coordinates $(x, y)_{0D}$ of the lower opening $O_D$ of the small hole H at the set angle $\theta=0°$.

FIG. 7 is a schematic diagram illustrating the observation of the lower opening $O_D$ of the small hole H using the camera 34. In FIG. 7, the workpiece W is illustrated in cross section. As illustrated in FIG. 7, the focal plane $F_D$ is aligned with the position of the lower opening $O_D$ of the small hole H. Further, the dot hatch part illustrated in FIG. 7 is an optical path of light, incident on the camera 34, for observing the lower opening $O_D$, and the image $I_{0U}$ illustrated in FIG. 7 is an image (in the Z direction view) of the edge portion of the lower opening $O_D$ observed by the camera 34.

Figure 8:
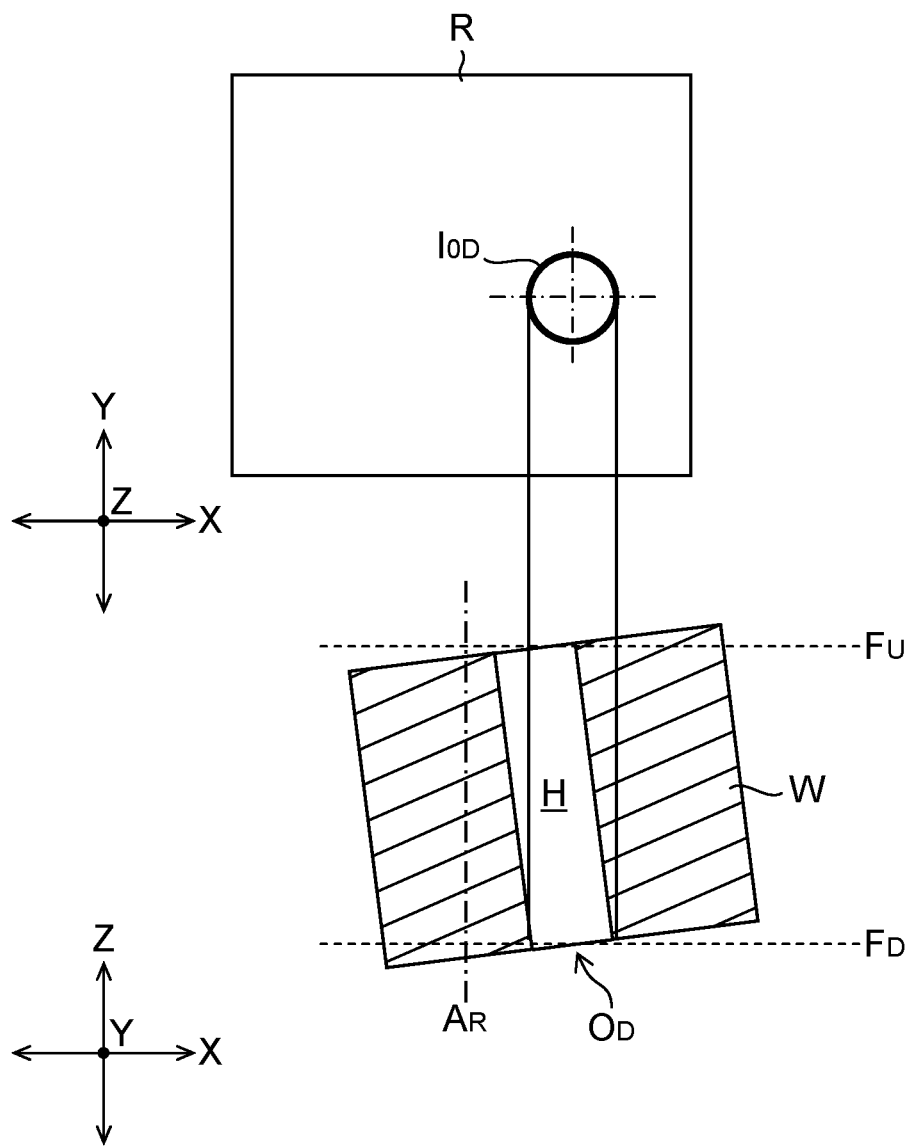
FIG. 8 is a diagram illustrating a positional relationship among the rotation axis of the rotating body, the lower opening at the set angle θ=0° of the rotating body, and an image of the lower opening in an imaging range of the camera.

FIG. 8 is a diagram illustrating the positional relationship among the rotation axis $A_R$ of the rotating body 14, the lower opening $O_D$ of the small hole H of the workpiece W at the set angle $\theta=0°$ of the rotating body 14, and the image $I_{0D}$ observed in step S5 in the imaging range R of a camera 34. In FIG. 8, the imaging range R is illustrated in the Z direction view, and the workpiece W is illustrated in cross section in the Y direction view.

The position-and-tilt calculator 60 calculates the center coordinates $(x, y)_{0D}$ of the lower opening $O_D$ of the small hole H at the set angle $\theta=0°$, from the image $I_{0D}$.

Next, in step S6, the measurement controller 52 drives the motor (not illustrated) according to the result detected by the encoder (not illustrated) of the rotating body 14, and moves the rotating body 14 to a position where the rotation angle is a set angle $\theta=180°$ (an example of a second rotation angle).

In step S7, the measurement controller 52 drives the motor (not illustrated) of the carriage 22 to move the camera 34 in the Z direction, and aligns the focal position of the camera 34 with the upper opening $O_U$.

In the following step S8 (an example of the observation control step), the observation controller 58 observes the upper opening $O_U$ of the small hole H using the camera 34. Further, the position-and-tilt calculator 60 calculates the center coordinates $(x, y)_{180U}$ of the upper opening $O_U$ of the small hole H at the set angle $\theta=180°$, from the image $I_{180U}$.

Figure 9:
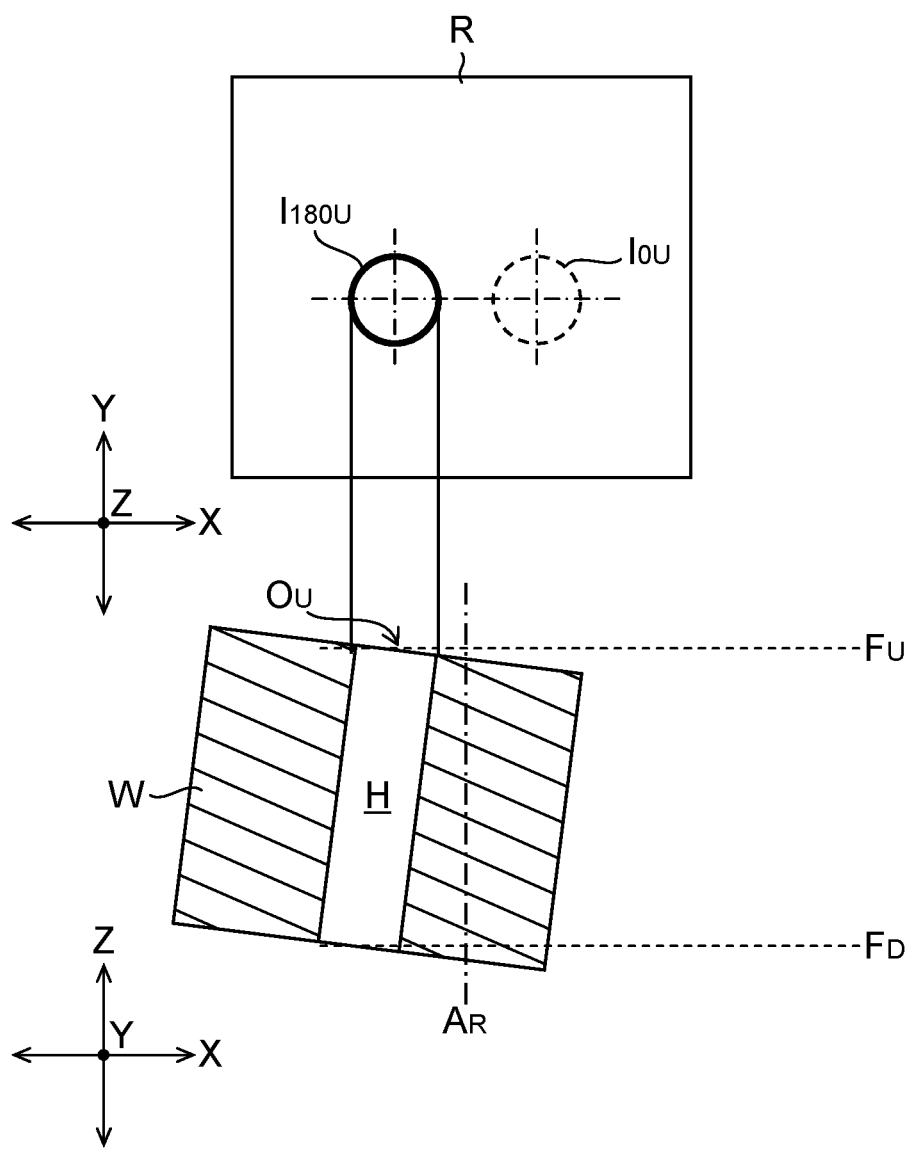
FIG. 9 is a diagram illustrating a positional relationship among the rotation axis of the rotating body, the upper opening at a set angle θ=180° of the rotating body, and an image of the upper opening in an imaging range of the camera.

FIG. 9 is a diagram illustrating the positional relationship among the rotation axis $A_R$ of the rotating body 14, the upper opening $O_U$ of the small hole H of the workpiece W at the set angle θ=180° of the rotating body 14, and the image $I_{0U}$ observed in step S8 in the imaging range R of the camera 34. In FIG. 9, the imaging range R is illustrated in the Z direction view, and the workpiece W is illustrated in cross section in the Y direction view.

The position-and-tilt calculator 60 calculates the center coordinates $(x, y)_{180U}$ of the upper opening $O_U$ of the small hole H at the set angle θ=180°, from the image $I_{180U}$.

Next, in step S9, the measurement controller 52 drives the motor (not illustrated) of the carriage 22 to move the camera 34 in the Z direction, and aligns the focal position of the camera 34 with the lower opening $O_D$ of the small hole H.

In the following step S10 (an example of the observation control step), the observation controller 58 observes the lower opening $O_D$ of the small hole H using the camera 34. Further, the position-and-tilt calculator 60 calculates the center coordinates $(x, y)_{180D}$ of the lower opening $O_D$ of the small hole H at the set angle θ=180°, from the image $I_{180D}$.

Figure 10:
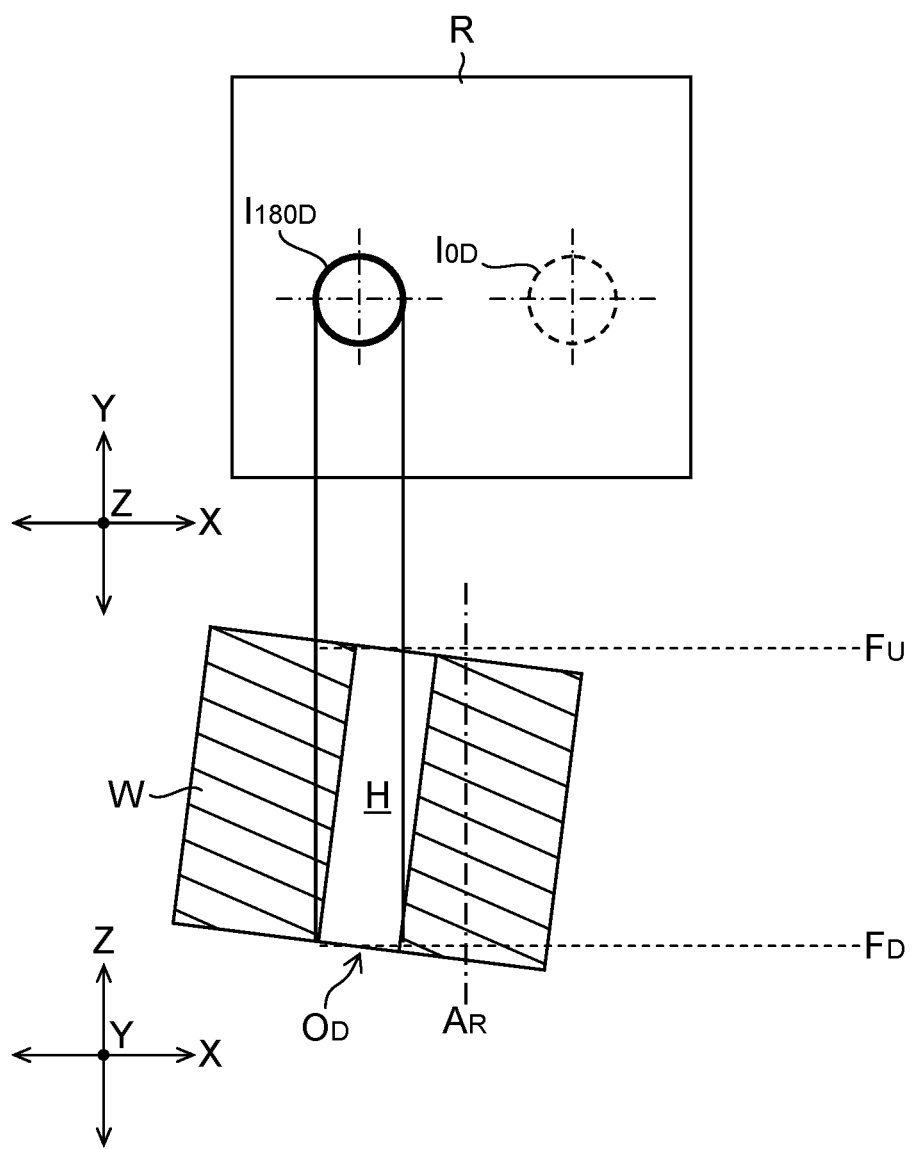
FIG. 10 is a diagram illustrating a positional relationship among the rotation axis of the rotating body, the lower opening at the set angle θ=180° of the rotating body, and an image of the lower opening in an imaging range of the camera.

FIG. 10 is a diagram illustrating the positional relationship among the rotation axis $A_R$ of the rotating body 14, the lower opening $O_D$ of the small hole H of the workpiece W at the set angle θ=180° of the rotating body 14, and the image $I_{0D}$ observed in step S10 in the imaging range R of the camera 34. In FIG. 10, the imaging range R is illustrated in the Z direction view, and the workpiece W is illustrated in cross section in the Y direction view.

The position-and-tilt calculator 60 calculates the center coordinates $(x, y)_{180D}$ of the lower opening $O_D$ of the small hole H at the set angle θ=180°, from the image $I_{180D}$.

In step S11 (an example of a position-and-tilt calculation step), the position-and-tilt calculator 60 calculates the position and tilt of the central axis $A_H$ of the small hole H of the workpiece W with respect to the rotation axis $A_R$ of the rotating body 14, from the center coordinates $(x, y)_{0U}$ of the upper opening $O_U$ and the center coordinates $(x, y)_{0D}$ of the lower opening $O_D$ of the small hole H at the set angle θ=0°, and the center coordinates $(x, y)_{180U}$ of the upper opening $O_U$ and the center coordinates $(x, y)_{180D}$ of the lower opening $O_D$ of the small hole H at the set angle θ=180°.

In step S12, the position-and-tilt calculator 60 determines whether the deviation between the position and tilt of the central axis $A_H$ of the small hole H of the workpiece W, and the rotation axis $A_R$ are within the target value. If the deviation is larger than the target value, the controller 50 performs processing of step S13. If the deviation is within the target value, the processing of this flowchart ends.

Figure 11:
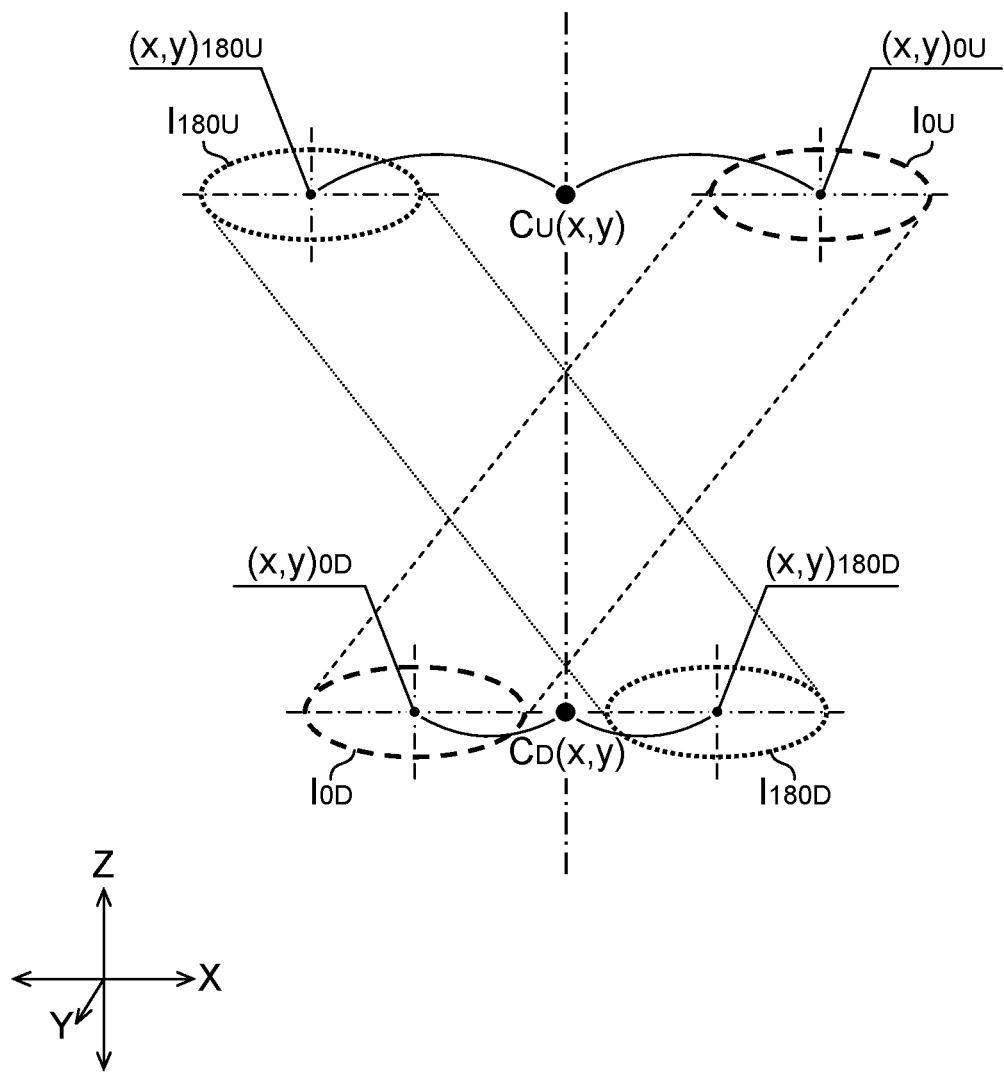
FIG. 11 is a diagram for explaining movement target coordinates of the upper opening and movement target coordinates of the lower opening.

In step S13, the position-and-tilt calculator 60 calculates a movement amount of the linear-and-tilting-motion stage 16. FIG. 11 is a diagram for explaining the movement target coordinates $C_U(x, y)$ of the upper opening $O_U$ and the movement target coordinates $C_D(x, y)$ of the lower opening $O_D$. FIG. 11 illustrates the positional relationship of: the center coordinates $(x, y)_{0U}$ of the upper opening $O_U$ and the center coordinates $(x, y)_{0U}$ of the lower opening $O_D$ of the small hole H at the set angle θ=0°; the center coordinates $(x, y)_{180U}$ of the upper opening $O_U$ and the center coordinates $(x, y)_{180U}$ of the lower opening $O_D$ of the small hole H at the set angle θ=180°; the movement target coordinates $C_U(x, y)$ of the upper opening $O_U$; and the movement target coordinates $C_D(x, y)$ of the lower opening $O_D$.

As illustrated in FIG. 11, the movement target coordinates $C_U(x, y)$ of the upper opening $O_U$ are expressed as:

$$C_U(x,y) = \{(x,y)_{0U} + (x,y)_{180U}\}/2 \quad \text{(Expression 1)}$$

Similarly, the movement target coordinates $C_D(x, y)$ of the lower opening $O_D$ are expressed as:

$$C_D(x,y) = \{(x,y)O_{0D} + (x,y)_{180D}\}/2 \quad \text{(Expression 2)}$$

The position-and-tilt calculator 60 calculates the movement amount of the linear-and-tilting-motion stage 16 from the movement target coordinates $C_U(x, y)$ of the upper opening $O_U$ and the movement target coordinates $C_D(x, y)$ of the lower opening $O_D$. The output unit 63 acquires the movement amount (an example of the small hole information) of the linear-and-tilting-motion stage 16 calculated by the position-and-tilt calculator 60, and outputs it to the stage controller 62 (an example of an output step).

In step S14 (an example of a stage control step), the stage controller 62 drives the motor (not illustrated) of the linear-and-tilting-motion stage 16 based on the movement amount calculated in step S13, to move the linear-and-tilting-motion stage 16 to the target position. After that, the process proceeds to step S1, and the controller 50 performs the same processing. The inner surface shape measurement device 10 repeats this processing, and thereby makes the deviation between the central axis $A_H$ of the small hole H of the workpiece W and the rotation axis $A_R$ of the rotating body 14 within the target value.

As described above, the alignment method according to the present embodiment makes it possible to align the central axis $A_H$ of the small hole H with the rotation axis $A_R$ of the rotating body 14. The present embodiment does not require the optical axis $A_C$ of the camera 34 to be aligned with the rotation axis $A_R$ of the rotating body 14, and therefore makes it possible to perform alignment with a simple configuration. The alignment method according to the present embodiment is effective when the small hole H is an extremely small diameter hole having an inner diameter of 500 μm or less. Further, the alignment method is particularly effective when the diameter of the small hole H is 200 μm or less and the diameter of the probe 30 is 100 μm or less. Further, the small hole H may have a diameter larger than 500 μm.

Here, the setting angle θ of the rotation angle of the rotating body 14 in observing the upper opening $O_U$ and the lower opening $O_D$ using the camera 34 is set to θ=0° and θ=180°, which are 180° different angles from each other. This makes it possible to accurately calculates the deviation between the central axis $A_H$ of the small hole H of the workpiece W and the rotation axis $A_R$.

Further, to measure the cylindricity of the workpiece W with high accuracy, the inner surface shape measurement device 10 has the column 20 erected in parallel with the rotation axis $A_R$ of the rotating body 14. In the present embodiment, when the observation is switched between the upper opening $O_U$ and the lower opening $O_D$ of the small hole H, the focal position of the camera 34 was moved by using the vertical linear-motion mechanism of the carriage 22. This makes the focus control mechanism of the camera 34 unnecessary, and enables highly accurate alignment. For example, the position of the rotation axis in the focal plane does not move, making it possible to use a high-magnification optical system.

Further, the output unit 63 may output the movement amount (an example of the small hole information) of the linear-and-tilting-motion stage 16, which is acquired from the position-and-tilt calculator 60, to an output interface (not illustrated) or the like (an example of the output step). Further, the output unit 63 may acquire the small hole information including the position and tilt of the central axis $A_H$ of the small hole H of the workpiece W with respect to the rotation axis $A_R$ of the rotating body 14 calculated in step S11, and may output the small hole information to an output interface (not illustrated) or the like (an example of the output step). The user can manually operate the linear-and-tilting-motion stage 16 based on the output information, and thereby align the central axis $A_H$ of the small hole H of the workpiece W with the rotation axis $A_R$ of the rotating body 14. In the present embodiment, the output unit 63 outputs the acquired movement amount to the stage controller 62.

<Workpiece Installation Jig>

Observing the lower opening $O_D$ of the small hole H requires the angle (tilt) of the small hole H to be kept within a certain range when the workpiece W is installed on the workpiece installation jig 18.

Figure 12:
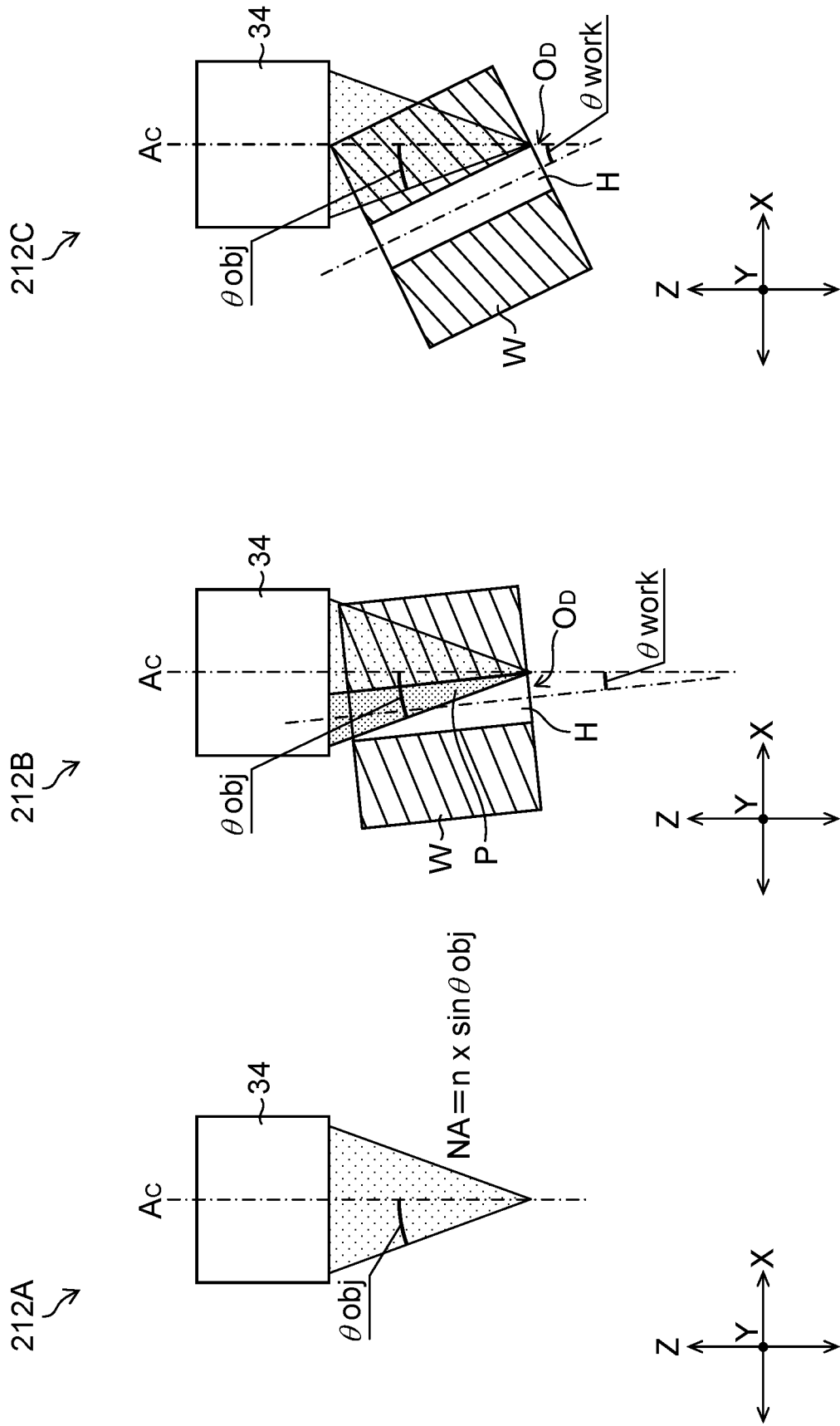
FIG. 12 is a diagram illustrating a relationship between the camera and the small hole in a workpiece using a workpiece installation jig.

FIG. 12 is a diagram illustrating relationships between the camera and the small hole of the workpiece set by the workpiece installation jig. In FIG. 12, 212A illustrates the maximum angle of the observation light incident on the objective lens (not illustrated) of the camera 34 with respect to the optical axis $A_C$. As illustrated in 212A, the number of openings of the objective lens of the camera 34 NA is calculated by the following expression:

$$NA = n \times \sin \theta_{obj} \quad \text{(Expression 3)}$$

where: $\theta_{obj}$ is the maximum angle of the observation light incident on the objective lens with respect to the optical axis $A_C$ of the camera 34, and n is the refractive index of the optical path of the observation light. Therefore, assuming that the refractive index n of the air in the optical path of the observation light is 1.0, there is required a workpiece installation jig 18 capable of positioning the workpiece W to satisfy:

$$\theta_{work} < a \sin(NA) \quad \text{(Expression 4)}$$

where: $\theta_{work}$ is the tilt angle of the small hole H with respect to the rotation axis $A_R$ of the rotating body 14.

In FIG. 12, 212B illustrates a relationship between the camera 34 and the workpiece W when there is a relationship of $\theta_{work} < \theta_{obj}$. In 212B, the workpiece W is illustrated in cross section. The optical path P illustrated in 212B is an optical path that can be used for observing the lower opening $O_D$ among the optical paths of the observation light incident on the camera 34. In this way, in the case illustrated in 212B, it is possible to observe the lower opening $O_D$ using the camera 34.

In FIG. 12, 212C illustrates a relationship between the camera 34 and the workpiece W when there is a relationship of $\theta_{work} > \theta_{obj}$. In 212C, the workpiece W is illustrated in cross section. In the case illustrated in 212C, the observation light of the lower opening $O_D$ does not reach the camera 34, and it is not possible to observe the lower opening $O_D$ using the camera 34.

<Position for Observing Small Hole>

The above example, illustrates an example of observing the upper opening $O_U$ and the lower opening $O_D$ of the small hole H. However, the position for observing the small hole H is not limited to the opening, and it may be an intermediate position of the small hole H.

Figure 13:
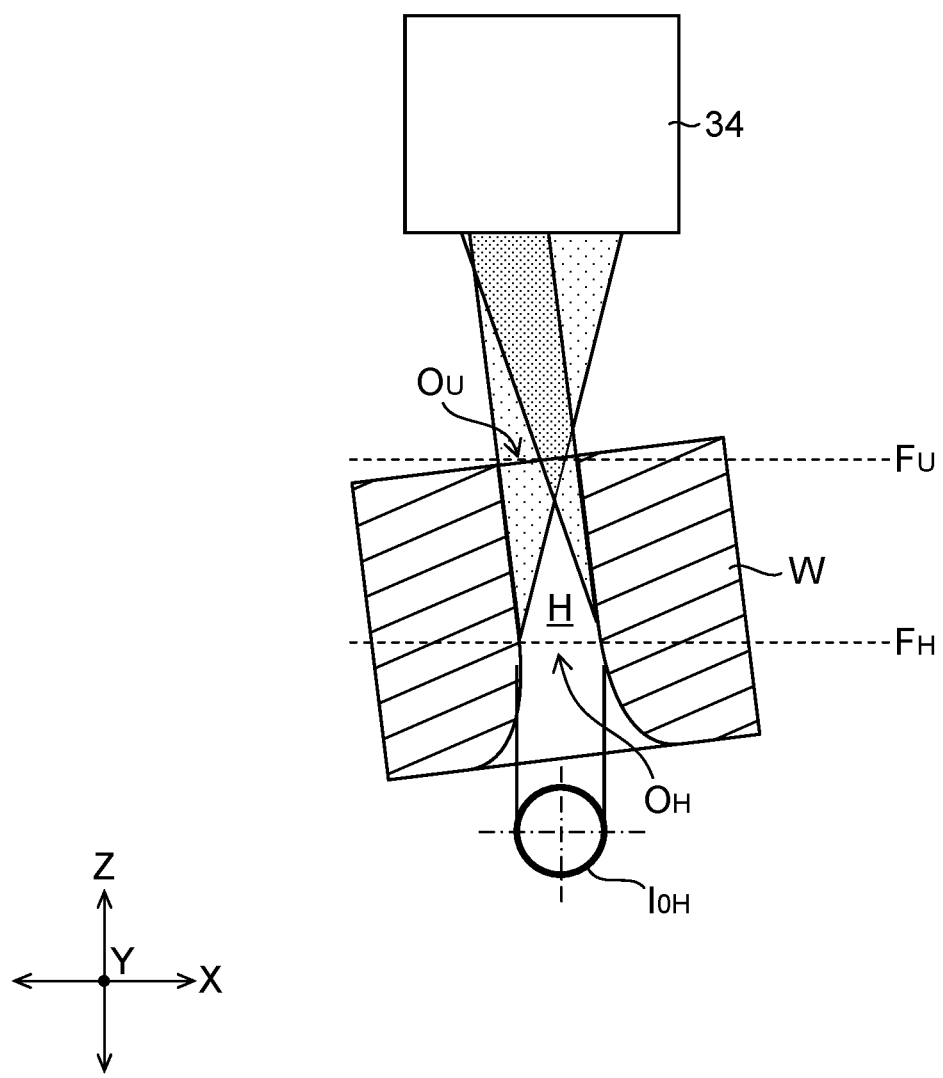
FIG. 13 is a schematic diagram illustrating observation of an intermediate position of the small hole using the camera.

FIG. 13 is a schematic diagram illustrating observation using a camera 34 at an intermediate position $O_H$ (an example of a second position) whose position in the Z direction is different from that of the upper opening $O_U$ and the lower opening $O_D$ of the small hole H. In FIG. 13, the workpiece W is illustrated in cross section. The small hole H illustrated in FIG. 13 has an R at the edge portion of the lower opening $O_D$ (the lower opening $O_D$ has an R shape). As a result, in the example illustrated in FIG. 13, the focal plane $F_H$ is aligned with the intermediate position $O_H$ of the small hole H. Further, the dot hatch part illustrated in FIG. 13 is an optical path of light, incident on the camera 34, for observing the intermediate position $O_H$. The image $I_{OH}$ illustrated in FIG. 13 is the image (in the Z direction view) of the intermediate position $O_H$ observed by the camera 34.

In this way, when the upper opening $O_U$ and the lower opening $O_D$ of the small hole H have chamfers or Rs and it is difficult to observe the edge shape of the small hole H, it is effective to observe the intermediate position of the small hole H. In using the intermediate position of the small hole H, detecting the position of the small hole H can use techniques of selecting high-contrast (focused) regions in an image, measurement using the white interference method, or the like.

<Case in which Position of Small Hole Largely Deviates from Rotation Axis>

In the above example, when the rotating body 14 is rotated, the small hole H is always within the imaging range of the camera 34 fixed in the X direction. In other words, the small hole H is arranged from the beginning at a position close to the rotation axis $A_R$ of the rotating body 14 so as to be within the imaging range of the camera 34. However, also when the small hole H is arranged so as to largely deviate from the rotation axis $A_R$ of the rotating body 14, operating the horizontal linear-motion mechanism allows the same technique to be applied.

FIG. 14 is a schematic diagram illustrating the observation of the small hole H using a camera 34 in time series when the small hole H of the workpiece W is arranged so as to largely deviate from the rotation axis $A_R$ of the rotating body 14.

In FIG. 14, 214A illustrates a state in which the small hole H of the workpiece W is not within the imaging range of the camera 34. Here, the measurement controller 52 moves the rotating body 14 to a position where the rotation angle is a set angle $\theta = \theta_A$. The set angle $\theta = \theta_A$ is an angle at which the small hole H of the workpiece W and the arm 24 overlap in the Z direction view. The movement to the position of the set angle $\theta = \theta_A$ may be performed in a way of: positioning the rotating body 14 using a jig; or moving the rotating body 14 at each position of the camera 34, positioned by moving the arm 24, to search the small hole H using the camera 34.

In FIG. 14, 214B illustrates how the observation controller 58 moves the arm 24, which is a horizontal linear-motion mechanism, to the position $P_A$ where the small hole H enters the field of view of the camera 34. At this position $P_A$, the observation controller 58 observes the upper opening $O_U$ and the lower opening $O_D$ of the small hole H using the camera 34. Then, the position-and-tilt calculator 60 calculates the center coordinates $(x, y)_{AU}$ of the upper opening $O_U$ and the center coordinates $(x, y)_{AD}$ of the lower opening $O_D$ of the small hole H at the set angle $\theta = \theta_A$. Further, the position-and-tilt calculator 60 stores the position $P_A$ of the arm 24.

In FIG. 14, 214C illustrates how the measurement controller 52 moves the rotating body 14 to a position where the rotation angle is a set angle $\theta = \theta_A + 180° = \theta_B$.

In FIG. 14, 214D illustrates how the observation controller 58 moves the arm 24, which is a horizontal linear-motion mechanism, to a position $P_B$ where the small hole H enters the field of view of the camera 34. At this position $P_B$, the observation controller 58 observes the upper opening $O_U$ and the lower opening $O_D$ of the small hole H using the camera 34. Then, the position-and-tilt calculator 60 calculates the center coordinates $(x, y)_{BU}$ of the upper opening $O_U$ and the center coordinates $(x, y)_{BD}$ of the lower opening $O_D$ of the small hole H at the set angle θ=θ$_B$. Further, the position-and-tilt calculator 60 stores the position P$_B$ of the arm 24.

The position-and-tilt calculator 60 can calculate the position and tilt of the small hole H of the workpiece W with respect to the rotation axis A$_R$ of the rotating body 14 from thus acquired: the center coordinates (x, y)$_{AU}$ of the upper opening O$_U$ and the center coordinates (x, y)$_{AD}$ of the lower opening O$_D$ of the small hole H at the set angle θ=θ$_A$, and the position of the arm 24 P$_A$; and the center coordinates (x, y)$_{BU}$ of the upper opening O$_U$ and the center coordinates (x, y)$_{BD}$ of the lower opening O$_D$ of the small hole H at the set angle θ=θ$_B$, and the position of the arm 24 P$_B$.

<Other Examples of Calculating Position and Tilt of Small Hole>

The above example illustrates an example of observation with two rotation angles, but the rotation angle of the rotating body 14 may be set to three or more angles, or set continuously. For example, the position and tilt of the small hole H may be calculated from the locus of the center coordinates.

Figure 15:
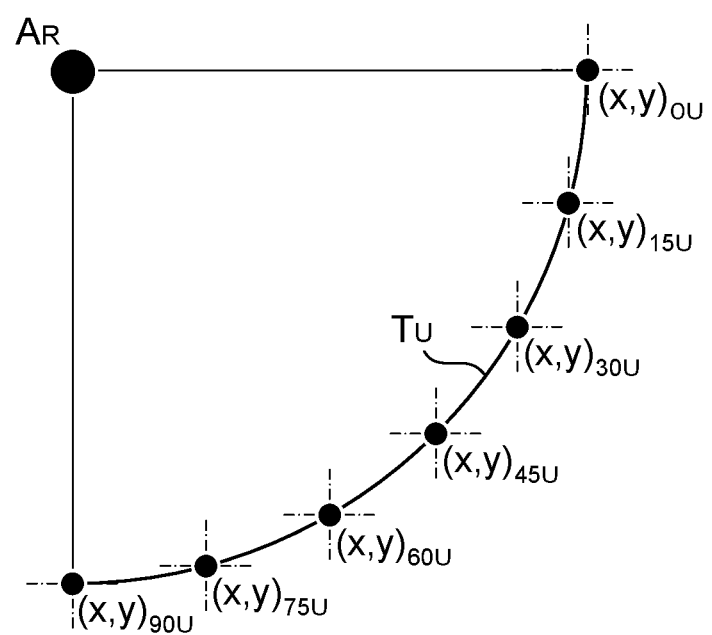
FIG. 15 is a diagram illustrating a locus of center coordinates of the upper opening of the small hole in a imaging range of the camera when the rotating body is rotated.

FIG. 15 is a diagram illustrating a locus T$_U$ of the center coordinates of the upper opening O$_U$ of the small hole H in the imaging range R of the camera 34 when the rotating body 14 is rotated. Here illustrates the locus when the rotation angle of the rotating body 14 is rotated from the set angle θ=0° to the set angle θ=90°. From this locus T$_U$, the position-and-tilt calculator 60 calculates (x, y)$_{0U}$, (x, y)$_{15U}$, (x, y)$_{30U}$, (x, y)$_{45U}$, (x, y)$_{60U}$, (x, y)$_{75U}$, and (x, y)$_{90U}$, which are respectively center coordinates of set angles θ=0°, 15°, 30°, 45°, 60°, 75°, and 90°, and calculates the movement target coordinates, that is, the coordinates of the rotation axis A$_R$, from these calculated center coordinates.

In this way, the calculation can be performed without rotating the rotating body 14 by 180°, so that the alignment can be speeded up. In addition, there is much information that can be used in determining the rotation center, making it possible to calculate the movement target coordinates with high accuracy.

<Light Quantity Adjustment>

Figure 16:
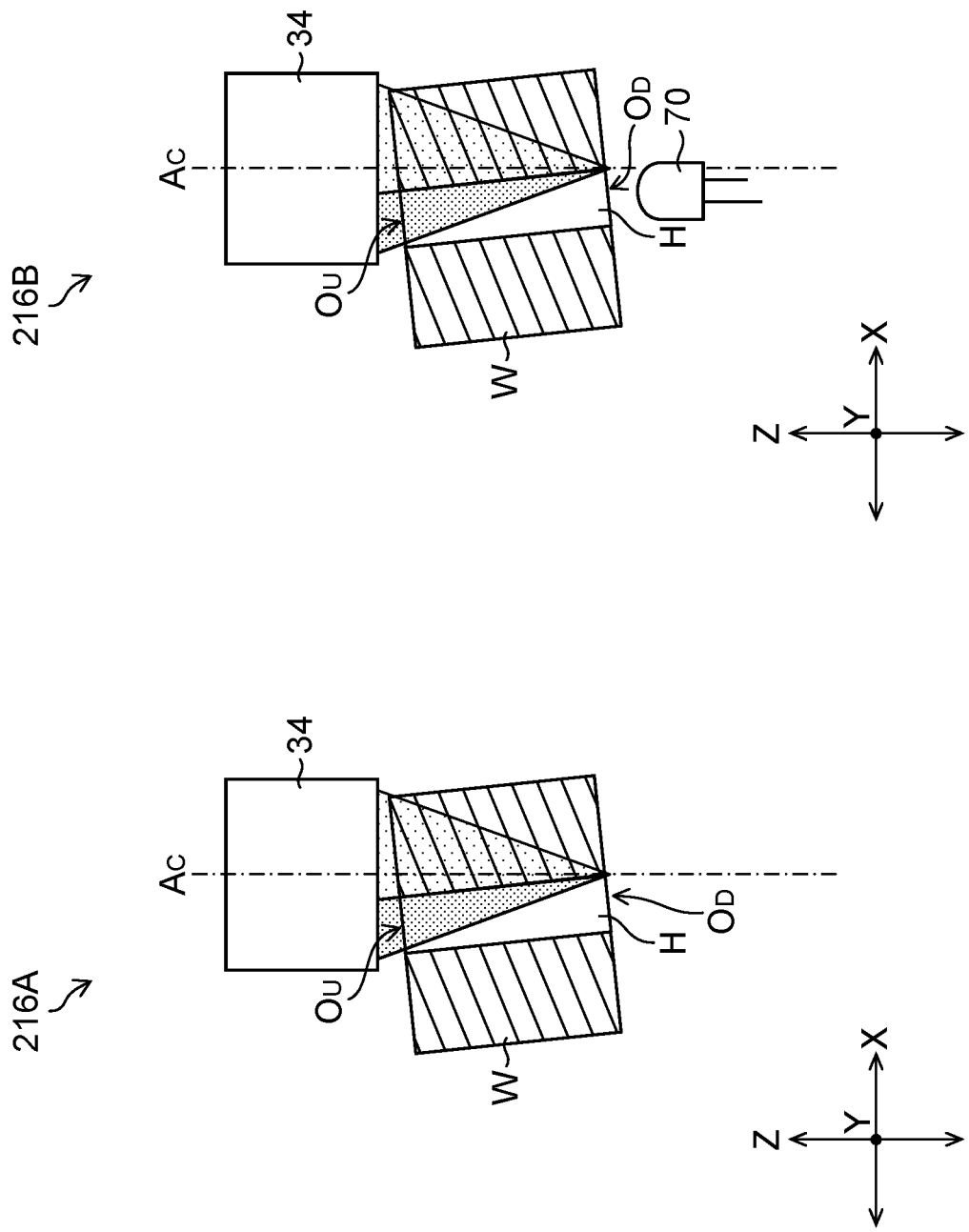
FIG. 16 is a diagram illustrating an optical path of light, incident on the camera, for observing the lower opening of the small hole in the workpiece.

FIG. 16 is a diagram illustrating an optical path of the light, incident on the camera, for observing the lower opening of the small hole of the workpiece. In 216A of FIG. 16, illustrates an optical path of the light, incident on the camera 34, for observing the lower opening O$_D$ of the small hole H of the workpiece W. In 216A, the workpiece W is illustrated in cross section. As illustrated in 216A, the optical path that can be used for observing the lower opening O$_D$ suffers from a small light quantity. In other words, the observation of the lower opening O$_D$ may be difficult due to insufficient light quantity as compared with the observation of the upper opening O$_U$. Therefore, there may be a mechanism to increase the light quantity in observing the lower opening O$_D$ with respect to that in observing the upper opening O$_U$.

In 216B of FIG. 16, there is illustrated a state in which a light source 70 for irradiating a small hole H is arranged on the lower opening O$_D$ side. In 216B, the workpiece W is illustrated in cross section. The light source 70 irradiates the small hole H from the lower opening O$_D$ (an example of the opening on the linear-and-tilting-motion stage side). The light source 70 preferably has a low coherence to reduce speckle noise. The light source 70 to be used may be, for example, a light source of an LED (Light Emitting Diode) or an ASE (Amplified Spontaneous Emission). It is more preferable that the center of the light source 70 is aligned with the rotation axis A$_R$ of the rotating body 14.

Thus arranging the light source on the lower opening O$_D$ side makes it possible to emphasize the shape edge of the lower opening O$_D$. This facilitates observing the lower opening O$_D$, and allows alignment with higher accuracy.

<Insertion of Reflector>

Figure 17:
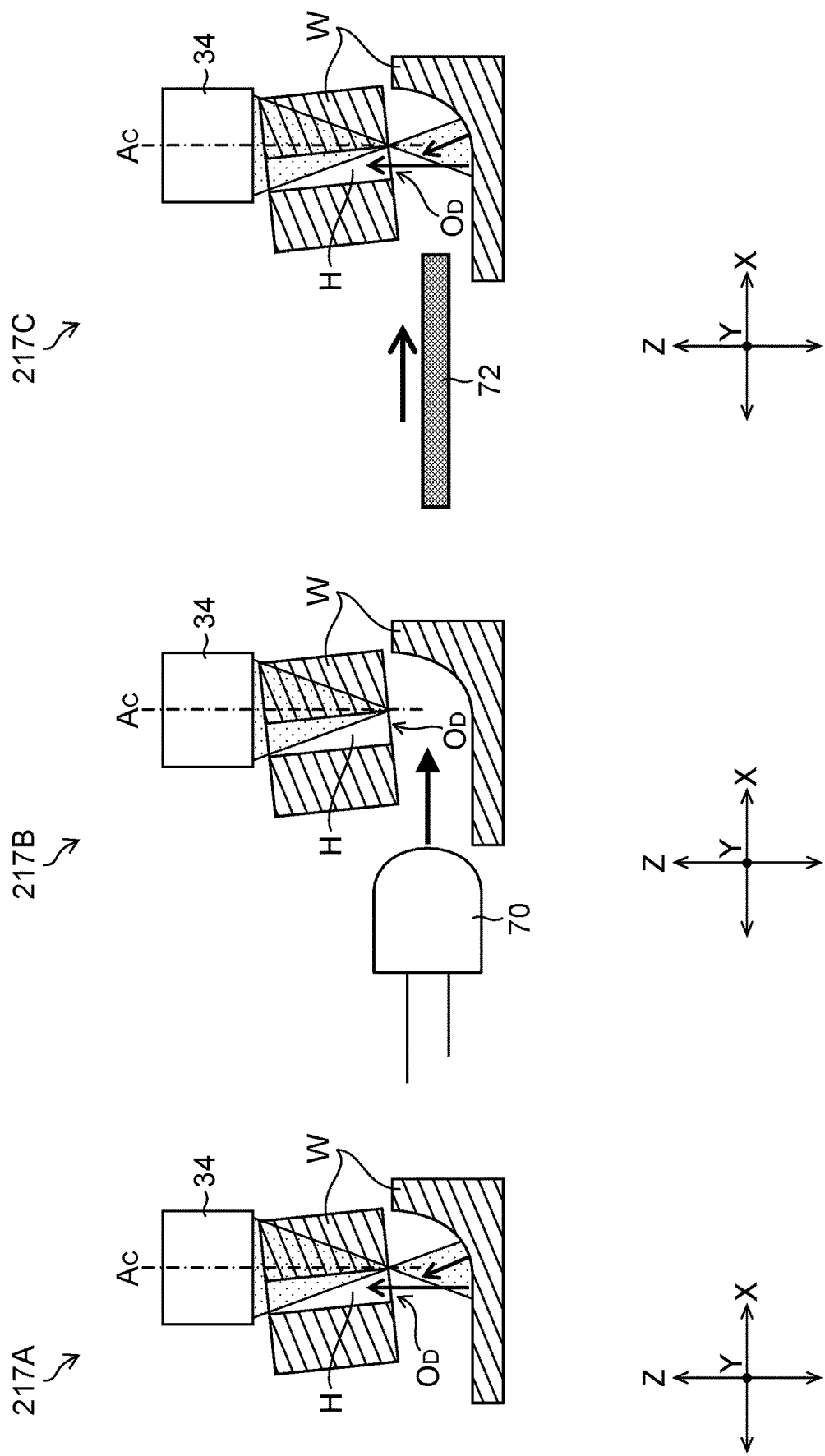
FIG. 17 is a diagram illustrating states of observing the lower opening of the small hole of the workpiece using the camera.

Depending on the shape of the workpiece W, it may be difficult to observe the lower opening O$_D$. FIG. 17 is a diagram illustrating states of observing the lower opening O$_D$ of the small hole H of the workpiece W using the camera 34. In FIG. 17, the workpiece W is illustrated in cross section. The workpiece W illustrated in FIG. 17 has a different portion of the workpiece W arranged asymmetrically with respect to the center of the lower opening O$_D$ on the lower opening O$_D$ side of the small hole H. As a result, as illustrated in 217A of FIG. 17, the lower opening O$_D$ of the workpiece W has different reflected light quantities depending on the position, making it difficult to observe the lower opening O$_D$.

Further, the workpiece W illustrated in FIG. 17 has a small space on the lower opening O$_D$ side of the small hole H. Therefore, as illustrated in 217B of FIG. 17, the space for inserting the light source 70 is insufficient, and the light source 70 cannot be arranged on the lower opening O$_D$ side.

Further, as illustrated in 217C of FIG. 17, it is possible to insert the reflector 72 on the lower opening O$_D$ side. However, the small space on the lower opening O$_D$ side requires accurate positioning. Further, the reflector 72 may collide with the workpiece W and damage the workpiece W.

For such problems, a flexible reflector may be inserted on the lower opening O$_D$ side of the small hole H of the workpiece W to increase the light quantity in observing the lower opening O$_D$.

Figure 18:
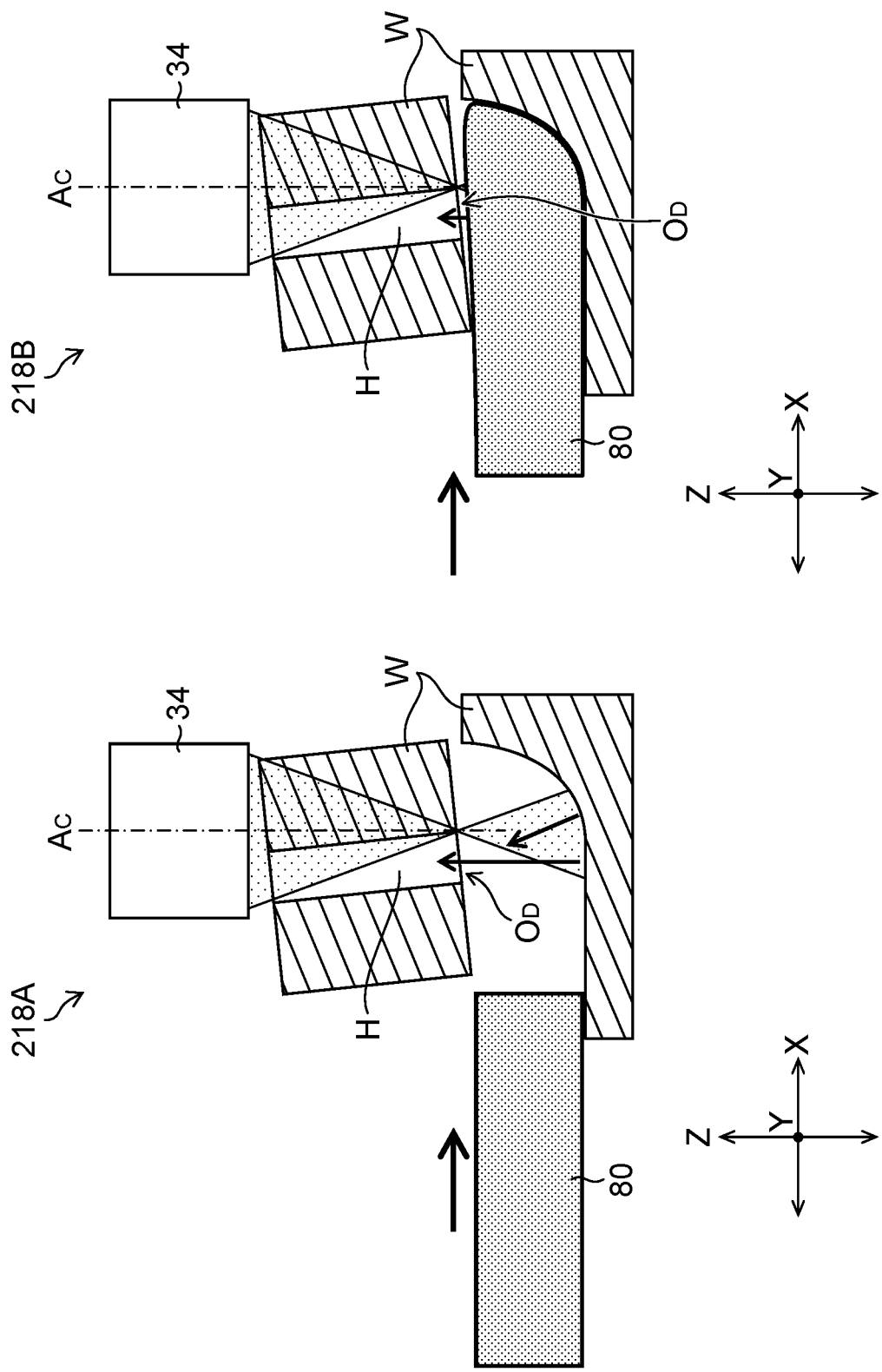
FIG. 18 is a diagram illustrating insertion of a sponge-like reflector into a lower opening side of a small hole in a workpiece.

FIG. 18 is a diagram illustrating the insertion of a sponge-like reflector 80 into the lower opening O$_D$ side of the small hole H of the workpiece W. In FIG. 18, the workpiece W is illustrated in cross section. In FIG. 18, 218A illustrates the sponge-like reflector 80 before insertion, and 218B illustrates the sponge-like reflector 80 after insertion.

The sponge-like reflector 80 is a light reflecting member having elasticity and flexibility. The sponge-like reflector 80 reflects the light, which is incident thereon from the upper opening O$_U$ of the small hole H (an example of an opening on the camera side), to the small hole H on the lower opening O$_D$ side (an example of a linear-and-tilting-motion stage side). The sponge-like reflector 80 desirably has a color such as white having a high reflectance of light. The sponge-like reflector 80 has flexibility, so that it can be inserted into a small space on the lower opening O$_D$ side.

Such a sponge-like reflector 80 is inserted into the lower opening O$_D$ side, and thereby can increase the light quantity in observing the lower opening O$_D$. This facilitates observing the lower opening O$_D$, and allows alignment with higher accuracy. Further, the sponge-like reflector 80 deforms along the shape of the workpiece W on the lower opening O$_D$ side. This does not require strict shaping or positioning, and has an effect of low cost. Further, the sponge-like reflector 80 has flexibility, so that it has an effect that there is no concern about damaging the workpiece W.

Figure 19:
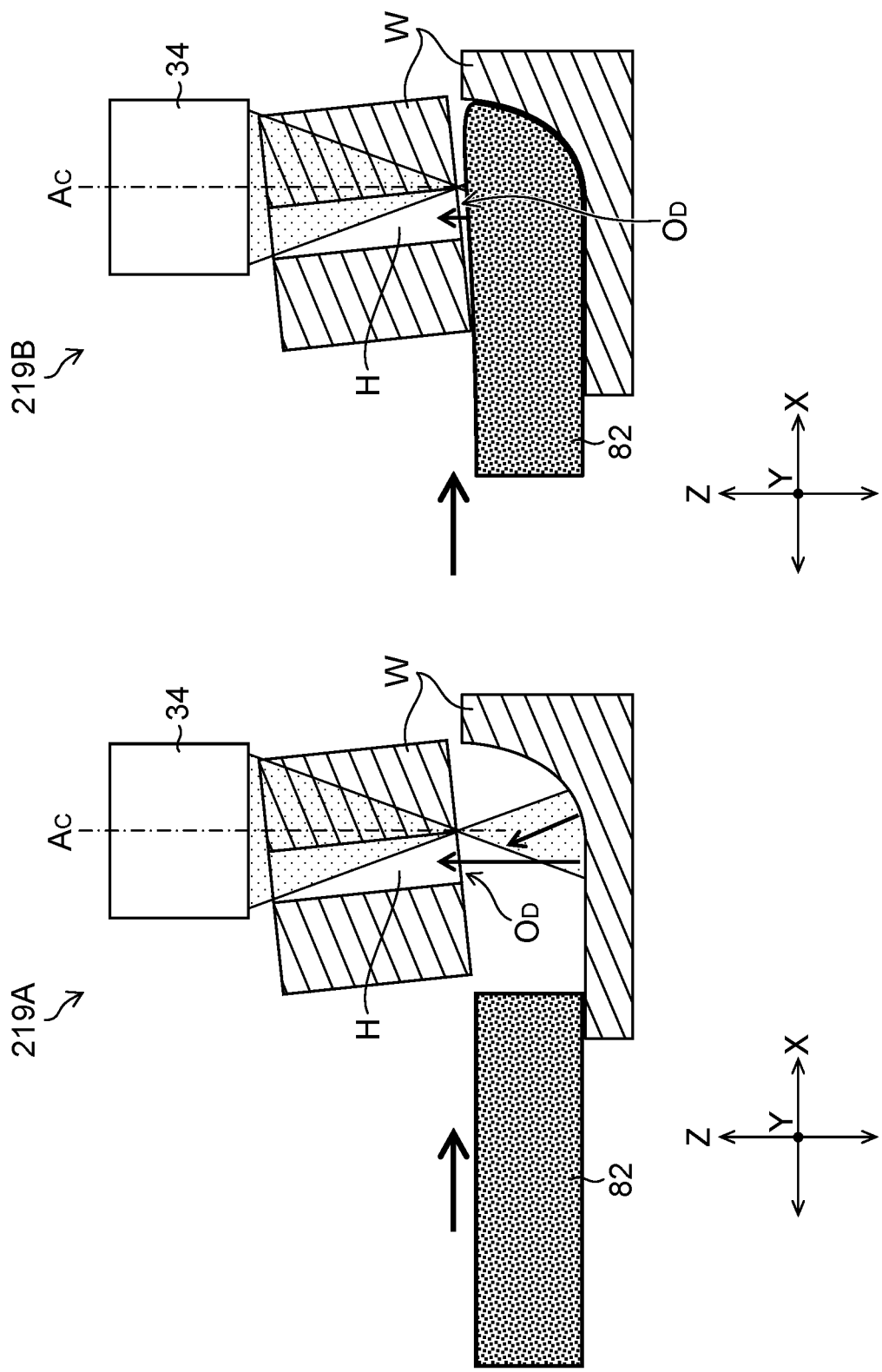
FIG. 19 is a diagram illustrating insertion of a clay-like reflector into the lower opening side of the small hole in the workpiece.

Further, FIG. 19 is a diagram illustrating insertion of a clay-like reflector 82 into the lower opening O$_D$ side of the small hole H of the workpiece W. In FIG. 19, the workpiece W is illustrated in cross section. In FIG. 19, 219A illustrates the clay-like reflector 82 before insertion, and 219B illustrates the clay-like reflector 82 after insertion.

The clay-like reflector 82 is a light reflecting member having plasticity and flexibility. The clay-like reflector 82 reflects the light, which is incident thereon from the upper opening $O_U$ of the small hole H (an example of an opening on the camera side), to the small hole H on the lower opening $O_D$ (an example of an opening on the linear-and-tilting-motion stage side). The clay-like reflector 82 desirably has a color such as white having a high reflectance of light. The clay-like reflector 82 has flexibility, so that it can be inserted into a small space on the lower opening $O_D$ side.

Such a clay-like reflector 82 is inserted into the lower opening $O_D$ side, and thereby can increase the light quantity in observing the lower opening $O_D$. This facilitates observing the lower opening $O_D$, and allows alignment with higher accuracy. Further, the clay-like reflector 82 deforms along the shape of the workpiece W on the lower opening $O_D$ side. This does not require strict shaping or positioning, and has an effect of low cost. Further, the clay-like reflector 82 has flexibility, so that it has an effect that there is no concern about damaging the workpiece W.

Further, FIG. 20 is a diagram illustrating insertion of a scatterer 84 into the lower opening $O_D$ side of the small hole H of the workpiece W. In FIG. 20, the workpiece W is illustrated in cross section. In FIG. 20, 220A illustrates the scatterer 84 before insertion, and 220B illustrates the scatterer 84 after insertion.

The scatterer 84 is a sponge having an open-cell structure having elasticity and flexibility. The scatterer 84 is arranged on the lower opening $O_D$ side of the small hole H (an example on a side opposite to the camera side). The scatterer 84 has flexibility, so that it can be inserted into a small space on the lower opening $O_D$ side. A light source 70 is attached to the scatterer 84. The light source 70 emits light incident on the scatterer 84. The light incident on the scatterer 84 from the light source 70 performs multiple scattering inside the scatterer 84 and is then incident on the lower opening $O_D$.

Arranging such a scatterer 84 on the lower opening $O_D$ side allows the scatterer 84 to form a surface light source due to multiple scattering. This can increase the light quantity in observing the lower opening $O_D$. This then facilitates observing the lower opening $O_D$, and allows alignment with higher accuracy. Further, the scatterer 84 deforms along the shape of the workpiece W on the lower opening $O_D$ side. This does not require strict shaping or positioning, and has an effect of low cost. Further, the scatterer 84 has flexibility, so that it has an effect that there is no concern about damaging the workpiece W.

Second Embodiment

<Configuration of Inner Surface Shape Measurement Device>

Figure 21:
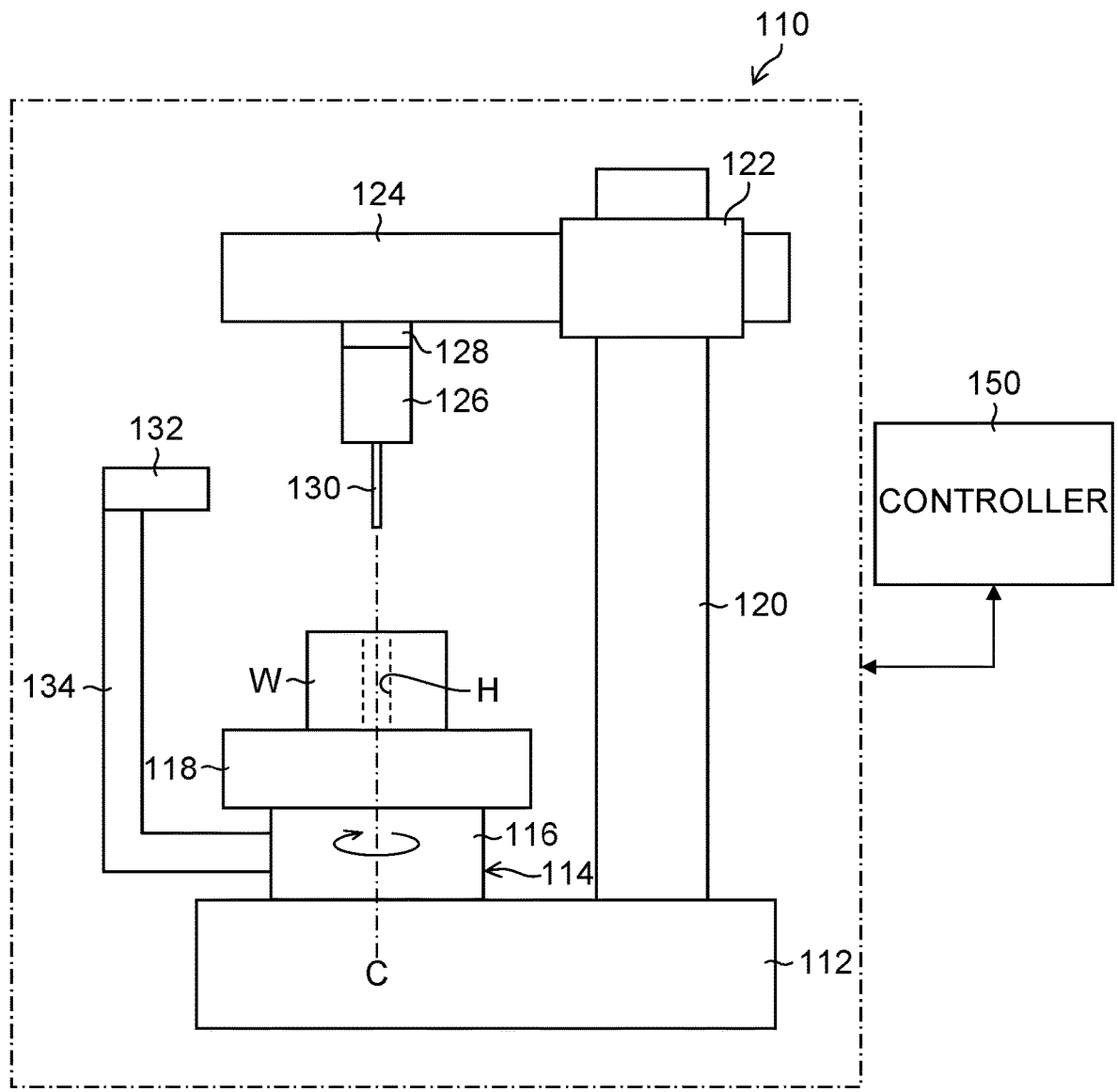
FIG. 21 is a schematic diagram illustrating an overall configuration of an inner surface shape measurement device of a second embodiment.

FIG. 21 is a schematic diagram illustrating the overall configuration of an inner surface shape measurement device 110 according to a second embodiment. The inner surface shape measurement device 110 measures the inner surface shape (roundness, etc.) of the small hole H formed in the workpiece W. In this example, the small hole H is a through hole formed along the central axis of the workpiece W. The inner diameter of the small hole H is an extremely small diameter (for example, the inner diameter is 500 μm or less). In FIG. 21, the X direction, the Y direction, and the Z direction are directions orthogonal to each other, the X direction is the horizontal direction, the Y direction is the horizontal direction orthogonal to the X direction, and the Z direction is the vertical direction.

As illustrated in FIG. 21, the inner surface shape measurement device 110 includes: a main body base 112; a high-accuracy rotation mechanism 114; a linear-and-tilting-motion stage 118; a column 120; a carriage 122; an arm 124; a displacement detector 126; a probe linear-and-tilting-motion mechanism 128; a camera 132; and a controller 150.

The high-accuracy rotation mechanism 114 is a rotation mechanism for rotating the workpiece W around the rotation axis C, and rotates the linear-and-tilting-motion stage 118, to be described below, with high accuracy around the rotation axis C parallel to the Z direction. The high-accuracy rotation mechanism 114 includes a rotating body 116 rotatably provided on the main body base 112, and the rotating body 116 has a linear-and-tilting-motion stage 118 supported on the upper surface thereof. The high-accuracy rotation mechanism 114 includes: the motor (not illustrated) for rotating the rotating body 116 with high accuracy around the rotation axis C; and an encoder (not illustrated) for detecting the rotation angle of the rotating body 116.

On the linear-and-tilting-motion stage 118, the workpiece W is placed. The linear-and-tilting-motion stage 118 may directly support and fix the workpiece W, or may support and fix the workpiece W via a workpiece installation jig (not illustrated).

The linear-and-tilting-motion stage 118 is supported on the support surface (upper surface) of the rotating body 116, and is configured to be rotatable around the rotation axis C integrally with the rotating body 116. As a result, the workpiece W supported by and fixed to the linear-and-tilting-motion stage 118 is rotatable around the rotation axis C integrally with the linear-and-tilting-motion stage 118. Note that the linear-and-tilting-motion stage 118 and the rotating body 116 are an example of "workpiece rotation unit configured to rotate a workpiece around a rotation axis".

The linear-and-tilting-motion stage 118 includes a linear-motion mechanism (centering mechanism) and a tilting-motion mechanism (tilting mechanism) (both not illustrated). The linear-motion mechanism drives a motor (not illustrated) to move the linear-and-tilting-motion stage 118 in the X and Y directions, and adjusts the position of the linear-and-tilting-motion stage 118 in the XY plane (horizontal plane) orthogonal to the rotation axis C. The tilting-motion mechanism drives a motor (not illustrated) to rotate the linear-and-tilting-motion stage 118 around the X and Y directions to adjust the tilt of the linear-and-tilting-motion stage 118 with respect to the XY plane. Thus, the linear-motion mechanism and the tilting-motion mechanism is used to adjust the position and tilt of the linear-and-tilting-motion stage 118 in the horizontal direction (X direction and Y direction). This adjustment allows eccentricity correction (centering adjustment) and tilt correction (tilting adjustment) of the central axis of the workpiece W with respect to the rotation axis C.

A column (post) 120 extending parallel to the Z direction is erected on the main body base 112. The lower end portion of the column 120 is fixed to the upper surface of the main body base 112.

The carriage 122 is supported by the column 120 so as to be movable in the Z direction. The carriage 122 is configured to be movable in the Z direction by being driven by a motor (not illustrated).

The arm 124 is supported by the carriage 122 so as to be movable in the X direction. The arm 124 is configured to be movable in the X direction by being driven by a motor (not illustrated).

The displacement detector 126 is supported by the arm 124 via the probe linear-and-tilting-motion mechanism 128. The displacement detector 126 has a long and thin probe 130 that can be inserted into the small hole H of the workpiece W. The probe 130 detects the shape of the inner surface (surface to be measured) of the small hole H of the workpiece W in a state of being inserted into the small hole H of the workpiece W. The probe 130 to be used is preferably a non-contact probe that detects the inner surface shape without contacting the inner surface of the small hole H of the workpiece W.

The non-contact probe is not particularly limited as long as it can detect the inner surface shape without contacting the inner surface of the small hole H of the workpiece W. The non-contact probe to be used may be probes to which various techniques are applied, for example: a laser interferometer; a white interferometer; an SD-OCT (Spectral Domain-Optical Coherence Tomography); and an SS-OCT (Swept Source-Optical Coherence Tomography).

Note that the probe 130 is not limited to a non-contact probe, and may be a contact probe. The contact probe has a contactor that can contact the inner surface of the small hole H of the workpiece W. The contact probe detects the displacement of the contactor when it comes into contact with the inner surface of the small hole H of the workpiece W, and thereby detects the inner surface shape. The contact probe to be used may be probes to which various techniques are applied, for example: a LVDT (Linear Variable Differential Transformer); an interferometer; an optical triangulation method; and a thin film strain measurement. Further, a method may be applied in which the method uses the following fact: when the contactor of the contact probe is vibrated at the resonance frequency, a contact changes the resonance point.

Generally, the non-contact probe is more suitable for reducing the diameter than the contact probe. So, the non-contact probe is suitable for measuring the inner surface shape of the small hole H having an extremely small diameter as in the present embodiment.

The probe linear-and-tilting-motion mechanism 128 is provided between the arm 124 and the displacement detector 126. The probe linear-and-tilting-motion mechanism 128 includes a linear-motion mechanism and a tilting-motion mechanism (both not illustrated). The linear-motion mechanism drives a motor (not illustrated) to move the displacement detector 126 in the X and Y directions to adjust the position of the probe 130 in the XY plane (horizontal plane) orthogonal to the rotation axis C. The tilting-motion mechanism rotates the displacement detector 126 around the X and Y directions using a drive motor (not illustrated) to adjust the tilt of the probe 130 with respect to the XY plane. Therefore, the probe linear-and-tilting-motion mechanism 128 (linear-motion mechanism and tilting-motion mechanism) adjusts the position of the probe 130 in the horizontal direction (X and Y directions), and tilt thereof. Thereby, the probe linear-and-tilting-motion mechanism 128 can perform relative position adjustment (probe alignment) between the probe 130 and the rotation axis C. The probe linear-and-tilting-motion mechanism 128 is an example of "adjustment unit". The probe alignment, which is a feature of the present invention, is described below.

The camera 132 is an area sensor camera (two-dimensional sensor camera) such as a CCD (Charge Coupled Device) camera. The camera 132 is connected (supported) to the rotating body 116 via the camera bracket 134. The camera 132 is arranged so that its imaging direction is orthogonal to the rotation axis C and faces the rotation axis C side (rotation center side). Further, the camera 132 is adjusted so that the focal point thereof is aligned with the rotation axis C. This enables the camera 132 to rotate around the rotation axis C integrally with the rotating body 116. This also enables the camera 132 to image the probe 130 at any imaging position (circumferential position) on the rotation trajectory K centered on the rotation axis C (see FIG. 24). Here, the power supply to the camera 132 to be applied can be a known method such as a slip ring or wireless power supply. The camera 132 is an example of "acquisition unit", and the image taken by the camera 132 is an example of "probe posture information".

<Controller>

The controller 150 controls operation of each part of the inner surface shape measurement device 110 (including operation of measuring the inner surface shape of the workpiece W and operation of aligning the probe to be described below). The controller 150 is implemented by a general-purpose computer such as a personal computer or a microcomputer. The controller 150 includes a CPU (Central Processing Unit), a ROM (Read Only Memory), a RAM (Random Access Memory), and an input/output interface. The controller 150 expands various programs such as control programs, stored in the ROM, in the RAM, and executes the programs expanded in the RAM using the CPU. This causes each unit in the inner surface shape measurement device 110 to function, and executes various arithmetic processing and control processing via the input/output interface. Note that the controller 150 is an example of "controller".

Figure 22:
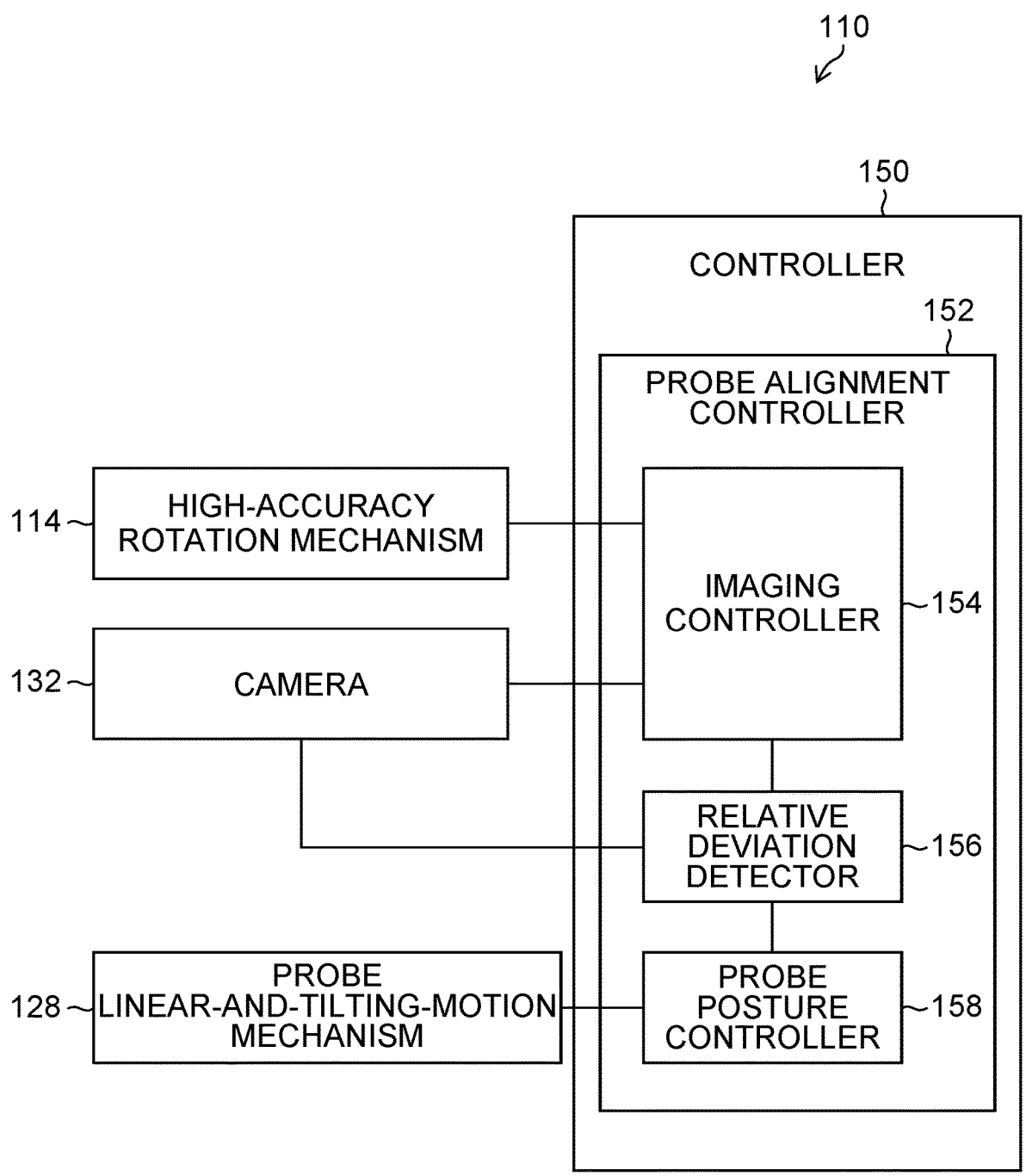
FIG. 22 is a block diagram illustrating a configuration of a controller.

FIG. 22 is a block diagram illustrating a configuration of the controller 150. Note that FIG. 22 illustrates only the configuration related to the operation of the probe alignment executed by the inner surface shape measurement device 110. Note that the controller 150 also includes a configuration related to operation of measuring the inner surface shape of the workpiece W, but the description thereof is omitted because it is not a main part of the present invention.

As illustrated in FIG. 22, the controller 150 includes a probe alignment controller 152. The probe alignment controller 152 is a functional unit that controls operation for performing relative position adjustment (probe alignment) between the probe 130 and the rotation axis C.

Here describes a configuration of the probe alignment controller 152 in detail. The probe alignment controller 152 includes an imaging controller 154, a relative deviation detector 156, and a probe posture controller 158.

The imaging controller 154 controls the high-accuracy rotation mechanism 114 to rotate the camera 132 around the rotation axis C integrally with the rotating body 116. Thereby, the imaging controller 154 changes the imaging position (circumferential position) of the camera 132 with respect to the probe 130 in the circumferential direction around the rotation axis C. This enables the camera 132 to image the probe 130 from at least three imaging positions on the rotation trajectory K of the camera 132 centered on the rotation axis C. As described below, in the present embodiment, the probe 130 is preferably imaged from four imaging positions spaced apart from each other by 90 degrees on the rotation trajectory K of the camera 132 (see FIG. 24).

Further, the imaging controller 154 controls the camera 132 that has moved to each imaging position to image the probe 130. The imaging controller 154 causes the camera 132 to transmit the image taken by it to the relative deviation detector 156.

The relative deviation detector 156 detects the relative deviation between the rotation axis C and the probe 130 based on the image acquired by the camera 132 at each imaging position. A specific detection method is described in the probe alignment to be described below.

The probe posture controller 158 controls the probe linear-and-tilting-motion mechanism 128 based on the relative deviation detected by the relative deviation detector 156. Specifically, the probe posture controller 158 controls the probe linear-and-tilting-motion mechanism 128 to adjust the position and tilt of the probe 130 to eliminate the relative deviation detected by the relative deviation detector 156. Thereby, the probe posture controller 158 performs relative position adjustment between the probe 130 and the rotation axis C.

<Probe Alignment>

The next describes the probe alignment, which is a feature of the present invention.

When the inner surface shape (roundness, etc.) of the small hole H of the workpiece W is measured using the inner surface shape measurement device 10, the probe 130 is first moved in the Z direction by the carriage 122 together with the displacement detector 126, and the probe 130 is inserted into the small hole H of the workpiece W. Then, while the workpiece W is rotated around the rotation axis C with the probe 130 inserted in the small hole H of the workpiece W, the probe 130 detects the inner surface shape of the small hole H. In this way, the inner surface shape of the small hole H of the workpiece W is measured.

Here, for inserting the probe 130 into the small hole H before the above measurement is started, the posture (position and tilt) of the probe 130 needs to be adjusted so that the probe 130 is positioned coaxially with the rotation axis C. If there is a relative deviation between the probe 130 and the rotation axis C, the probe 130 collides with a part other than the small hole H of the workpiece W when inserted into the small hole H, and has difficulty in measuring the inner surface shape of the small hole H.

Therefore, in the present embodiment, to eliminate the relative deviation between the probe 130 and the rotation axis C before the start of the measurement of the inner surface shape of the small hole H of the workpiece W, the relative position adjustment (probe alignment) between the probe 130 and the rotation axis C is performed. Note that eccentricity correction and tilt correction (work alignment) of the central axis of the workpiece W with respect to the rotation axis C has been performed by the linear-and-tilting-motion stage 118, and the central axis of the workpiece W is made coaxial with the rotation axis C. The workpiece alignment may be performed after the probe alignment or before the probe alignment. For the workpiece alignment, the method described in the first embodiment can be preferably used. Further, the workpiece alignment may use a method other than the method described in the first embodiment.

Figure 23:
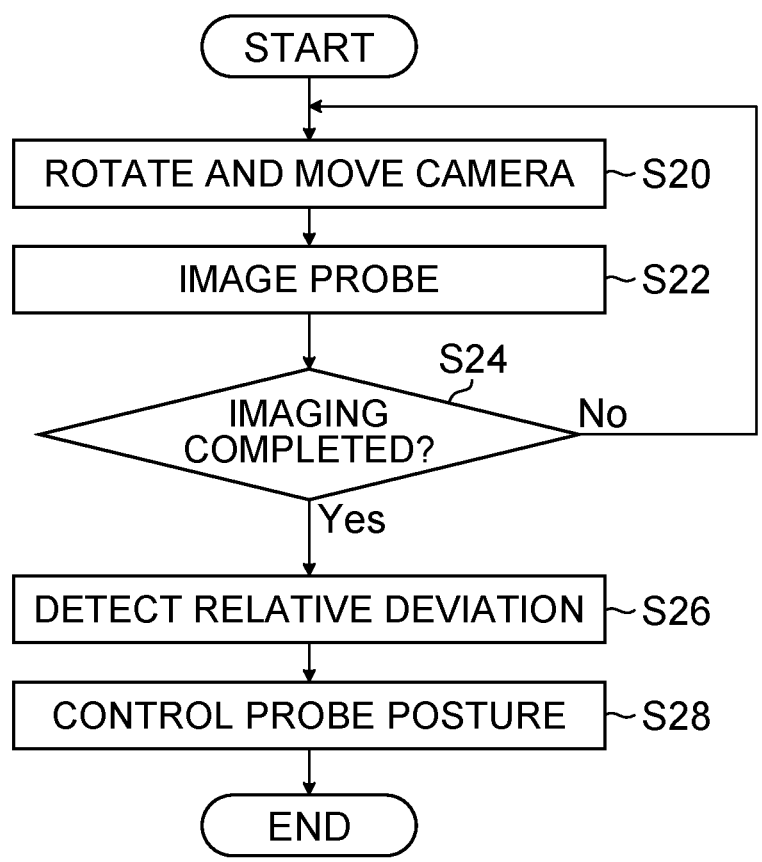
FIG. 23 is a flowchart illustrating an example of a flow of probe alignment.

FIG. 23 is a flowchart illustrating an example of the flow of probe alignment.

As illustrated in FIG. 23, when probe alignment is started, the imaging controller 154 first controls the high-accuracy rotation mechanism 114 to rotate and move the camera 132 around the rotation axis C integrally with the rotating body 116 (step S20). Then, when the camera 132 moves to a predetermined imaging position on the rotation trajectory K of the camera 132 centered on the rotation axis C, the camera 132 images the probe 130 at the imaging position (step S22, an example of "acquisition step").

Next, a determination is made on whether the imaging at all imaging positions has completed (step S24). When the determination is that the imaging has not completed at all the imaging positions (No in step S24), the rotation movement of the camera 132 (step S10) and the imaging of the probe 130 using the camera 132 (step S22) are repeated until the determination becomes that the imaging at all the imaging positions has completed. Here, whether the camera 132 has moved to each imaging position can be determined based on the output of the encoder provided in the high-accuracy rotation mechanism 114. Not only the encoder but also any other configuration can be applied as long as it can determine whether the camera 132 has moved to each imaging position.

Figure 24:
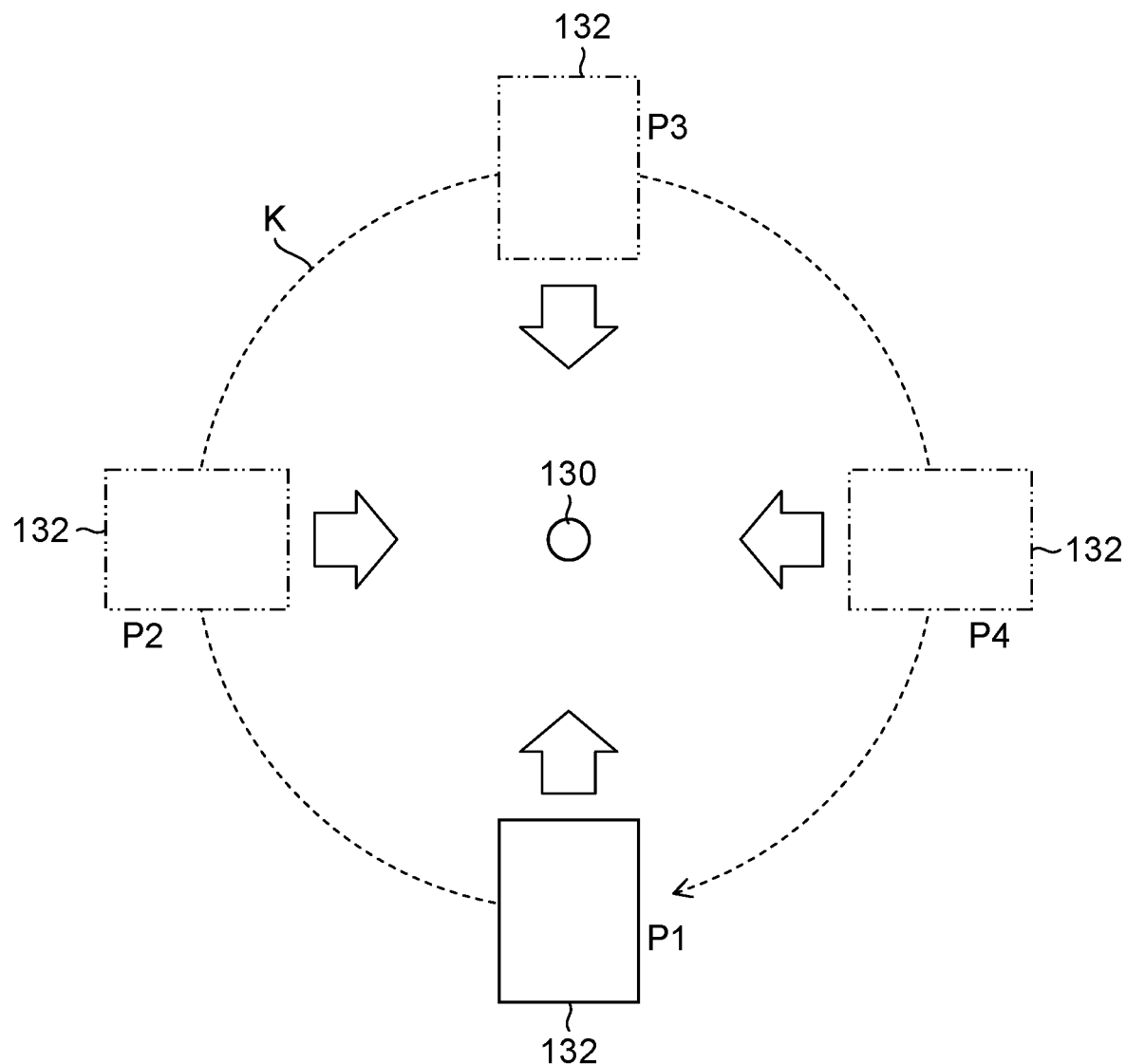
FIG. 24 is a diagram illustrating an example of a position of imaging a probe using a camera.

FIG. 24 is a diagram illustrating an example of the imaging position where the probe 130 is imaged by the camera 132. As illustrated in FIG. 24, in the probe alignment of the present embodiment, while the camera 132 is rotated and moved around the rotation axis C by the rotational movement of the rotating body 116, the camera 132 images the probe 130 at a predetermined imaging position (circumferential position) on the rotation trajectory K of the camera 132 around the rotation axis C of the rotating body 116. Specifically, the camera 132 images the probe 130 at four imaging positions P1 to P4 spaced from each other by 90 degrees on the rotation trajectory K of the camera 132 centered on the rotation axis C.

A planar (XY plane) positional relationship between the four imaging positions P1 to P4 is such that there are two directions orthogonal to each other. Of those, in a first direction (Y direction), a first imaging position P1 and a third imaging position P3 face each other. In turn, a second imaging position P2 and a fourth imaging position P4 face each other in a second direction (X direction).

In the present embodiment, the direction in which the camera 132 images the probe 130 from the four imaging positions P1 to P4 is either of the X direction and the Y direction. They are the same direction as the control direction (movement axis direction) in which probe linear-and-tilting-motion mechanism 128 gives linear motion or tilting motion to the probe 30.

Note that the present embodiment illustrates, as one of the preferable aspects, an aspect in which the first direction (Y direction) and the second direction (X direction) are aligned with the control direction of the probe linear-and-tilting-motion mechanism 128. Here, in the first direction, the first imaging position P1 and the third imaging position P3 face each other, and in the second direction, the second imaging position P2 and the fourth imaging position P4 face each other. However, the present invention is not necessarily limited to this aspect. For example, the directions may be different from the control direction of the probe linear-and-tilting-motion mechanism 128, or the first direction and the second direction does not need to be orthogonal to each other. However, the present embodiment makes it possible to detect the relative deviation between the probe 130 and the rotation axis C in a simple and easy manner, independently in each direction, which is preferable.

Returning to FIG. 23, when the determination is that the imaging in which the probe 130 is imaged by the camera 132 has completed at all the imaging positions (Yes in step S24), the relative deviation detector 156 detects the relative deviation between the probe 130 and the rotation axis C based on the image taken by the camera 132 at each imaging position (step S26).

Here describes the detection of the relative deviation between the probe 130 and the rotation axis C in detail.

FIG. 25 is a diagram illustrating an example of images taken by the camera 132 at respective imaging positions P1 to P4. In FIG. 25, the first image 100A is an image taken at the first imaging position P1, the second image 100B at the second imaging position P2, the third image 100C at the third imaging position P3, the fourth image 100D at the fourth imaging position P4.

If there is a relative deviation between the probe 130 and the rotation axis C, as illustrated in FIG. 25, the images 100A to 100D taken by the camera 132 at respective imaging positions P1 to P4 have different postures (positions and tilts) of the probe 130, depending on the difference in the imaging position (that is, the imaging direction in which the probe 130 is imaged by the camera 132).

For example, there are two imaging positions (the first imaging position P1 and third imaging position P3) facing each other in the first direction (Y direction). Of them, one imaging position (first imaging position P1) has the first image 100A taken therefrom. In the first image 100A, the probe 130A has a tilt to one side in the second direction (X direction). Of the above two directions, the other imaging position (third imaging position P3) has the third image 100C taken therefrom. In the third image 100C, the probe 130C has a tilt to the other side in the second direction (X direction). Further, the positions in the second direction (X direction) also deviate toward sides opposite to each other.

The same applies to the second image 100B and the fourth image 100D respectively at the two imaging positions (second imaging position P2 and fourth imaging position P4) facing each other in the second direction (X direction), and the positions and tilts of the probes 130B and 130D deviate toward sides opposite to each other.

Figure 26:
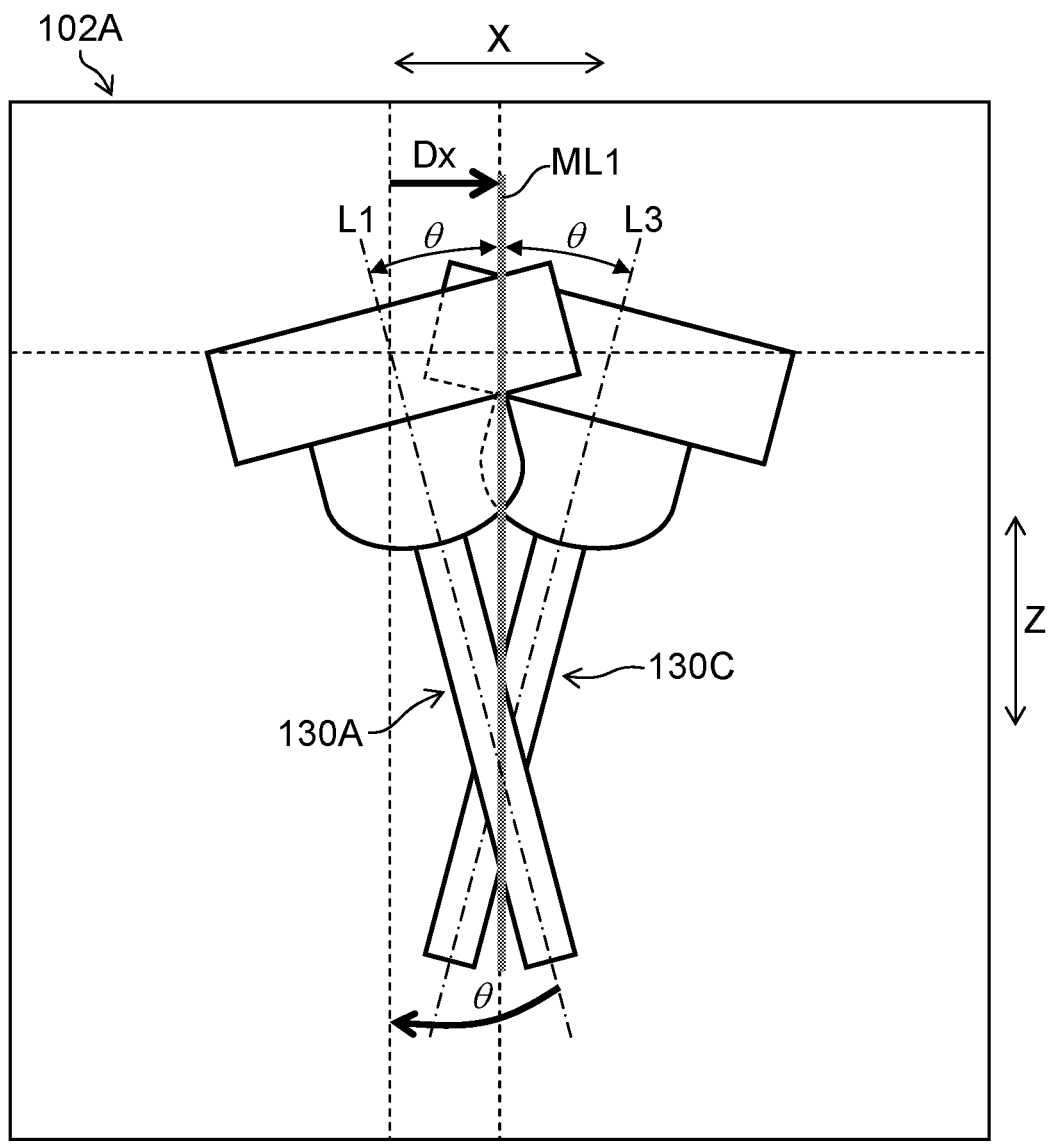
FIG. 26 is a diagram illustrating a composite image of a first image and a third image.

FIG. 26 is a diagram illustrating a first composite image 102A. The first composite image 102A is a composite of: the first image 100A; and the third image 100C, respectively taken from two imaging positions (first imaging position P1 and third imaging position P3) facing each other in the first direction (Y direction).

As illustrated in FIG. 26, the first composite image 102A, which is a composite of the first image 100A and the third image 100C, has: a central axis (first probe central axis) L1 of the probe 130A in the first image 100A; and a central axis (third probe central axis) L3 of the probe 130C in the third image 100C. A first midline ML1 between these central axes illustrates the position of the rotation axis C in the XZ plane (that is, the position of the rotation axis C when the probe 30 is viewed from the first direction (Y direction)). Note that the first midline ML1 is a straight line passing through the center of the first probe central axis L1 and the third probe central axis L3 in the horizontal direction (X direction), in the vertical direction (Z direction) in the first composite image 102A. In other words, in the first composite image 102A, the first midline ML1 is the straight line that divides the space between the first probe central axis L1 and the third probe central axis L3 into two equal parts in the left and right (X direction).

The first midline ML1 in the first composite image 102A indicates the position of the rotation axis C. Specifically, the first midline ML1 indicates a line that is a movement target of the probe 130 is in the first composite image 102A (in the XZ plane). Therefore, when the posture (position and tilt) of the probe 130 is adjusted so that the probe 130 is aligned with the first midline ML1, the relative deviation between the rotation axis C and the probe 130 can be eliminated in the XZ plane.

Figure 27:
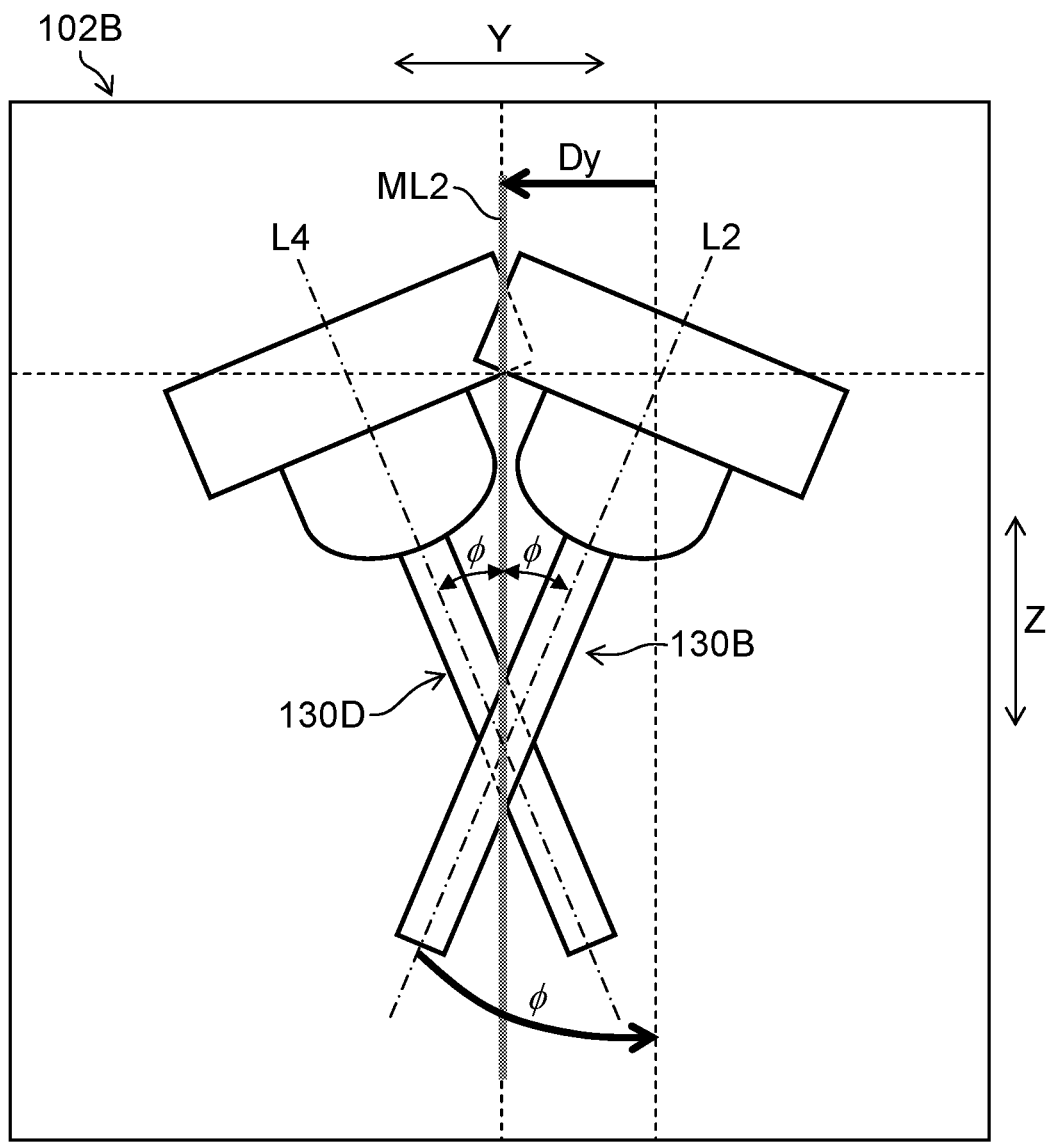
FIG. 27 is a diagram illustrating a composite image of a second image and a fourth image.

FIG. 27 is a diagram illustrating a composite image 102B. The composite image 102B is a composite of: the second image 100B; and the fourth image 100D, respectively taken from two imaging positions (second imaging position P2 and fourth imaging position P4) facing each other in the second direction (X direction).

As illustrated in FIG. 27, the second composite image 102B, which is a composite of the second image 100B and the fourth image 100D, has: a central axis (second probe central axis) L2 of the probe 130B in the second image 100B; and a central axis (fourth probe central axis) L4 of the probe 130D in the fourth image 100D. A second midline ML2 between these central axes illustrates the position of the rotation axis C in the YZ plane (that is, the position of the rotation axis C when the probe 130 is viewed from the second direction (X direction)). Note that the second midline ML2 is a straight line passing through the center of the second probe central axis L2 and the fourth Probe central axis L4 in the horizontal direction (X direction), in the vertical direction (Z direction) in the second composite image 102B. In other words, in the second composite image 102B, the second midline ML2 is the straight line that divides the space between the second probe central axis L2 and the fourth probe central axis L4 into two equal parts in the left and right (X direction).

The second midline ML2 in the second composite image 102B indicates the position of the rotation axis C. Specifically, the second midline ML2 indicates a line that is a movement target of the probe 130 in the second composite image 102B (in the YZ plane). Therefore, when the posture (position and tilt) of the probe 130 is adjusted so that the probe 130 is aligned with the second midline ML2, the relative deviation between the rotation axis C and the probe 130 can be eliminated in the YZ plane.

Based on the images taken by the camera 132 at the four imaging positions P1 to P4, which are spaced apart from each other by 90 degrees on the rotation trajectory K of the camera 132 centered on the rotation axis C, the two midlines ML1 and ML2 described above are thus calculated, and thereby the rotation axis C (rotation center), which is the movement target of the probe 130, can be detected. This makes it possible to adjust the relative deviation between the rotation axis C and the probe 130 independently in each direction (X direction and Y direction).

In the probe alignment of the present embodiment, the relative deviation detector 156 determines one of the two probes 130 to be a reference probe (in this example, the probe 130A in the first image 100A) in the first composite image 102A illustrated in FIG. 26. At this time, the relative deviation detector 156 detects a tilt angle (rotation angle centered on the Y direction), for making the probe central axis of the reference probe parallel to the first midline ML1, as a tilting-motion-movement amount $\theta$. Then, when the probe central axis of the reference probe is tilted by the tilting-motion-movement amount $\theta$ to be parallel to the first midline ML1, the relative deviation detector 156 detects the movement distance in the X direction required to align the probe central axis of the reference probe with the first midline ML1, as a linear-motion-movement amount Dx. Here, the linear-motion-movement amount Dx corresponds to the distance in the direction along the movement axis in the X direction in the probe linear-and-tilting-motion mechanism 128 (see FIG. 26).

Further, the relative deviation detector 156 determines one of the two probes 130 to be a reference probe (in this example, the probe 130B in the second image 100B) in the second composite image 102B illustrated in FIG. 27. At this time, the relative deviation detector 156 detects a tilt angle (rotation angle centered on the X direction) for making the probe central axis of the reference probe parallel to the second midline ML2, as a tilting-motion-movement amount $\phi$. Then, when the probe central axis of the reference probe is tilted by the tilting-motion-movement amount $\phi$ to be parallel to the second midline ML2, the relative deviation detector 156 detects the movement distance in the Y direction required to align the probe central axis of the reference probe with the second midline ML2, as a linear-motion-movement amount Dy. Here, the linear-motion-movement amount Dy corresponds to the distance in the direction along the movement axis in the Y direction in the probe linear-and-tilting-motion mechanism 128 (see FIG. 27).

In addition, the relative deviation detector 156 can use known image processing such as edge extraction, to calculate the probe central axes C1 to C4, the midlines ML1 and ML2, the linear-motion-movement amounts Dx and Dy, and the tilting-motion-movement amounts θ and φ from the respective composite images 102A and 102B.

In this way, when the relative deviation detector 156 detects the relative deviation between the probe 130 and the rotation axis C independently in each direction based on the image taken by the camera 132 at each imaging position (step S26), the probe posture controller 158 controls the probe linear-and-tilting-motion mechanism 128 based on the result detected by the relative deviation detector 156. Specifically, the probe posture controller 158 controls the probe linear-and-tilting-motion mechanism 128 to: move the probe 130 by the linear-motion-movement amount Dx in the X direction, and move it by the linear-motion-movement amount Dy in the Y direction; and tilt the probe 130 by the tilting-motion-movement amount φ around the X direction, and tilt it by the tilting-motion-movement amount θ around the Y direction (step S28, an example of "adjustment step"). Further, the direction (orientation) in which the probe linear-and-tilting-motion mechanism 128 is moved or tilted is determined according to which probe is used as the reference probe in the composite image 102A or 102B illustrated in FIG. 26 or FIG. 27.

As described above, the probe posture controller 158 controls the probe linear-and-tilting-motion mechanism 128 to change the posture of the probe 130 based on the result detected by the relative deviation detector 156. This eliminates the relative deviation between the probe 130 and the rotation axis C in the three-dimensional space. This is the end of this flowchart.

<Effect>

The probe alignment in the present embodiment makes it possible to detect the relative deviation between the probe 130 and the rotation axis C independently in each direction (X direction and Y direction), based on the four images 100A to 100D in which the camera 132 images the probe 130 at four imaging positions P1 to P4 spaced from each other by 90 degrees on the rotation trajectory K of the camera 132 centered on the rotation axis C of the rotating body 116. This allows the probe linear-and-tilting-motion mechanism 128 to control the posture (position and tilt) of the probe 130 independently in each direction. This also can eliminate the relative deviation between the probe 130 and the rotation axis C with higher accuracy. Therefore, for example, if the small hole H of the workpiece W is an extremely small diameter hole having an inner diameter of about 140 μm and the probe 130 is an extremely small diameter probe having an outer diameter of about 80 μm, probe alignment can be performed accurately and easily. This prevents the probe 130 from colliding with a portion of the workpiece W other than the small hole H, and makes it possible to measure the inner surface shape of the small hole H stably and reliably.

In addition, according to the probe alignment of the present embodiment, the images are taken from a plurality of different directions using the camera 132, which rotates and moves integrally with the rotating body 116. The images are relatively compared, and thereby the position of the rotation axis C (rotation center) is detected which is the movement target of the probe 130. Therefore, if the camera 132 is attached to the camera bracket 134, for example, with a positional deviation in a predetermined direction, creating a deviation in the relative positional relationship between the camera 132 and the rotation axis C, the relative position adjustment between the probe 130 and the rotation axis C can be performed with high accuracy, and no accuracy is required in attaching the camera 132.

Further, in the probe alignment of the present embodiment, the image is taken while the relative position between the camera 132 and the probe 130 is changed in the circumferential direction around the rotation axis C. Therefore, if the position of the rotation axis C is unclear or the rotation axis C tilts, the relative position adjustment between the probe 130 and the rotation axis C can be performed accurately from the images taken by the camera 132 at the respective imaging positions P1 to P4.

<Modification>

Figure 28:
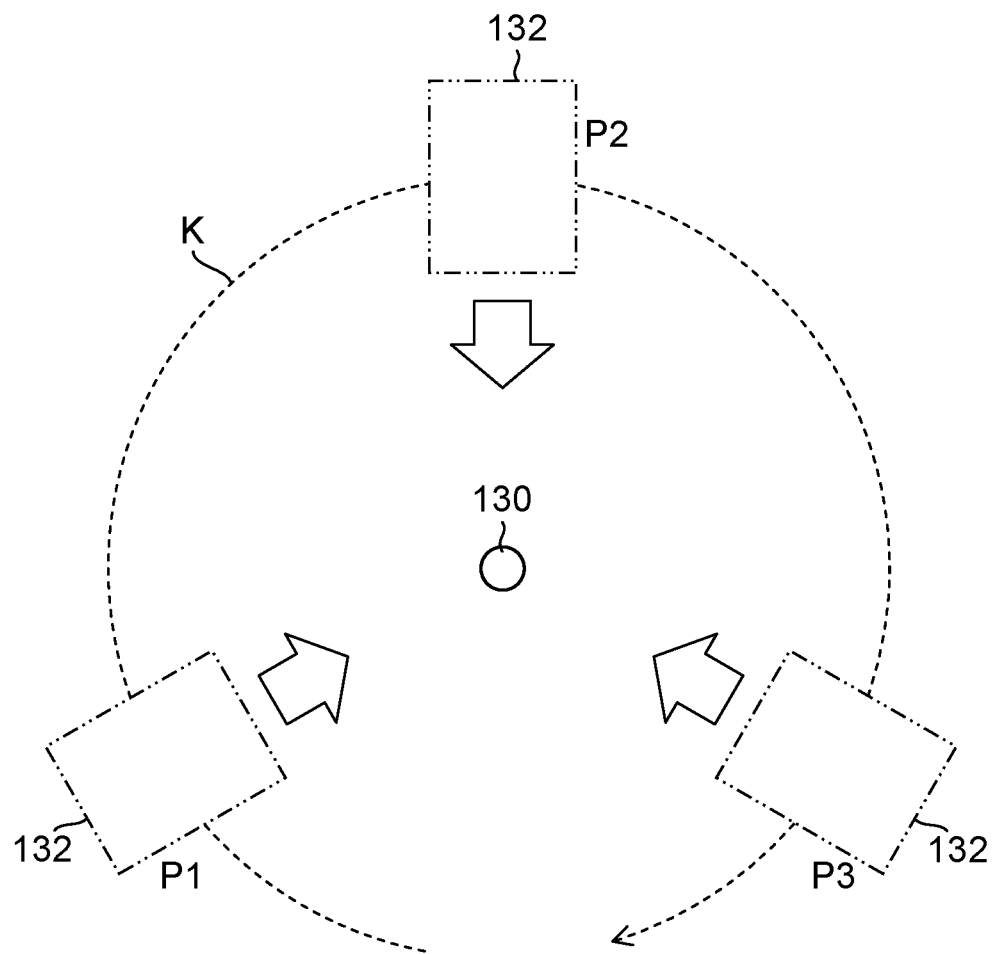
FIG. 28 is a diagram illustrating another example of a position of imaging the probe using the camera.

In the probe alignment of the present embodiment, based on the four images 100A to 100D in which the camera 132 images the probe 130 at four imaging positions P1 to P4 spaced from each other by 90 degrees on the rotation trajectory K of the camera 132 centered on the rotation axis C of the rotating body 116, the relative deviation between the probe 130 and the rotation axis C is detected independently in the respective directions. However, the present invention is not limited to this. For example, as illustrated in FIG. 28, the probe 130 may be imaged by the camera 132 from at least three imaging positions on the rotation trajectory K of the camera 132 around the rotation axis C of the rotating body 116.

In other words, if the relative deviation between the probe 130 and the rotation axis C can be detected independently in the respective directions, the probe 130 may be imaged by the camera 132 from at least three directions around the rotation axis C. In this case, the images taken by the camera 132 at the respective imaging positions should be relatively compared using the relationship with the positional information (rotation angle, radius of rotation, etc.) related to the respective imaging positions. This makes it possible to detect the relative deviation between the probe 130 and the rotation axis C independently in each direction. This then allows the probe linear-and-tilting-motion mechanism 128 to independently control the posture of the probe 130 in the respective directions, based on the detected relative deviation. This can eliminate the relative deviation between the probe 130 and the rotation axis C.

Figure 29:
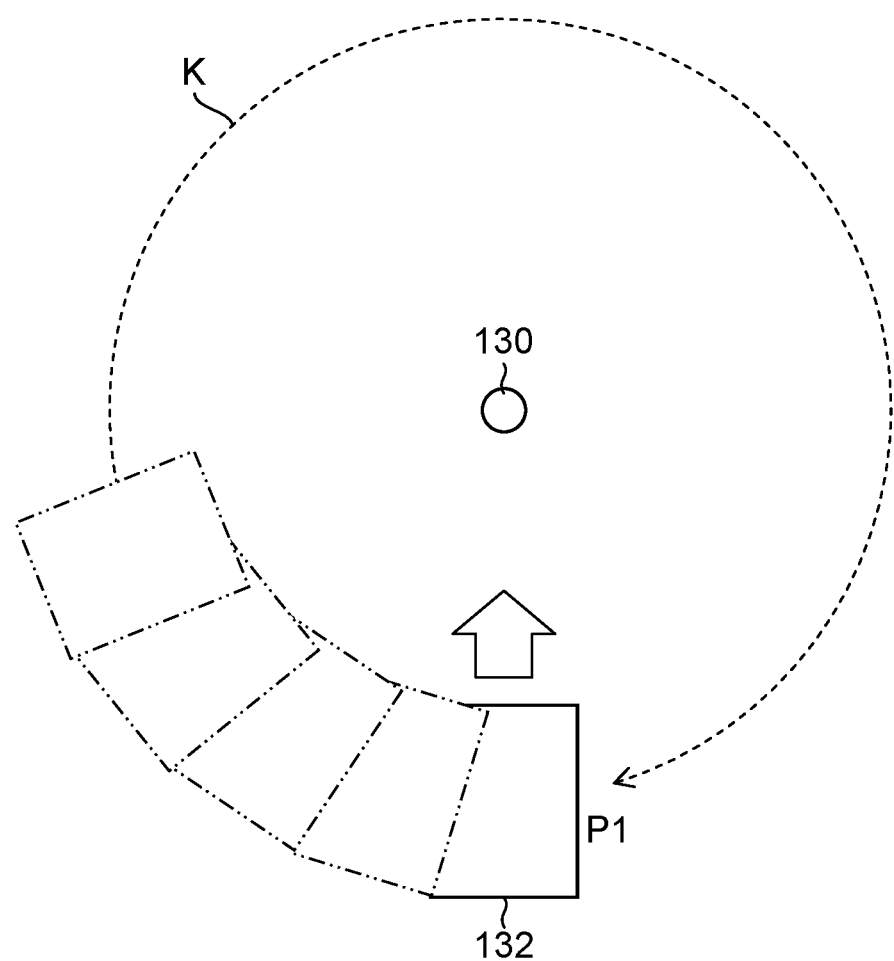
FIG. 29 is a diagram illustrating still another example of a position of imaging the probe using the camera.

Further, as illustrated in FIG. 29, the camera 132 may continuously image the probe 130 at regular imaging intervals while the camera 132 is rotated by rotational movement of the rotating body 116. In this case, many images can be used, so that probe alignment can be performed with high accuracy. Further, the probe 130 is continuously imaged while the camera 132 rotates and moves, so that the range in which the camera 132 rotates and moves can be limited to a partial range. This also makes it possible to perform probe alignment efficiently in a shorter time.

Note that, in the present embodiment, the camera 132 is configured to be attached to the rotating body 116 via the camera bracket 134. However, the present invention is not limited to this. Any configuration can be used as appropriate if the configuration is at least such that the camera 132 is rotatable around the rotation axis C to be a target of position adjustment with the probe 130.

Third Embodiment

Figure 30:
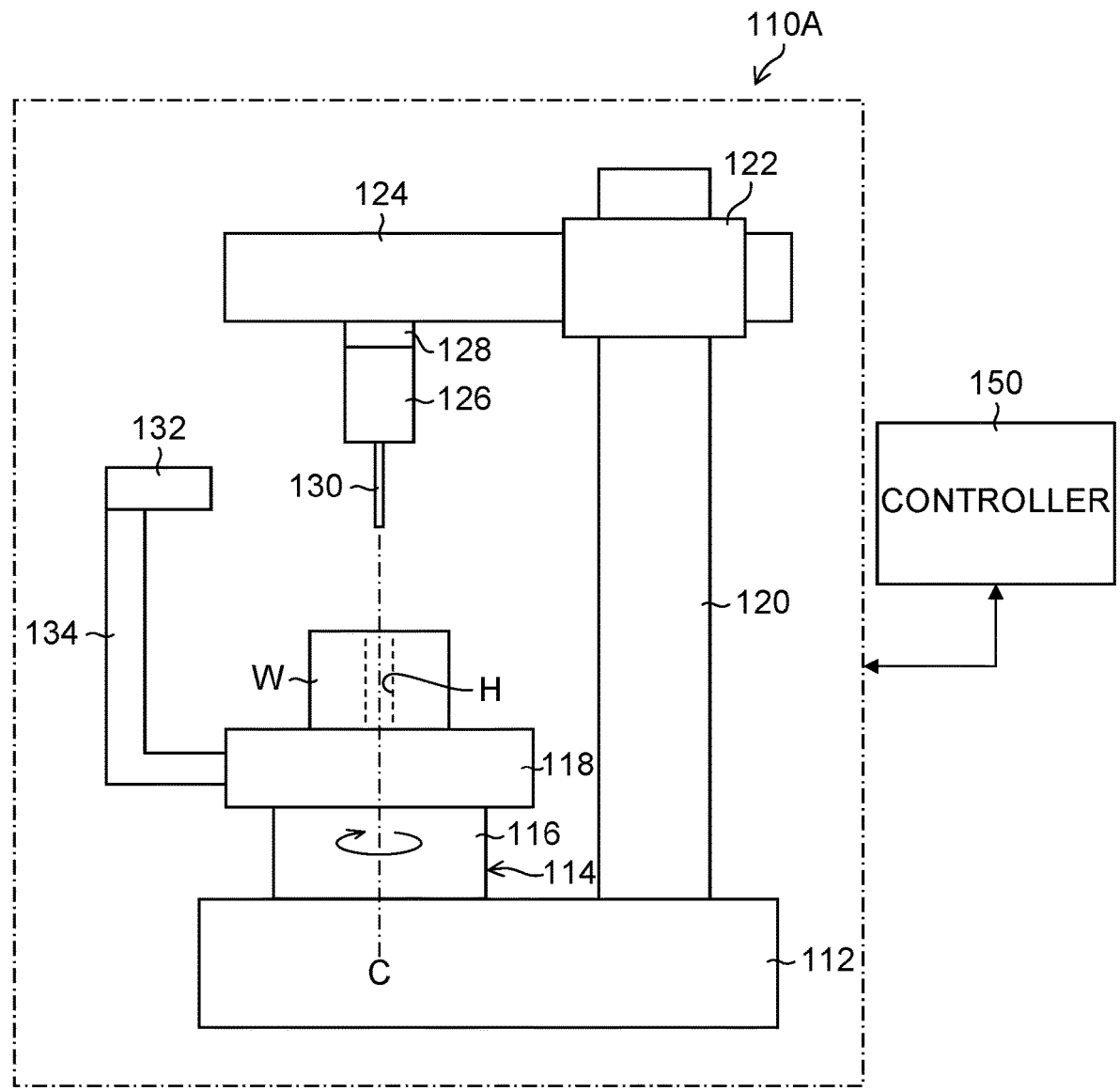
FIG. 30 is a schematic diagram illustrating an overall configuration of an inner surface shape measurement device of a third embodiment.

FIG. 30 is a schematic diagram illustrating a configuration of an inner surface shape measurement device 110A according to a third embodiment. As illustrated in FIG. 30, in the inner surface shape measurement device 110A of the third embodiment, the camera 132 is attached to the linear-and-tilting-motion stage 118 via the camera bracket 134. The imaging direction of the camera 132 is the same as that of the second embodiment described above, and faces the rotation axis C side (probe 130 side), which is the rotation center. Further, the focal point of the camera 132 is adjusted so as to be aligned with the rotation axis C, and the probe 130 arranged near the rotation axis C can be imaged. Also in the third embodiment, the camera 132 can rotate around the rotation axis C integrally with the rotating body 116, and probe alignment can be performed in the same manner as in the second embodiment described above.

Fourth Embodiment

Figure 31:
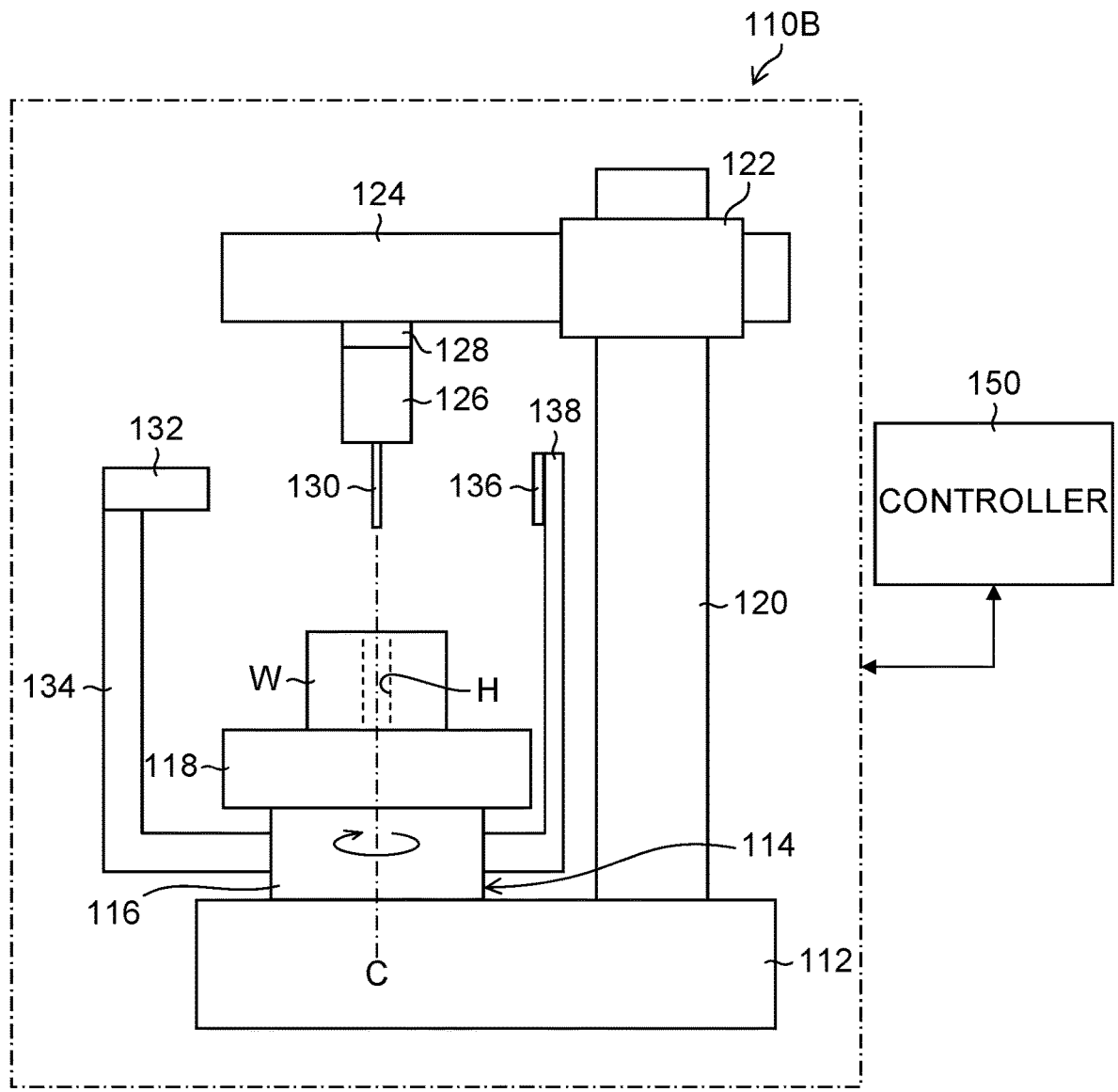
FIG. 31 is a schematic diagram illustrating an overall configuration of an inner surface shape measurement device of a fourth embodiment.

FIG. 31 is a schematic diagram illustrating a configuration of an inner surface shape measurement device 110B according to a fourth embodiment. As illustrated in FIG. 31, in addition to the configuration of the inner surface shape measurement device 110 of the second embodiment, the inner surface shape measurement device 110B of the fourth embodiment includes a lighting device 136 at a position facing the camera 132 with the rotation axis C in between.

The lighting device 136 is attached to the rotating body 116 via a bracket for the lighting device 138, and can rotate around the rotation axis C integrally with the rotating body 116. The lighting device 136 is a surface-emitting lighting device capable of surface emission. Note that the lighting device 136 is an example of "surface-emitting lighting unit".

According to the fourth embodiment, when the camera 132 images the probe 130 while the camera 132 rotates around the rotation axis C integrally with the rotating body 116, the lighting device 136 rotates around the rotation axis C integrally with the rotating body 116 at a position facing the camera 132. Thus, the probe 130 is imaged by the camera 132 while the relative positional relationship between the camera 132 and the lighting device 136 is maintained. This makes it possible to image the probe 130 under the same lighting conditions regardless of the imaging position of the camera 132. This makes it possible to prevent decrease in detection accuracy due to difference in lighting conditions, and to perform probe alignment with higher accuracy. Note that the lighting device 136 is preferably surface-emitting lighting, but is not necessarily limited to surface-emitting lighting.

Note that the fourth embodiment is not only applicable to the second embodiment, but is also applicable to the third embodiment in the same manner.

Fifth Embodiment

Figure 32:
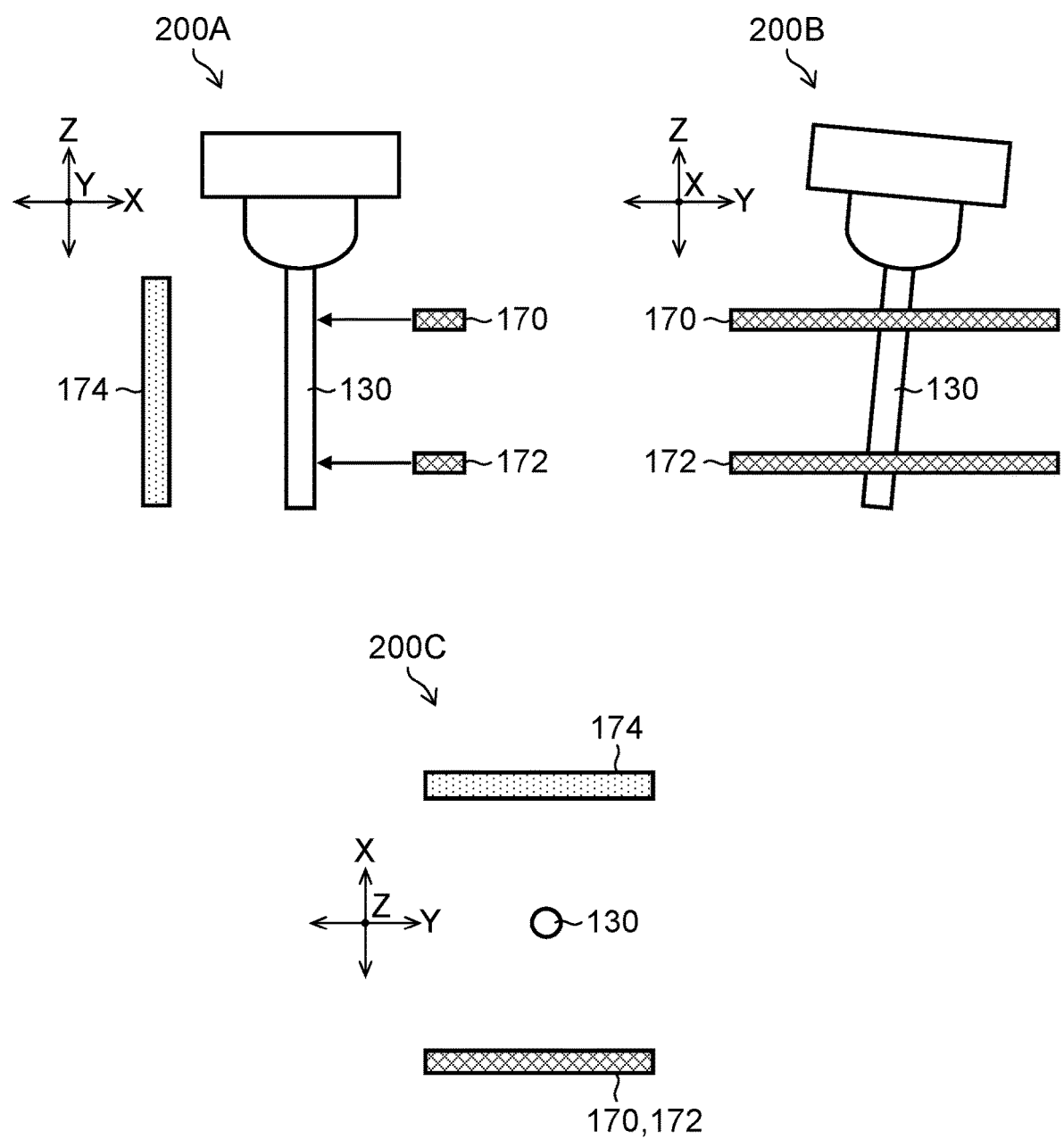
FIG. 32 is a schematic diagram illustrating a configuration of a main part of an inner surface shape measurement device according to a fifth embodiment.

FIG. 32 is a schematic diagram illustrating a configuration of a main part of an inner surface shape measurement device according to a fifth embodiment. In FIG. 32, 200A, 200B, and 200C are respectively a front view of the probe 130 and two line sensor cameras 170 and 172 seen from the Y direction, a side view thereof seen from the X direction, and a bottom view thereof seen from the Z direction.

In each of the above-described embodiments, the area sensor camera is used as the camera 132, but the fifth embodiment differs in that the two line sensor cameras (one-dimensional sensor cameras) 170 and 172 are used.

As illustrated in FIG. 32, the two line sensor cameras 170 and 172 are cameras each imaging a linear (line-shaped) region extending in the horizontal direction (Y direction in FIG. 32) perpendicular to the Z direction. The two line sensor cameras 170 and 172 are parallel to each other and are arranged at predetermined intervals in the Z direction. Further, the two line sensor cameras 170 and 172 are attached to the rotating body 116 (see FIG. 21) via brackets for line sensor cameras (not illustrated), similarly to the camera 132 of the second embodiment.

Further, a lighting device 174 is provided at a position facing the two line sensor cameras 170 and 172. The probe 130 is arranged between the two line sensor cameras 170, 172 and the lighting device 174. The lighting device 174 is attached to the rotating body 116 (see FIG. 21) via a bracket for the lighting device (not illustrated) as in the fourth embodiment. Further, as the lighting device 174, a lighting device capable of surface emission is preferably used, but the lighting device is not necessarily limited to using surface emission.

In the fifth embodiment, while the camera 132 rotates around the rotation axis C integrally with the rotating body 116, the two line sensor cameras 170 and 172 image the probe 130 at three imaging positions at least (preferably four imaging positions spaced apart by 90 degrees in the rotation direction). Then, the images, which are taken by the two line sensor cameras 170 and 172 at the respective imaging positions, are analyzed. This makes it possible to calculate the position of the probe 130 in the imaging regions of the respective line sensor cameras 170 and 172. Then, the images, which are taken by the two line sensor cameras 170 and 172 at the respective imaging positions, are combined, and thereby information, which is equivalent to the image taken by the camera 132 of the second embodiment (probe posture information), can be obtained. This makes it possible to detect a relative deviation between the probe 130 and the rotation axis C. Therefore, probe alignment can be performed with high accuracy as in the second embodiment.

Further, in the fifth embodiment, as in the fourth embodiment, a lighting device 174 is provided at a position facing the two line sensor cameras 170 and 172. Additionally, the probe 130 is arranged between the two line sensor cameras 170, 172 and the lighting device 174. In this configuration, the two line sensor cameras 170 and 172 and the lighting device 174 are configured to be rotatable around the rotation axis C integrally with the rotating body 116. Therefore, the two line sensor cameras 170 and 172 images the probe 130 while the relative positional relationship between the two line sensor cameras 170 and 172 and the lighting device 174 is maintained. This makes it possible to image the probe 130 under the same lighting conditions regardless of the imaging positions of the two line sensor cameras 170 and 172. This makes it possible to prevent decrease in detection accuracy due to difference in lighting conditions, and to perform probe alignment accurately and easily.

Sixth Embodiment

Figure 33:
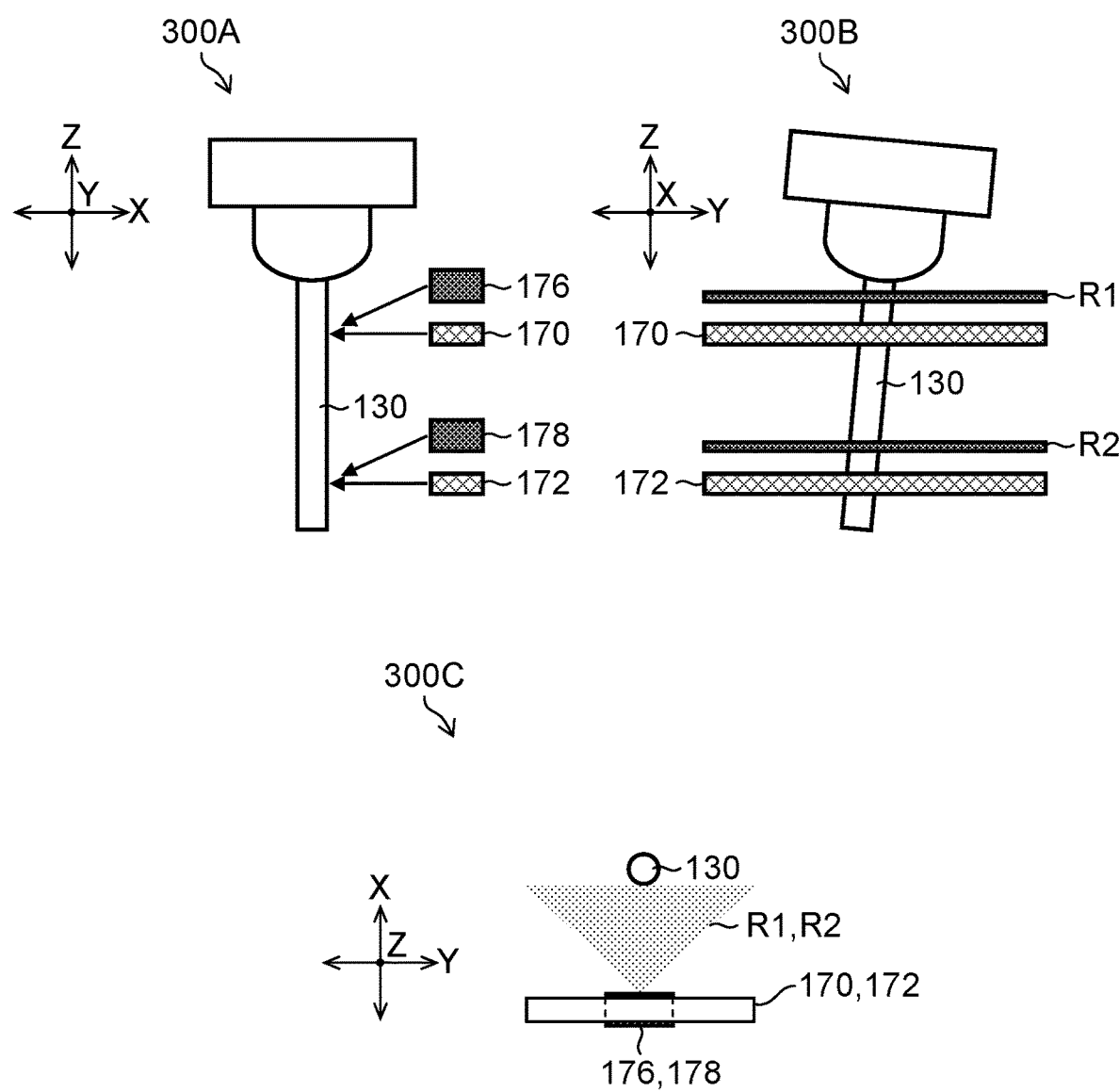
FIG. 33 is a schematic diagram illustrating a configuration of a main part of an inner surface shape measurement device of a sixth embodiment.

FIG. 33 is a schematic diagram illustrating a configuration of a main part of an inner surface shape measurement device according to a sixth embodiment. Here, in FIG. 33, 300A, 300B, and 300C are respectively a front view of the probe 130 and the two line sensor cameras 170 and 172 seen from the Y direction, a side view seen from the X direction, and a bottom view seen from the Z direction.

In the above fifth embodiment, the lighting device 174 (see FIG. 32) is provided at a position facing the two line sensor cameras 170 and 172. The sixth embodiment differs in that line laser light sources 176 and 178 are respectively provided at positions above the line sensor cameras 170 and 172.

The line laser light sources 176 and 178 irradiate the line-shaped imaging regions of the corresponding line sensor cameras 170 and 172 with line lasers (line-shaped laser beams) R1 and R2, respectively. The line laser light sources 176 and 178 are attached to the rotating body 116 (see FIG. 21) together with the line sensor cameras 170 and 172 via the brackets for line sensor cameras (not illustrated), and are rotatable around the rotation axis C integrally with the rotating body 116.

In the sixth embodiment, as in the fifth embodiment, the images, which are taken by the two line sensor cameras 170 and 172 at the respective imaging positions, are combined. Thereby, information, which is equivalent to the image taken by the camera 132 of the second embodiment (probe posture information), can be obtained. This makes it possible to detect a relative deviation between the probe 130 and the rotation axis C. Therefore, as in the second embodiment, the probe alignment can be performed accurately and easily.

Further, in the sixth embodiment, the two line sensor cameras 170 and 172 images the probe 130 while the relative positional relationship between the two line sensor cameras 170 and 172 and the two line laser light sources 176 and 178 is maintained. This makes it possible to image the probe 130 under the same lighting conditions regardless of the imaging positions of the two line sensor cameras 170 and 172.

FIG. 33 illustrates, as an example, the configuration in which the two line laser light sources 176 and 178 are respectively arranged above the line sensor cameras 170 and 172. The positions where the two line laser light sources 176 and 178 are arranged are not particularly limited, as long as the respective positions can be used to irradiate the imaging regions of the line sensor cameras 170 and 172 with the line laser.

Seventh Embodiment

Figure 34:
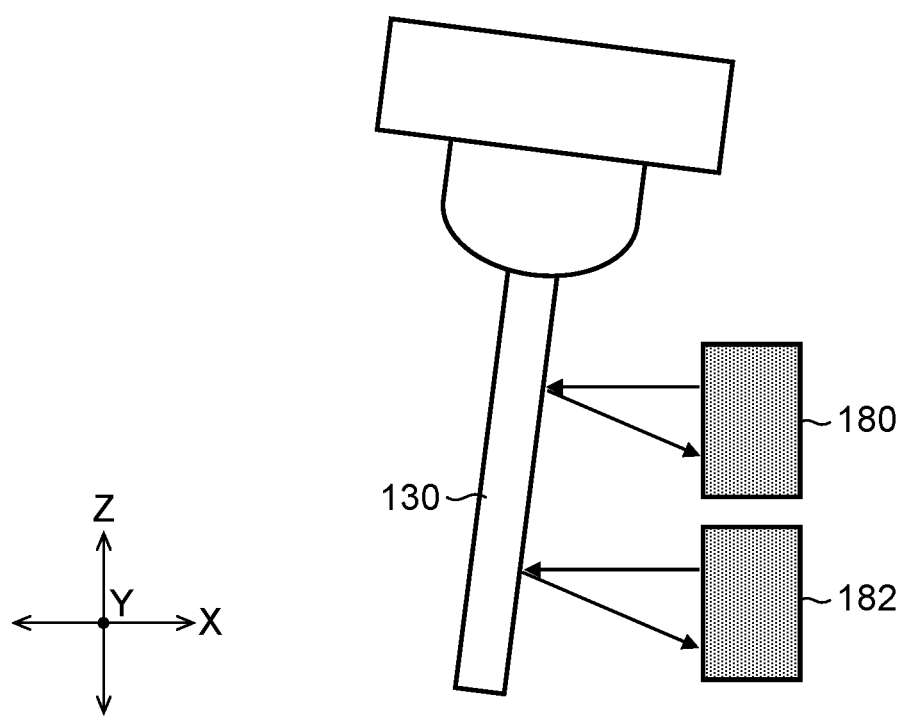
FIG. 34 is a schematic diagram illustrating a configuration of a main part of an inner surface shape measurement device according to a seventh embodiment.

FIG. 34 is a schematic diagram illustrating a configuration of a main part of an inner surface shape measurement device according to a seventh embodiment. Here, FIG. 34 is a front view of the probe 130 and two optical ranging sensors 180 and 182 seen from the Y direction.

Each of the above embodiments uses an imaging device (area sensor camera or line sensor camera) that images the probe 130 from each imaging position, as the acquisition unit to acquire probe posture information for detecting the relative deviation between the probe 130 and the rotation axis C. On the other hand, the seventh embodiment uses two optical ranging sensors 180 and 182 to measure distances using light.

As illustrated in FIG. 34, the two optical ranging sensors 180 and 182 are arranged at predetermined intervals in the Z direction, and are attached to the rotating body 116 via brackets (not illustrated). The two optical ranging sensors 180 and 182 emit light and detect the reflected light to measure the distance. The two optical ranging sensors 180 and 182 are sensors based on the detection principle of triangulation, and can use, for example, a PSD (Position Sensitive Detector) method, a CMOS (Complementary Metal-Oxide Semiconductor) method, and a CCD (Charge Coupled Device) method. Note that the detection principle of the triangulation method is known, so the description thereof is omitted here.

According to the seventh embodiment, while the two optical ranging sensors 180 and 182 rotates around the rotation axis C integrally with the rotating body 116, the two optical ranging sensors 180 and 182 measure the distance to the probe 30 at three measurement positions at least (preferably four measurement positions spaced apart by 90 degrees in the rotation direction). Then, analysis is performed on the relationship between: the distances measured by the two optical ranging sensors 180 and 182 at the respective measurement position; and the respective measurement position. Thereby, information, which is equivalent to the image taken by the camera 132 of the second embodiment (probe posture information), can be obtained. This makes it possible to detect a relative deviation between the probe 130 and the rotation axis C. Therefore, as in the second embodiment, the probe alignment can be performed accurately and easily.

The seventh embodiment illustrates acquisition unit for acquiring the probe posture information for detecting the relative deviation between the probe 130 and the rotation axis C. The acquisition unit, which uses the two optical ranging sensors 180 and 182, is an example other than the means using imaging devices (area sensor cameras or line sensor cameras). However, any acquisition unit is possible as long as it can acquire probe posture information for detecting the relative deviation between the probe 130 and the rotation axis C. Acquisition unit may include length measuring sensors of a laser type, an LED (Light Emitting Diode) type, an ultrasonic type, and an eddy current type, for example.

[Application]

Figure 35:
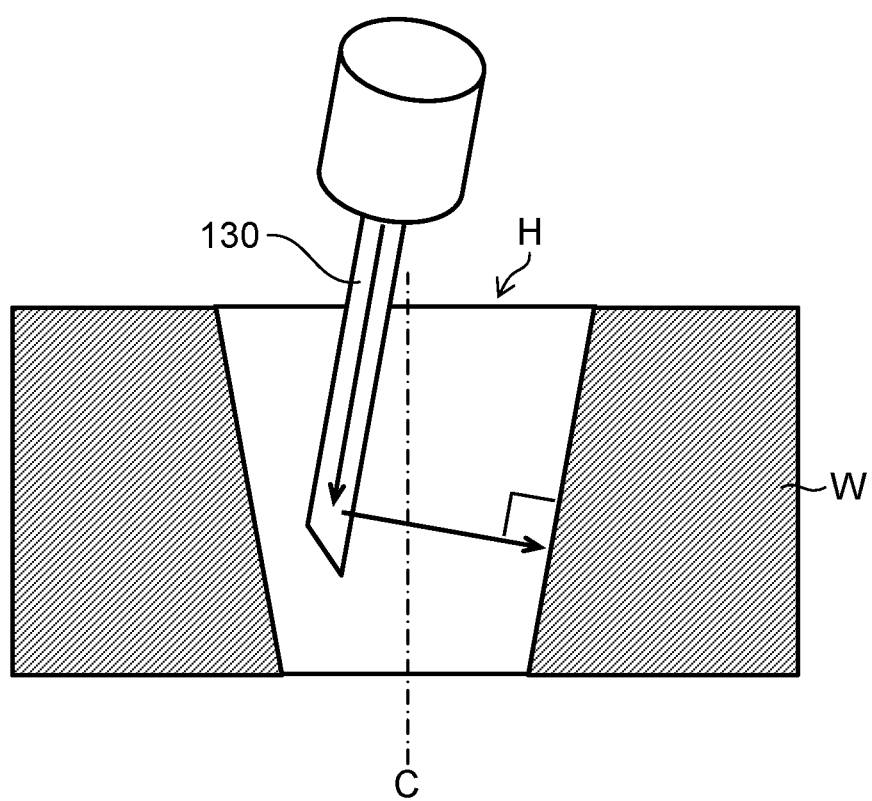
FIG. 35 is a diagram for explaining an application example of the present invention.
Figure 36:
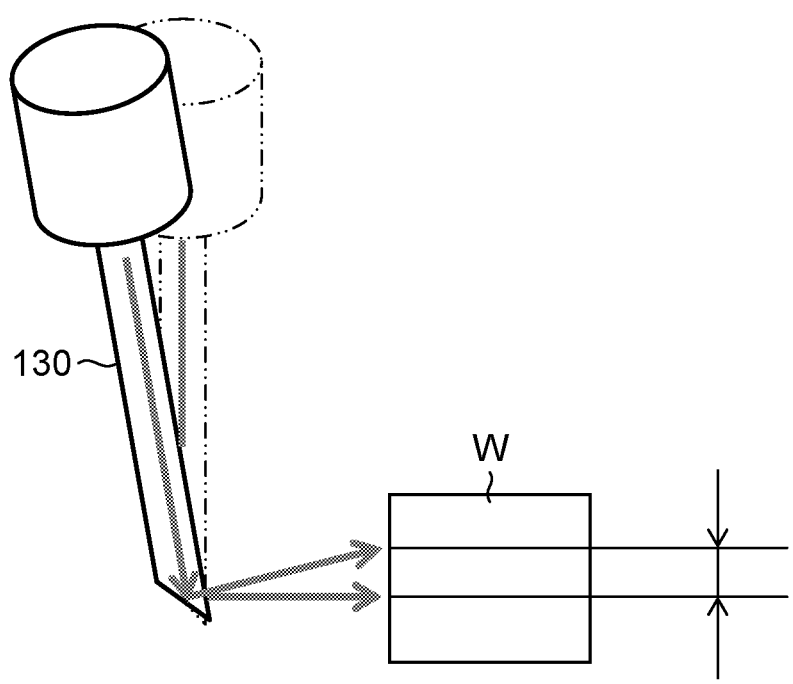
FIG. 36 is a diagram for explaining an application example of the present invention.

The above second to seventh embodiments makes it possible to detect the posture (position and tilt) of the probe 130 with respect to the rotation axis C. Therefore, the embodiments not only allow the probe 130 to be aligned with the rotation axis C, but also allow the probe 130 to be adjusted to be at a position tilted by a required angle. For example, as illustrated in FIG. 35, when measurement is performed on a tapered surface in which the inner surface of the small hole H has a tilt with respect to the rotation axis C, the probe angle (tilt angle of the probe 130) can be set to follow the tilt angle (taper angle) of the tapered surface. As a result, for example, when a non-contact probe is used, the measurement light emitted from the probe 130 is irradiated from the normal direction orthogonal to the tapered surface (surface to be measured), allowing the measurement with higher sensitivity and higher accuracy. Further, as illustrated in FIG. 36, this makes it possible to accurately calculate the difference in positions to be measured due to the posture of the probe 130.

[Magnification Calibration]

The inner surface shape measurement devices 10, 110, 110A, and 110B are each required to perform a work of magnification calibration in which the output signals of the probes 30 and 130 are associated with the actual calibrated displacement amount for the probes 30 and 130.

Figure 37:
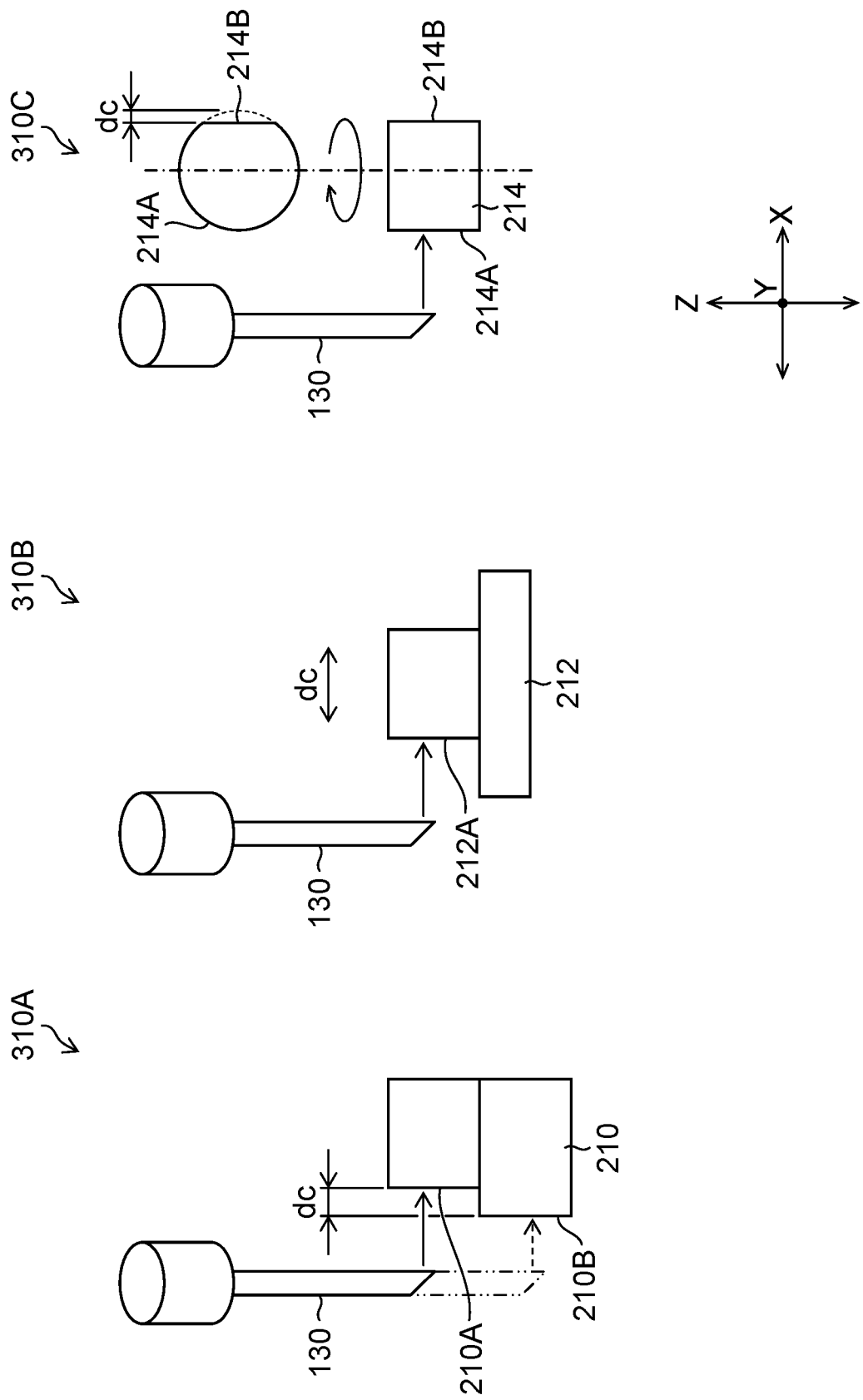
FIG. 37 is a schematic diagram illustrating states of performing magnification calibration of the probe.

FIG. 37 is a schematic diagram illustrating states of magnification calibration of the probe 130. Here, an example is illustrated in which the probe 130 is a non-contact probe.

In FIG. 37, 310A is a diagram illustrating magnification calibration using a block gauge 210. The block gauge 210 includes a measurement surface 210A and a measurement surface 210B having a calibrated step amount $d_c$ at the left end. When the block gauge 210 is used, the measurement surface 210A and the measurement surface 210B are measured using the probe 130. Then, the difference between the output signal in measuring the measurement surface 210A and the output signal in measuring the measurement surface 210B is associated with the calibrated step amount $d_c$, and thereby magnification calibration can be performed.

In FIG. 37, 310B is a diagram illustrating magnification calibration using the screw type magnification calibrator 212. The screw type magnification calibrator 212 is provided with a measurement surface 212A at the left end, and can be moved by a calibrated movement amount $d_c$ in the X direction by rotation of a screw (not illustrated). When the screw type magnification calibrator 212 is used, the measurement surface 210A is measured, using the probe 130, before and after the screw type magnification calibrator 212 is moved. Then, the difference between the output signal measured before the movement and the output signal measured after the movement is associated with the calibrated movement amount $d_c$, and thereby magnification calibration can be performed.

In FIG. 37, 310C is a diagram illustrating magnification calibration using a calibration standard (flick master) 214. A top view of the calibration standard 214 is also illustrated on the 310C. The calibration standard 214 has a substantially cylindrical shape. The outer peripheral surface (side surface) thereof includes a cylindrical surface 214A and a flat surface 214B, which is a cut-out surface in which a part of the cylindrical surface 214A is cut off with a calibrated cutting amount $d_c$. When the calibration standard 214 is used, the calibration standard 214 is rotated around the axis of the cylindrical surface 214A, and the cylindrical surface 214A and the flat surface 214B are measured using the probe 130. Then, the difference between the output signal in measuring the cylindrical surface 214A and the output signal in measuring the flat surface 214B is associated with the calibrated cutting amount $d_c$, and thereby magnification calibration can be performed.

Figure 38:
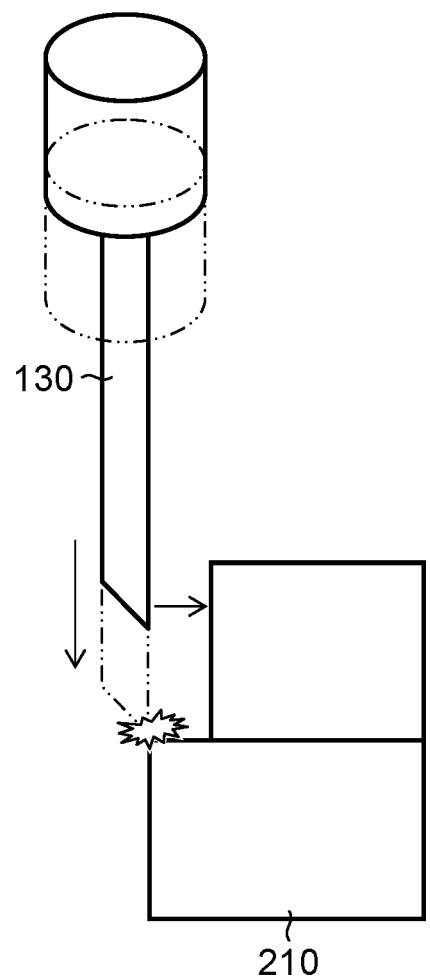
FIG. 38 is a diagram illustrating a collision between a probe and a block gauge.

Here, when the magnification calibration of the probe 130 is performed, the probe 130 may collide with the calibration instrument, so that the probe 130 may be damaged. FIG. 38 is a diagram illustrating a collision between the probe 130 and the block gauge 210, as an example.

Note that, when a contact probe is used as the probe 130, it can be brought into contact with a calibration instrument using a function called auto-stop.

FIG. 39 is a schematic diagram illustrating states of an auto-stop function of the probe 130. In FIG. 39, 320A is a diagram illustrating a state in which the contact probe 130 moves in the X direction to approach the block gauge 210. Further, in FIG. 39, 320B is a diagram illustrating a state in which the probe 130 comes into contact with the block gauge 210 and stops moving in the X direction. In this way, the auto-stop function that detects the contact of the probe 130 and stops the probe 130 at a predetermined pushing amount prevents the probe 130 from being damaged and enables the measurement of the block gauge 210.

On the other hand, a non-contact probe such as an optical interference method can detect a relative displacement, but cannot detect an absolute value of a distance. The relative position between the probe 130 and the calibration instrument cannot be detected from only the displacement information of the probe 130, and a collision may occur.

Eighth Embodiment

<Configuration of Inner Surface Shape Measurement Device>

Figure 40:
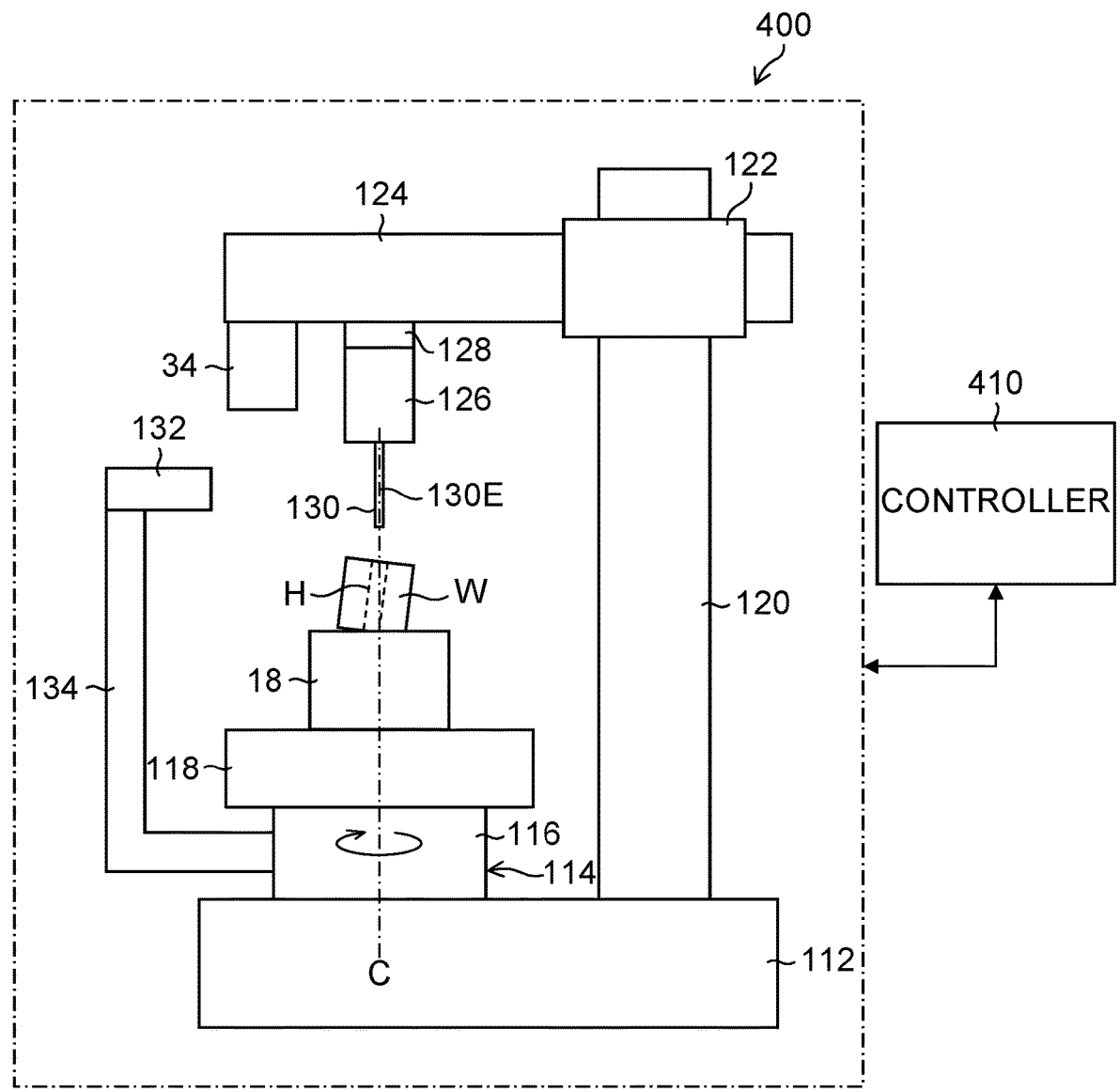
FIG. 40 is a schematic diagram illustrating an overall configuration of an inner surface shape measurement device of an eighth embodiment.

FIG. 40 is a schematic diagram illustrating an overall configuration of an inner surface shape measurement device 400 according to an eighth embodiment. Note that the parts common to the inner surface shape measurement devices 10 and 110 are designated by the common reference numerals, and detailed description thereof is omitted. The inner surface shape measurement device 400 is a device for measuring the inner surface shape of the small hole H formed in the workpiece W, and is a device in which the magnification calibration is automated. Note that the inner surface shape measurement device 400 is a device capable of performing the alignment of the workpiece W described in the first embodiment and the probe alignment described in the second embodiment. Further, instead of the second embodiment, the probe alignment of the third embodiment to the seventh embodiment may be performed.

As illustrated in FIG. 40, the inner surface shape measurement device 400 includes a workpiece installation jig 18, a camera 34, a main body base 112, a high-accuracy rotation mechanism 114, a linear-and-tilting-motion stage 118, a column 120, a carriage 122, an arm 124, a displacement detector 126, probe linear-and-tilting-motion mechanism 128, a camera 132, and controller 410.

The workpiece installation jig 18 is placed on the linear-and-tilting-motion stage 118, and the workpiece W is installed on the workpiece installation jig 18. In other words, the workpiece W is fixed to the linear-and-tilting-motion stage 118 via the workpiece installation jig 18. The linear-and-tilting-motion stage 118 is an example of "workpiece adjustment unit capable of adjusting a posture of a work".

The arm 124 supports the displacement detector 126 and the camera 34 side by side in the X direction. The arm 124 supports the camera 34 with the optical axis $A_C$ (see FIG. 12) of the camera 34 parallel to and downward in the Z direction.

The camera 34 is an area sensor camera such as a CCD camera, and includes a coaxial epi-illumination optical system 35 (see FIG. 41) and a magnifying optical system (microscope, not illustrated) that magnifies and projects an object to be observed. The camera 34 is an example of a "first camera".

The carriage 122 and the arm 124 are an example of "probe moving unit". The probe linear-and-tilting-motion mechanism 128 is an example of "probe adjustment unit".

The probe 130 is a non-contact probe that detects the inner surface shape without contacting the inner surface of the small hole H of the workpiece W. The probe 130 has a cylindrical shape with a radius of $r_4$ and has a central axis 130E. The radius $r_4$ is an example of a "second radius".

The camera 132 is an example of "probe posture information acquisition unit" and a "second camera".

<Controller>

Figure 41:
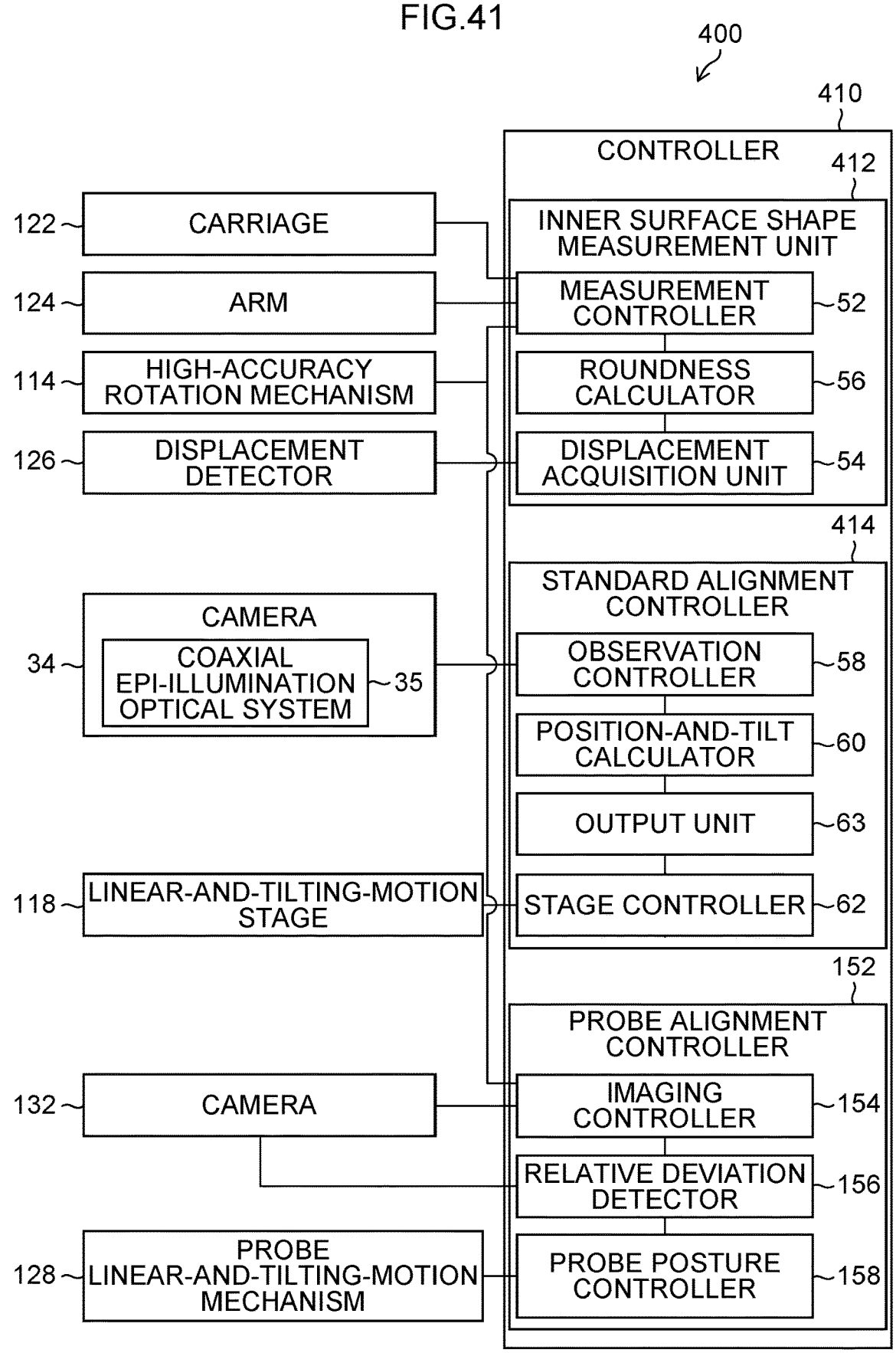
FIG. 41 is a block diagram illustrating a configuration of a controller.

The controller 410 controls the operation of each part of the inner surface shape measurement device 400. FIG. 41 is a block diagram illustrating the configuration of the controller 410. Note that the parts common to the block diagrams illustrated in FIGS. 3 and 22 are designated by the common reference numerals, and detailed description thereof is be omitted.

As illustrated in FIG. 41, the controller 410 includes an inner surface shape measurement unit 412, a standard alignment controller 414, and a probe alignment controller 152.

The inner surface shape measurement unit 412 includes a measurement controller 52, a displacement acquisition unit 54, and a roundness calculator 56. The measurement controller 52 is an example of "standard rotation controller", "probe movement controller", and "standard detection controller".

The standard alignment controller 414 includes an observation controller 58, a position-and-tilt calculator 60, a stage controller 62, and an output unit 63. The position-and-tilt calculator 60 is an example of "standard posture information acquisition unit". The stage controller 62 is an example of "standard posture controller".

Further, the probe alignment controller 152 includes an imaging controller 154, a relative deviation detector 156, and a probe posture controller 158. The probe posture controller 158 is an example of "probe posture controller".

<Calibration Standard>

Figure 42:
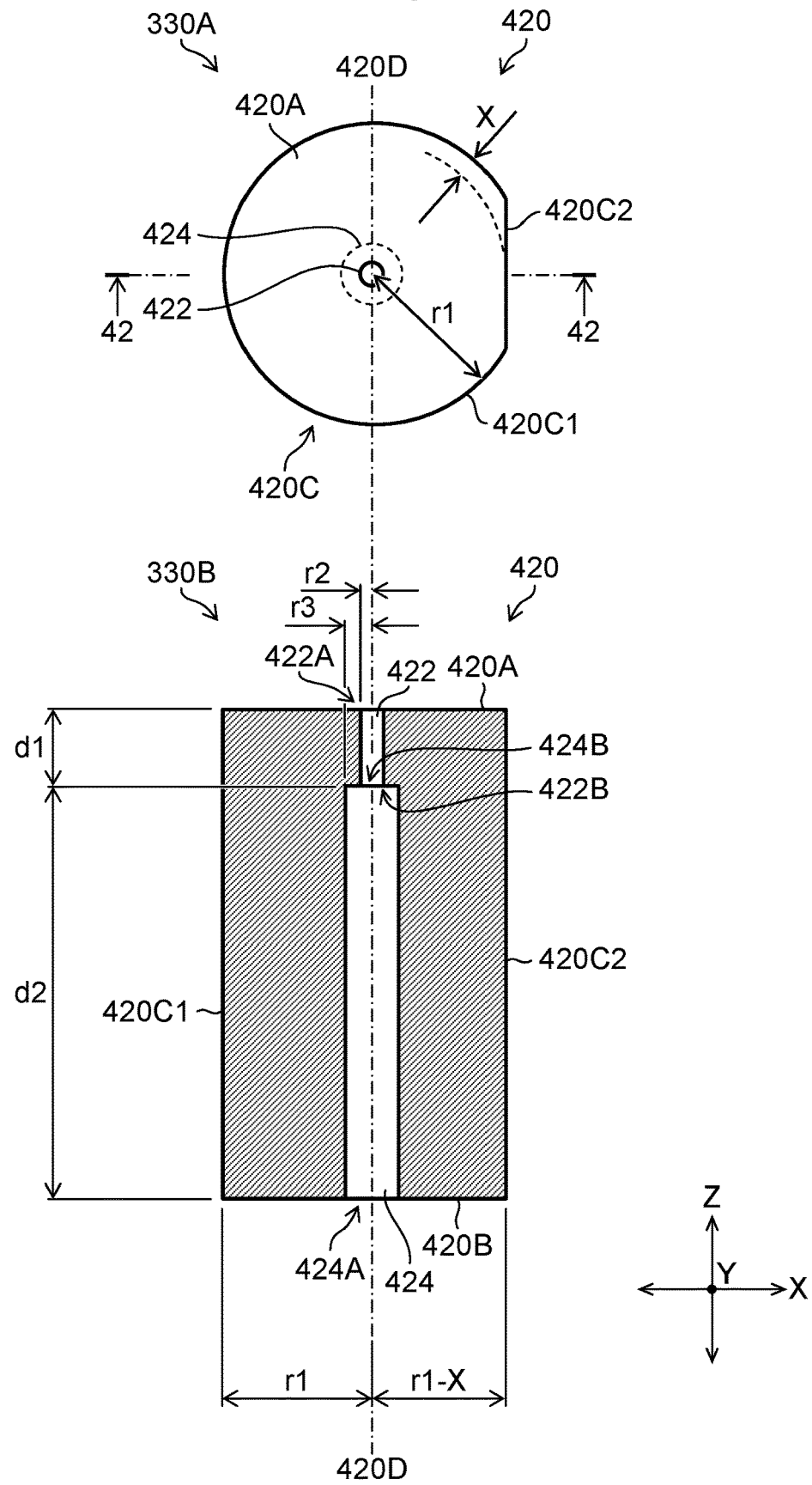
FIG. 42 is a diagram illustrating a calibration standard (flick master) to be used in the present embodiment.

FIG. 42 is a diagram illustrating a calibration standard (flick master) 420 used in the present embodiment. Note that, In FIG. 42, 330A is a top view of the calibration standard 420 seen from the Z direction, and 330B is a 42-42 cross-sectional view of 330A.

As illustrated in FIG. 42, the calibration standard 420 has a substantially cylindrical shape including an upper surface 420A, a lower surface 420B, and a side surface 420C.

The side surface 420C is composed of a cylindrical surface 420C1 having a radius $r_1$ and a flat surface 420C2 continuous with the cylindrical surface 420C1. The radius $r_1$ is an example of a "first radius". The flat surface 420C2 is a flat surface cut off from the cylindrical surface 420C1 with a cutting amount x, and is a flat surface parallel to the axis 420D of the cylindrical surface 420C1. The upper surface 420A and the lower surface 420B are flat surfaces orthogonal to the axis 420D of the cylindrical surface 420C1. The upper surface 420A is an example of a "first end surface", and the lower surface 420B is an example of a "second end surface".

The calibration standard 420 has an image alignment small hole 422 and a light guide hole 424 that are coaxial with the shaft 420D. The image alignment small hole 422 has a radius of $r_2$, and a length of $d_1$ from the opening 422A of the upper surface 420A of the calibration standard 420 to the end 422B thereof toward the lower surface 420B thereof. The image alignment small hole 422 is an example of a "calibration small hole".

Further, the light guide hole 424 has a radius of $r_3$ and has a length $d_2$ from the opening 424A of the lower surface 420B of the calibration standard 420 to the end 424B thereof toward the upper surface 420A thereof. The image alignment small hole 422 and the light guide hole 424 communicate with each other at the end 422B and the end 424B. The radius and length of the image alignment small hole 422 and the light guide hole 424 have a relationship of $r_2 < r_3$ and $d_1 < d_2$.

<Magnification Calibration>

When the inner surface shape measurement device 400 measures the inner surface shape (roundness, etc.) of the small hole H of the workpiece W, the magnification calibration of the probe 130 is required to have been performed. Therefore, in the present embodiment, the magnification calibration of the probe 130 is performed before the measurement of the inner surface shape of the small hole H of the workpiece W is started.

Figure 43:
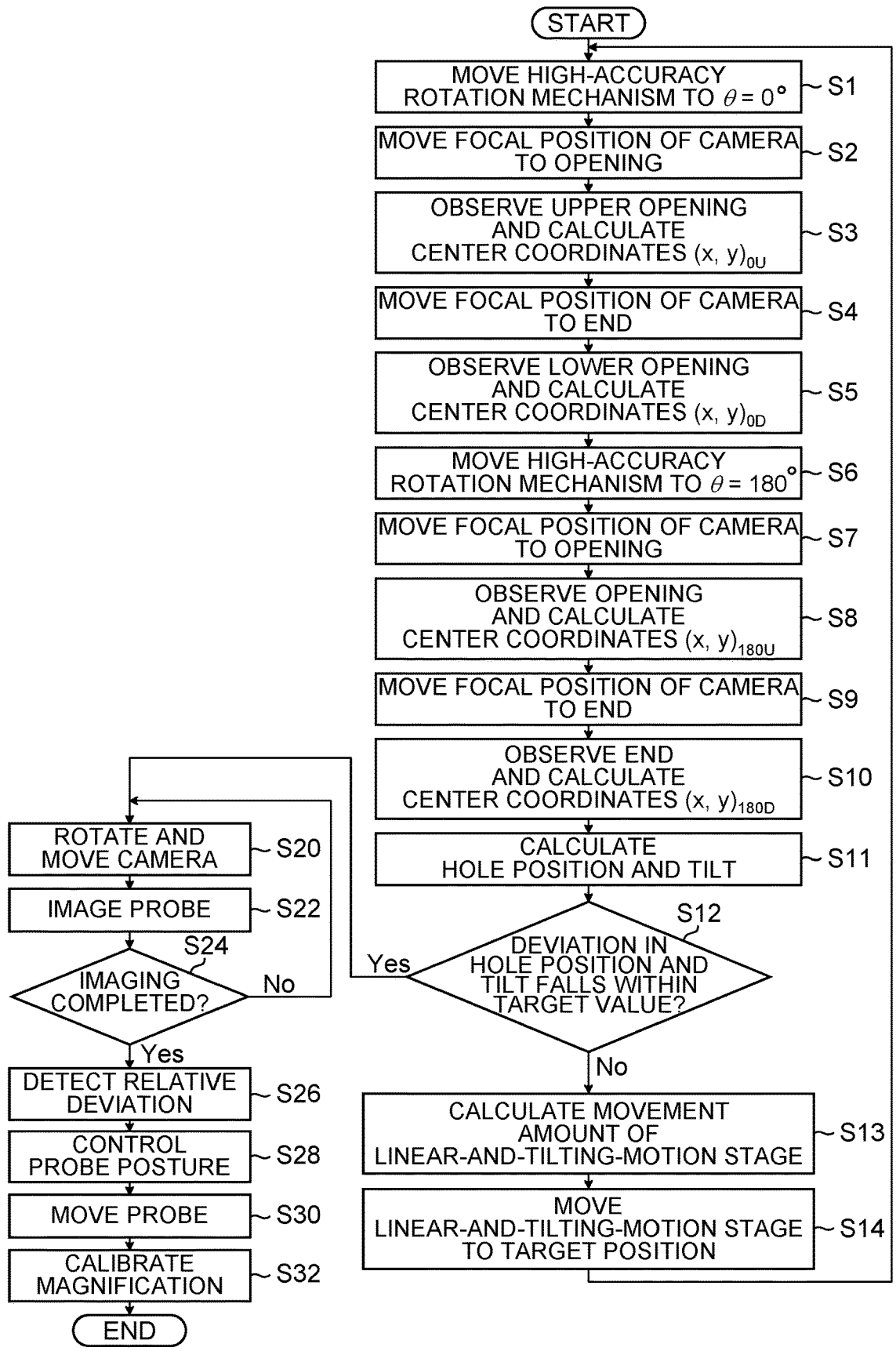
FIG. 43 is a flowchart illustrating an example of processing of a magnification calibration method.

FIG. 43 is a flowchart illustrating an example of processing of the magnification calibration method. Note that the parts common to the flowcharts illustrated in FIGS. 4 and 23 are designated by the common reference numerals, and detailed description thereof will be omitted. The magnification calibration method is implemented by the CPU of the controller 410 reading the magnification calibration program from the ROM and executing it. The magnification calibration program may be provided to the inner surface shape measurement device 400 by communication.

The magnification calibration method includes: a standard alignment step of aligning the axis 420D of the calibration standard 420 with the rotation axis C using the image of the image alignment small hole 422 of the calibration standard 420; and a probe alignment step of aligning the probe 130 with the rotation axis C. The standard alignment step corresponds to steps S1 to S14, and the probe alignment step corresponds to steps S20 to S28.

First, a user installs the calibration standard 420 on the workpiece installation jig 18. The user installs the calibration standard 420 with the upper surface 420A provided with the image alignment small hole 422 facing the camera 34 side.

When the calibration standard 420 is installed, the measurement controller 52 drives a motor (not illustrated) according to the result detected by the encoder (not illustrated) of the high-accuracy rotation mechanism 114, and moves (rotates) the high-accuracy rotation mechanism 114 to the position where the rotation angle is the set angle θ=0° (step S1, an example of "standard rotation step").

Next, the measurement controller 52 drives the motor (not illustrated) of the arm 124 to move the camera 34 upward in the Z direction of the calibration standard 420. Further, the measurement controller 52 drives the motor (not illustrated) of the carriage 122 to move the camera 34 in the Z direction, and aligns the focal position of the camera 34 with the opening 422A of the image alignment small hole 422 (step S2).

Next, the observation controller 58 observes (images) the opening 422A of the image alignment small hole 422 using the camera 34. Subsequently, the position-and-tilt calculator 60 calculates the center coordinates $(x, y)_{0U}$ of the opening 422A of the image alignment small hole 422 at the set angle θ=0° (step S3).

Further, the measurement controller 52 drives the motor (not illustrated) of the carriage 122 to move the camera 34 in the Z direction, and aligns the focal position of the camera 34 with the end 422B whose position in the Z direction is different from that of the opening 422A of the image alignment small hole 422 (step S4).

Then, as in the case of the opening 422A, the observation controller 58 observes the end 422B of the image alignment small hole 422 using the camera 34, and the position-and-tilt calculator 60 calculates the center coordinates $(x, y)_{0D}$ of the end 422B of the image alignment small hole 422 at the set angle θ=0° (step S5).

When the processing at the position of the set angle θ=0° is completed, the processing at the position of the set angle θ=180° is performed in the same manner. In other words, the measurement controller 52 drives the motor (not illustrated) according to the result detected by the encoder (not illustrated) of the high-accuracy rotation mechanism 114, and moves the high-accuracy rotation mechanism 114 to a position where the rotation angle is the set angle θ=180° (step S6, an example of the "standard rotation step"). Further, the measurement controller 52 drives the motor (not illustrated) of the carriage 122 to move the camera 34 in the Z direction, and aligns the focal position of the camera 34 with the opening 422A of the image alignment small hole 422 (step S7).

Next, the observation controller 58 observes the opening 422A of the image alignment small hole 422 using the camera 34. Subsequently, the position-and-tilt calculator 60 calculates the center coordinates $(x, y)_{180U}$ of the opening 422A of the image alignment small hole 422 at the set angle θ=180° (step S8).

Further, the measurement controller 52 drives the motor (not illustrated) of the carriage 122 to move the camera 34 in the Z direction, and aligns the focal position of the camera 34 with the end 422B of the image alignment small hole 422 (step S9).

Subsequently, the observation controller 58 observes the end 422B of the image alignment small hole 422 using the camera 34. Further, the position-and-tilt calculator 60 calculates the center coordinates $(x, y)_{180D}$ of the end 422B of the image alignment small hole 422 at the set angle θ=180° (step S10).

After these processes completes, the position-and-tilt calculator 60 calculates the position and tilt of the axis 420D of the image alignment small hole 422 of the calibration standard 420 with respect to the rotation axis C of the high-accuracy rotation mechanism 114 (step S11, an example of "standard posture information acquisition step"). Here, the position-and-tilt calculator 60 calculates the position and tilt of the axis 420D with respect to the rotation axis C from: the center coordinates $(x, y)_{0U}$ of the opening 422A of the image alignment small hole 422 and the center coordinates $(x, y)_{0D}$ of the end 422B thereof at the set angle θ=0°; and the center coordinates $(x, y)_{180U}$ of the opening 422A of the image alignment small hole 422 and the center coordinates $(x, y)_{180D}$ of the end 422B thereof at the set angle θ=180°.

Subsequently, the position-and-tilt calculator 60 determines whether the deviation, between: the position and tilt of the axis 420D of the image alignment small hole 422 of the calibration standard 420; and the rotation axis C, is within a target value (step S12).

When the deviation is determined to be larger than the target value (No in step S12), the position-and-tilt calculator 60 calculates the movement amount of the linear-and-tilting-motion stage 118 (step S13). The calculation of the movement amount may be performed in the same manner as in the first embodiment. The output unit 63 acquires the movement amount of the linear-and-tilting-motion stage 118 calculated by the position-and-tilt calculator 60 and outputs it to the stage controller 62.

Further, the stage controller 62 drives the motor (not illustrated) of the linear-and-tilting-motion stage 118 based on the movement amount calculated in step S13, and moves the linear-and-tilting-motion stage 118 to the target position (step S14, an example of a "standard posture control step"). After that, the process proceeds to step S1, and the controller 50 performs the same process. The inner surface shape measurement device 400 repeats this process, and thereby makes the deviation between the axis 420D of the image alignment small hole 422 of the calibration standard 420 and the rotation axis C of the high-accuracy rotation mechanism 114 within the target value.

Contrarily, when the deviation is determined to be smaller than the target value (Yes in step S12), the standard alignment step ends and the process proceeds to the probe alignment step.

When the probe alignment is started, the imaging controller 154 first controls the high-accuracy rotation mechanism 114 to rotate and move the camera 132 around the rotation axis C integrally with the rotating body 116 (step S20).

Then, when the camera 132 moves to a predetermined imaging position on the rotation trajectory K of the camera 132 centered on the rotation axis C, the camera 132 images the probe 130 at this imaging position (step S22).

When the determination is made on whether the imaging is completed at all the imaging positions (step S24), and when the determination is that the imaging in which the probe 130 is imaged by the camera 132 has completed at all the imaging positions (Yes in step S24), the relative deviation detector 156 detects the relative deviation between the probe 130 and the rotation axis C, which is the probe posture information, based on the images taken by the camera 132 at the respective imaging positions (step S26, an example of a "probe posture information acquisition step"). The relative deviation detected here is an example of "probe posture information indicating a relative position of a probe axis with respect to a rotation axis".

The probe posture controller 158 controls the probe linear-and-tilting-motion mechanism 128 based on the result detected by the relative deviation detector 156, and causes the central axis 130E of the probe 130 to be aligned with the rotation axis C (step S28, an example of a "probe posture control step").

Figure 44:
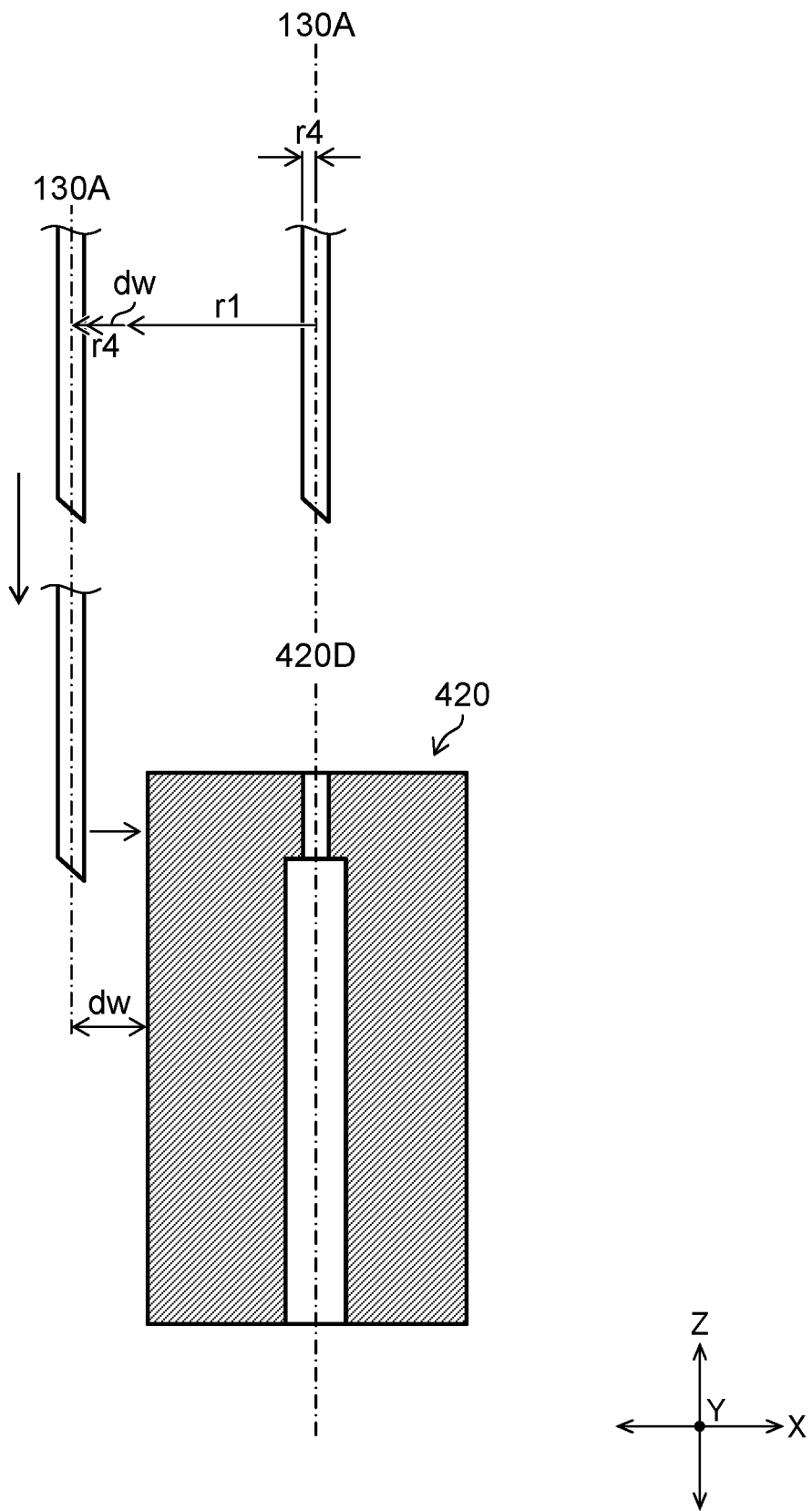
FIG. 44 is a diagram illustrating movement of the probe.

When the probe 130 is aligned with the rotation axis C in step S28, the measurement controller 52 moves the probe 130 to the calibration measurement position based on the radius of the cylindrical surface 420C1 of the calibration standard 420 (step S30, an example of a "probe moving step"). In other words, the measurement controller 52 drives the motor (not illustrated) of the arm 124 to move the probe 130 in the −X direction, and then drives the motor (not illustrated) of the carriage 22 to move the probe 130 in the −Z direction. FIG. 44 is a diagram illustrating the movement of the probe 130 in step S30. The movement amount $A_X$ of the probe 130 in the −X direction is expressed by the following Expression 5:

$$A_X = r_1 + r_4 + d_w \quad \text{(Expression 5)},$$

where: $d_w$ is a working distance of the probe 130 (the distance between the probe 130 and the calibration standard 420 at the time of measurement). In other words, the measurement controller 52 moves the probe 130 to a position away from the rotation axis C in the −X direction by the sum of the radius of the cylindrical surface 420C1 of the calibration standard 420, the radius of the probe 130, and the working distance of the probe 130.

Returning to FIG. 43, finally, the displacement acquisition unit 54 measures the cylindrical surface 420C1 and the flat surface 420C2 of the calibration standard 420 detected by the displacement detector 28, and performs magnification calibration (step S32, an example of a "standard detection step"). This is the end of this flowchart.

According to the present embodiment, the calibration standard 420 is aligned with the rotation axis C, and the probe 130 is aligned with the rotation axis C. This makes it possible to calculate the movement amount when the probe 130 is moved to the calibration measurement position. Therefore, there is no risk of damaging the probe 130 due to contact between the probe 130 and the calibration standard 420, and magnification calibration can be performed without depending on the skill of the operator.

Further, according to the present embodiment, all the steps are composed of image processing and movement of a specified amount. This does not require visual confirmation and the like, and can make calibration work automated. Therefore, the magnification calibration of the probe can be easily and reliably performed without depending on the skill of the operator.

Figure 45:
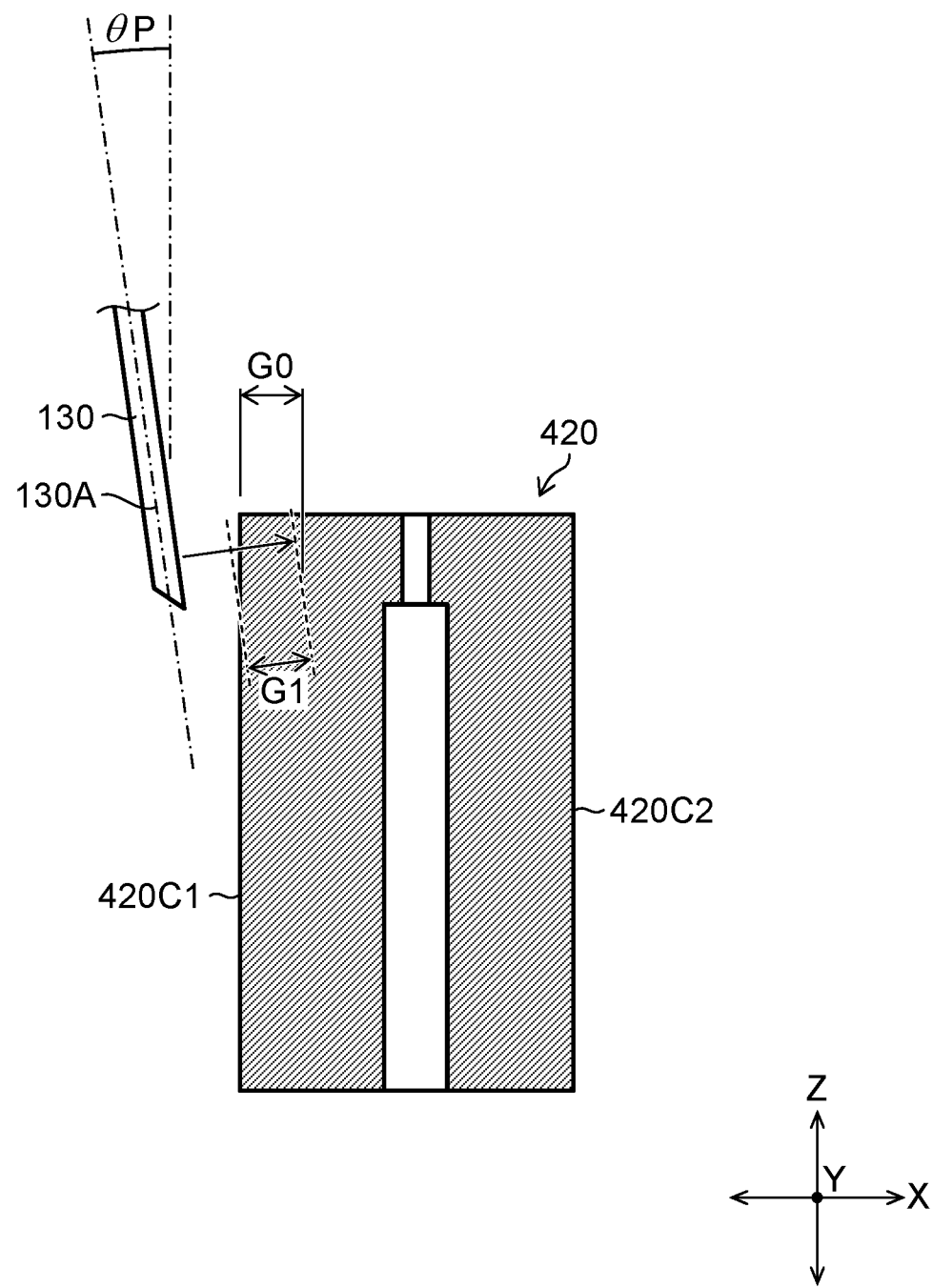
FIG. 45 is a diagram illustrating a magnification calibration error when there is an error between the probe and the rotation axis.

FIG. 45 is a diagram illustrating a magnification calibration error when there is an error by an angle $θ_P$ between the probe 130 and the rotation axis C (the Z direction). When the calibrated cutting amount of the cylindrical surface 420C1 to the flat surface 420C2 is represented by $G_0$ and the measured cutting amount is represented by $G_1$, the magnification calibration error is expressed by the following Expression 6:

$$\text{Magnification calibration error} = G_0/G_1 = \cos θ_P \quad \text{(Expression 6).}$$

According to the present embodiment, the probe 130 is translated after the probe 130 is aligned with the rotation axis C, so that probe 130 and the rotation axis C can be maintained in parallel. This makes it possible to reduce the magnification calibration error caused by the installation angle of the probe 130 represented by the Expression 6. Therefore, the magnification calibration of the probe can be easily and reliably performed without depending on the skill of the operator.

<Modification>

The probe alignment step is not limited to the example of using the camera 132, and other methods may be used as long as the probe 130 can be aligned with the rotation axis C.

Further, the eighth embodiment describes the case in which the non-contact probe 130 is used, but the magnification calibration of the present invention can also be applied to the contact probe 130. When the contact probe 130 is applied, in step S30 of FIG. 43, the measurement controller 52 drives the motor (not illustrated) of the arm 124 to move the probe 130 in the −X direction with a movement amount $A_X$ represented by Expression 5, then drives the motor (not illustrated) of the carriage 22 to move the probe 130 in the −Z direction, and further drives the motor (not illustrated) of the arm 124 to move the probe 130 in the +X direction with a movement amount $d_w$. As a result, the probe 130 is in contact with the cylindrical surface 420C1 of the calibration standard 420, and the process can properly proceed to step S32 in FIG. 43. Therefore, the magnification calibration of the probe can be easily and reliably performed without depending on the skill of the operator.

Further, a light guide mechanism may be provided in which a light source is arranged on the lower surface 420B side of the calibration standard 420, and the observation light is incident on the opening 424A of the light guide hole 424.

Figure 46:
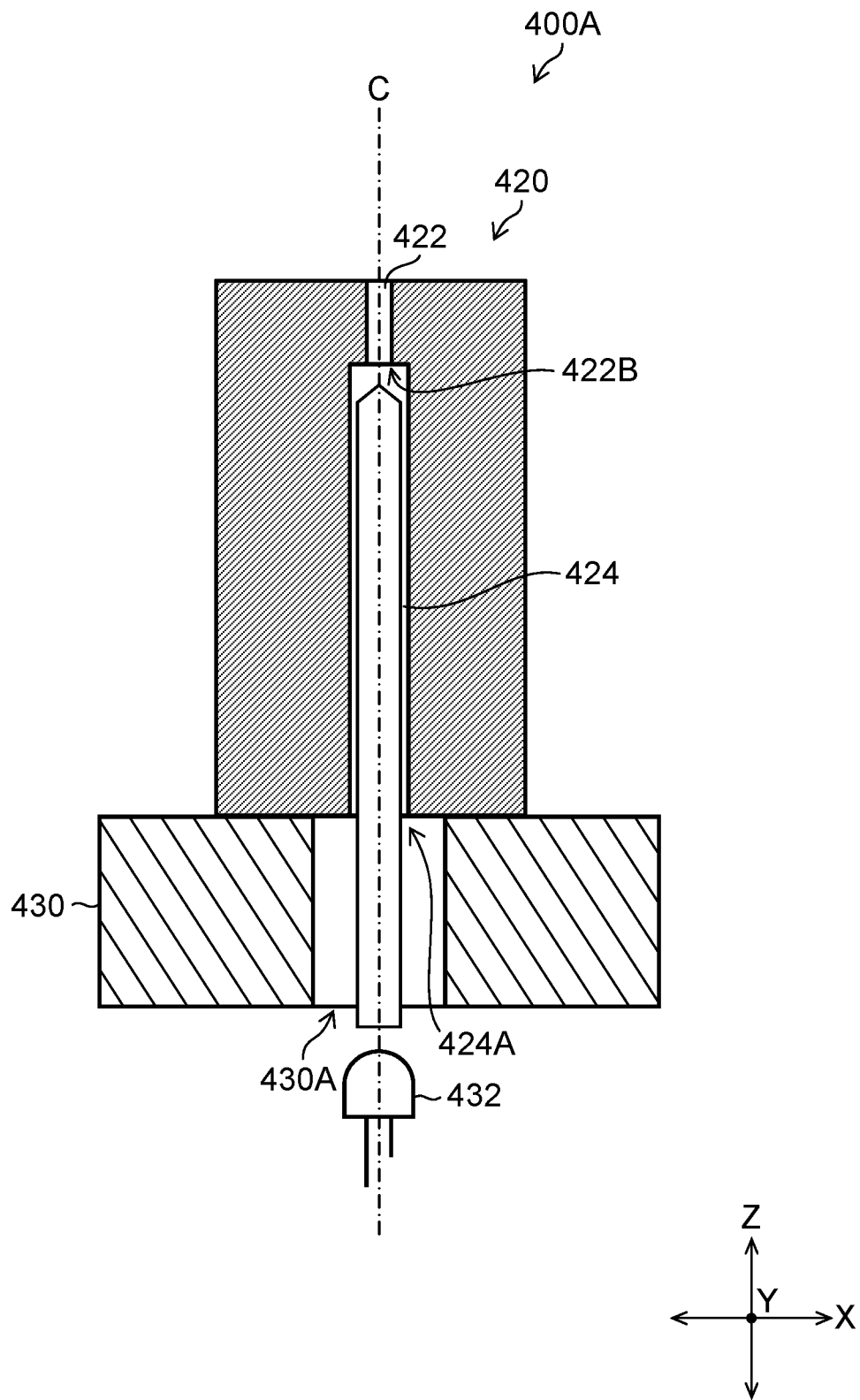
FIG. 46 is a schematic diagram of an inner surface shape measurement device having a light guide mechanism.

FIG. 46 is a schematic diagram illustrating a part of the inner surface shape measurement device 400A having a light guide mechanism. In the example illustrated in FIG. 46, the inner surface shape measurement device 400A includes a base 430 and a light source 432. The base 430 is arranged on the upper surface of the workpiece installation jig 18 (see FIG. 40), and the workpiece W is installed on the upper surface of the base 430. The base 430 has a through hole 430A having a diameter larger than that of the light guide hole 424. The light source 432 is provided on the workpiece installation jig 18 and emits the observation light incident on the opening 424A of the light guide hole 424 via the through hole 430A.

The light source 432 preferably has a low coherence to reduce speckle noise. As the light source 432, for example, an LED or an ASE light source can be used. It is more preferable that the center of the light source 432 is aligned with the rotation axis C of the high-accuracy rotation mechanism 114. The base 430 may be configured as a workpiece installation jig 18 including a light source 432.

According to the inner surface shape measurement device 400A, the observation light emitted from the light source 432 is incident on the light guide hole 424 from the lower surface 420B side of the calibration standard 420 (an example of an "incident step"). As a result, the end 422B of the image alignment small hole 422 can be easily observed using the camera 34, so that the calibration standard 420 can be aligned with high accuracy.

Note that a reflector (not illustrated) may be arranged in place of the light source 432, so that the reflector may reflects the irradiation light entering the image alignment small hole 422 and passing through the light guide hole 424, to cause the light to re-enter the image alignment small hole 422 from the end 422B thereof. Such a configuration also facilitates observing the end 422B of the image alignment small hole 422 using the camera 34, to allow the calibration standard 420 to be aligned with high accuracy.

Further, it is preferable that the measurement for magnification calibration be performed in the region in the range, in the Z direction, where the calibration standard 420 has been observed in the standard alignment step.

Figure 47:
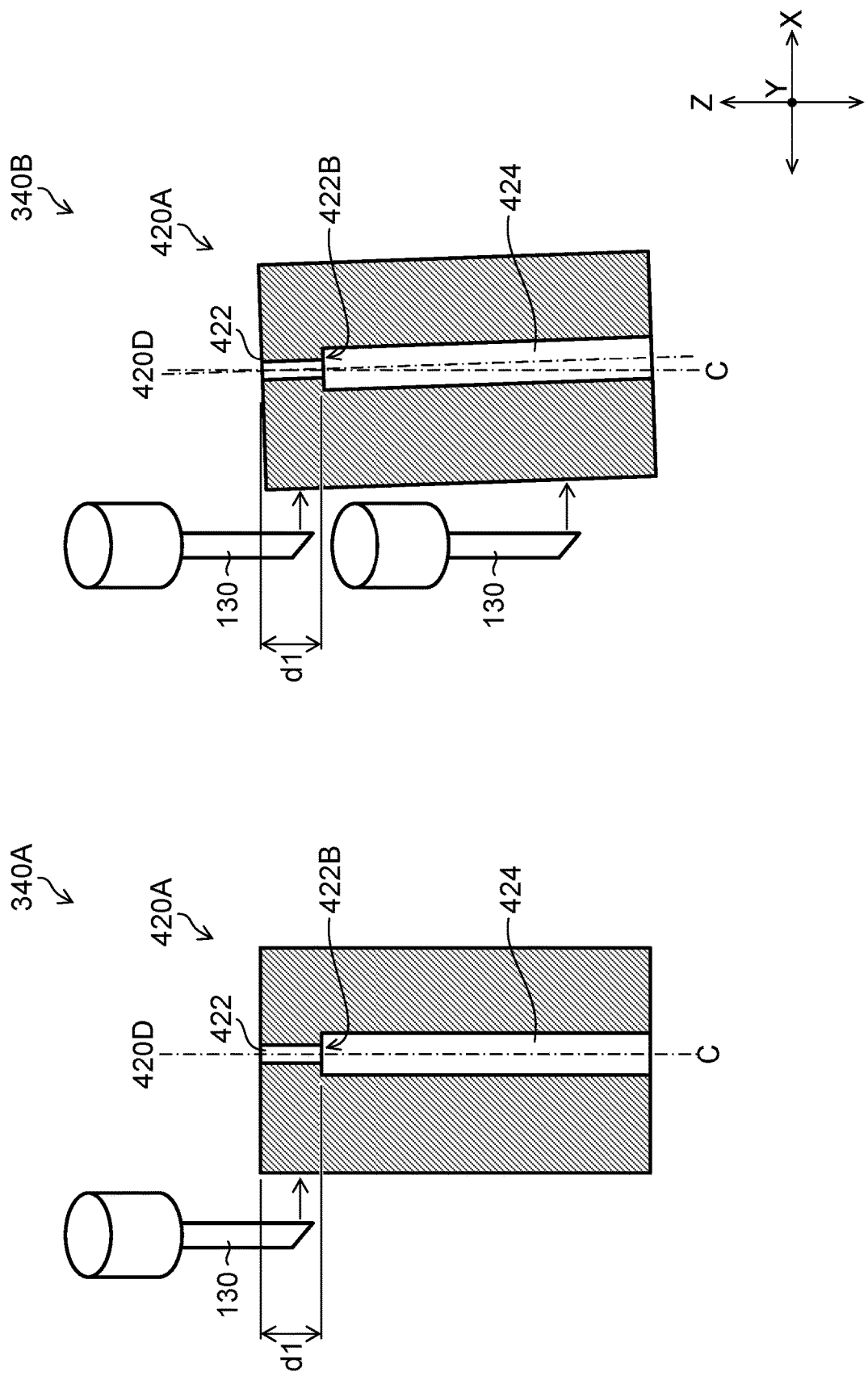
FIG. 47 is a diagram illustrating measurement of a calibration standard at a time of magnification calibration.

FIG. 47 is a diagram illustrating the measurement of the calibration standard 420 at the time of magnification calibration. In FIG. 47, 340A illustrates a case in which the axis 420D of the calibration standard 420 is aligned with the rotation axis C, and 340B illustrates a case in which there is a deviation between the rotation axis C and the axis 420D of the calibration standard 420.

The image alignment small hole 422 has a length $d_1$ from the upper surface 420A of the calibration standard 420. In other words, in the standard alignment step, alignment is performed using a range having a length $d_1$ from the upper surface 420A of the calibration standard 420.

Therefore, it is preferable that the measurement of the calibration standard 420 at the time of magnification calibration in this case is performed in the range having a length $d_1$ from the upper surface 420A of the calibration standard 420. In the region with a length of $d_1$ ranging from the upper surface 420A, the concentricity can be increased between the cylindrical surface 420C1 and the rotation axis C. This makes it possible to perform magnification calibration with higher accuracy. Therefore, the magnification calibration of the probe can be easily and reliably performed without depending on the skill of the operator.

On the other hand, when the measurement is performed using the region beyond the range having a length of $d_1$ from the upper surface 420A, the concentricity between the cylindrical surface 420C1 and the rotation axis deteriorates. Consequently, the influence of the deviation between the axis 420D of the calibration standard 420 and the rotation axis C increases.

Figure 48:
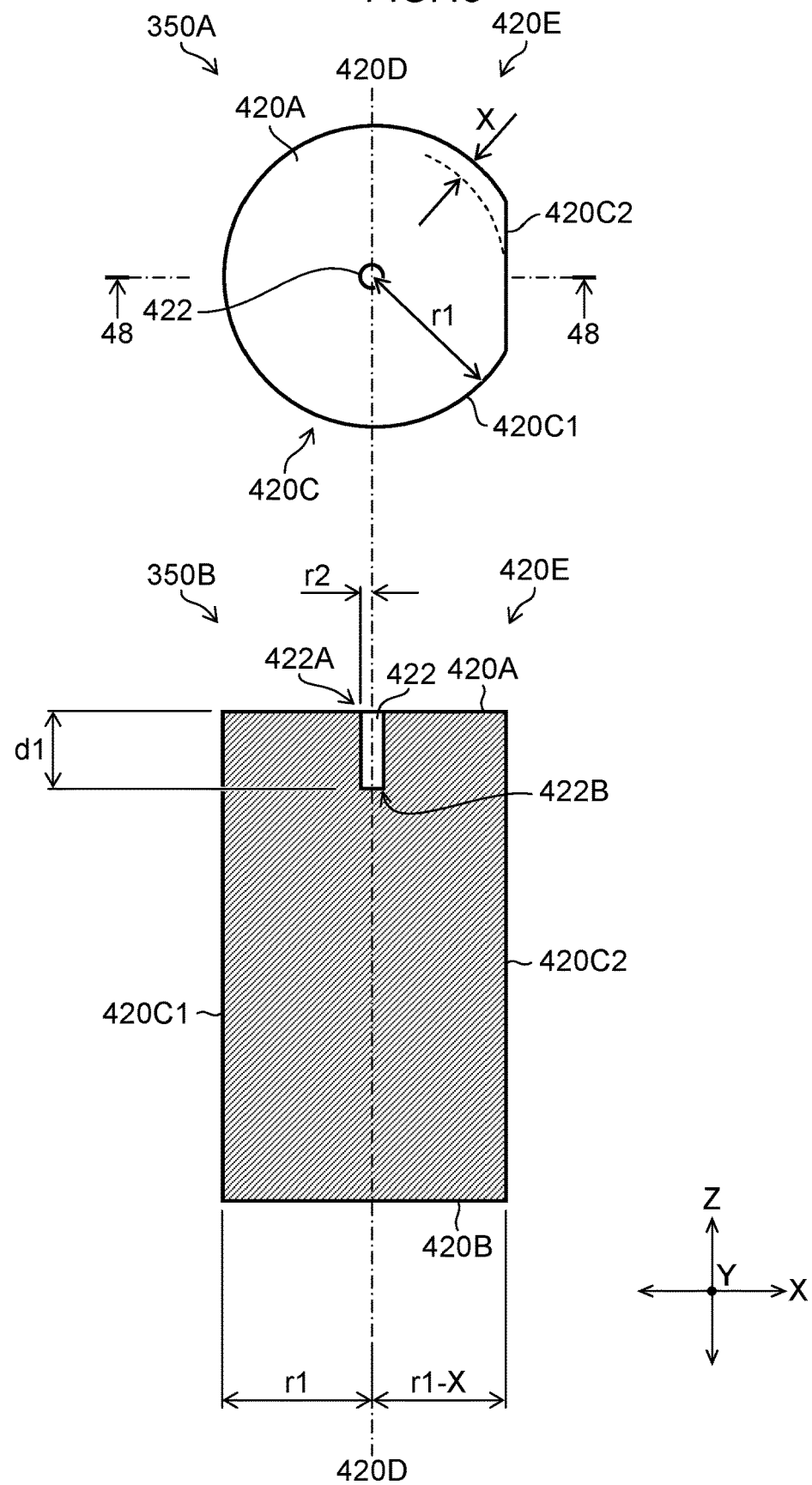
FIG. 48 is a diagram illustrating a calibration standard with an image alignment small hole being a blind hole.

Further, the calibration standard 420 may have an image alignment small hole 422 that is a blind hole having a bottom wall. FIG. 48 is a diagram illustrating a calibration standard 420E in which an image alignment small hole 422 is a blind hole. In FIG. 48, 350A is a top view of the calibration standard 420E seen from the Z direction, and 350B is a cross-sectional view of 48-48 in 350A.

The outer shape of the calibration standard 420E is the same as that of the calibration standard 420. Further, the calibration standard 420E is the same as the calibration standard 420 in that the image alignment small hole 422 thereof is coaxial with the axis 420D and has a radius of $r_2$. Here, the image alignment small hole 422 is a blind hole having a length $d_1$ from the opening 422A of the upper surface 420A of the calibration standard 420 to the end 422B toward the lower surface 420B. The end 422B is a flat surface orthogonal to the axis 420D.

In this way, if the image alignment small hole 422 is a blind hole, the end 422B can be observed using the coaxial epi-illumination optical system 35 of the camera 34. Therefore, the magnification calibration of the probe can be easily and reliably performed without depending on the skill of the operator. Note that it is more preferable that, like the calibration standard 420, the image alignment small hole 422 be made as a through hole with the light guide hole 424 and the observation light is incident thereon from the lower surface 420B side. This is because the end 422B can be observed more clearly.

Although the embodiments of the present invention are described above, the present invention is not limited to the above examples, and it goes without saying that various improvements and modifications may be made without departing from the gist of the present invention.

REFERENCE SIGNS LIST

10 . . . inner surface shape measurement device, 12 . . . main body base, 14 . . . rotating body, 16 . . . linear-and-tilting-motion stage, 18 . . . workpiece installation jig, 20 . . . column (post), 20 . . . column, 22 . . . carriage, 24 . . . arm, 28 . . . displacement detector, 30 . . . probe, 34 . . . camera, 35 . . . coaxial epi-illumination optical system, 38 . . . optical fiber, 40 . . . reflective mirror, 42 . . . contactor, 50 . . . controller, 52 . . . measurement controller, 54 . . . displacement acquisition unit, 56 . . . roundness calculator, 58 . . . observation controller, 60 . . . position-and-tilt calculator, 62 . . . stage controller, 63 . . . output unit, 70 . . . light source, 72 . . . reflector, 80 . . . sponge-like reflector, 82 . . . clay-like reflector, 84 . . . scatterer, 100A . . . first image, 100B . . . second image, 100C . . . third image, 100D . . . fourth image, 102A . . . first composite image, 102B . . . second composite image, 110 . . . inner surface shape measurement device, 110A . . . inner surface shape measurement device, 110B . . . inner surface shape measurement device, 112 . . . main body base, 114 . . . high-accuracy rotation mechanism, 116 . . . rotating body, 118 . . . linear-and-tilting-motion stage, 120 . . . column, 122 . . . carriage, 124 . . . arm, 126 . . . displacement detector, 128 . . . probe linear-and-tilting-motion mechanism, 130 . . . probe, 130A . . . probe, 130B . . . probe, 130C . . . probe, 130D . . . probe, 130E . . . central axis, 132 . . . camera, 134 . . . camera bracket, 136 . . . lighting device, 138 . . . bracket for the lighting device, 150 . . . controller, 152 . . . probe alignment controller, 154 . . . imaging controller, 156 . . . detector, 158 . . . probe posture controller, 170 . . . line sensor camera, 172 . . . line sensor camera, 174 . . . lighting device, 176 . . . line laser light source, 178 . . . line laser light source, 180 . . . optical ranging sensor, 182 . . . optical ranging sensor, 210 . . . block gauge, 210A . . . measurement surface, 210B . . . measurement surface, 212 . . . screw type magnification calibrator, 212A . . . measurement surface, 214 . . . calibration standard, 214A . . . cylindrical surface, 214B . . . flat surface, 400 . . . inner surface shape measurement device, 400A . . . inner surface shape measurement device, 410 . . . controller, 412 . . . inner surface shape measurement unit, 414 . . . standard alignment controller, 420 . . . calibration standard, 420A . . . upper surface, 420B . . . lower surface, 420C . . . side surface, 420C1 . . . cylindrical surface, 420C2 . . . flat surface, 420D . . . axis, 420E . . . calibration standard, 422 . . . image alignment small hole, 422A . . . opening, 422B . . . end, 424 . . . light guide hole, 424A . . . opening, 424B . . . end, 430 . . . base, 430A . . . through hole, 432 . . . light source, $A_C$ . . . optical axis, $A_H$ . . . central axis, $A_R$ . . . rotation axis, C . . . rotation axis, C1 . . . probe central axis, C2 . . . probe central axis, C3 . . . probe central axis, C4 . . . probe central axis, $F_D$ . . . focal plane, $F_U$ focal plane, H . . . small hole, $I_{0D}$ . . . image, $I_{0U}$ . . . image, $I_{180D}$ . . . image, $I_{180U}$ . . . image, K rotation trajectory, $O_D$ . . . lower opening, $O_U$ . . . upper opening, P . . . optical path, R imaging range, S1 to S34 . . . respective steps of processing of the magnification calibration method, and W . . . workpiece

What is claimed is:

1. An inner surface shape measurement device for measuring an inner surface shape of a hole formed in a workpiece, the device comprising:
   a workpiece rotation unit configured to rotate the workpiece around a rotation axis;
   a probe, having an elongated shape that can be inserted into the hole, the probe configured to detect the inner surface shape of the hole;
   an adjustment unit capable of adjusting posture of the probe;
   an acquisition unit including a camera, the acquisition unit configured to be rotatable integrally with the workpiece rotation unit, the acquisition unit configured to acquire images of the probe imaged by the camera, as probe posture information, at least three circumferential positions on a rotation trajectory centered on the rotation axis when the camera is rotated around the rotation axis; and
   a controller configured to adjust the posture of the probe, using the adjustment unit, based on the probe posture information acquired by the acquisition unit.

2. The inner surface shape measurement device according to claim 1, wherein
   the controller adjusts posture of the probe using the adjustment unit so as to eliminate a relative deviation between the probe and the rotation axis.

3. The inner surface shape measurement device according to claim 1, wherein
   the acquisition unit acquires the probe posture information from four circumferential positions spaced apart from each other by 90 degrees on the rotation trajectory.

4. The inner surface shape measurement device according to claim 1, further comprising a surface-emitting lighting unit, the surface-emitting lighting unit being configured to be rotatable integrally with the workpiece rotation unit and being capable of surface emission from a position facing the camera toward the probe.

5. The inner surface shape measurement device according to claim 1, wherein the hole has an inner diameter of 500 µm or less.

6. An alignment method for an inner surface shape measurement device for measuring an inner surface shape of a hole formed in a workpiece, the inner surface shape measurement device including: a workpiece rotation unit configured to rotate the workpiece around a rotation axis; and a probe, having an elongated shape that can be inserted into the hole, the probe configured to detect the inner surface shape of the hole, the alignment method comprising:
   an acquisition step of acquiring images of the probe imaged by a camera, as probe posture information, at at least three circumferential positions on a rotation trajectory centered on the rotation axis when the camera that is rotatable integrally with the workpiece rotation unit is rotated around the rotation axis; and
   an adjustment step of adjusting posture of the probe, based on the probe posture information acquired in the acquisition step, so as to eliminate a relative deviation between the probe and the rotation axis.

7. The alignment method for the inner surface shape measurement device according to claim 6, wherein,
   in the acquisition step, the probe posture information is acquired from four circumferential positions spaced apart from each other by 90 degrees on the rotation trajectory.

8. The alignment method according to claim 6, wherein the hole has an inner diameter of 500 µm or less.

9. A magnification calibration method for an inner surface shape measurement device for measuring an inner surface shape of a hole formed in a workpiece, the inner surface shape measurement device including: a workpiece rotation unit configured to rotate the workpiece around a rotation axis parallel to a first direction; and a probe, having an elongated shape that can be inserted into the hole, the probe configured to detect the inner surface shape of the hole, the magnification calibration method comprising:
- a standard rotation step of rotating a calibration standard around the rotation axis using the workpiece rotation unit, the calibration standard including a cylindrical surface with a first radius on a side surface, the calibration standard including a flat surface parallel to an axis of the cylindrical surface, the calibration standard including a calibration hole on a first end surface orthogonal to the axis of the cylindrical surface, the flat surface having a distance from the axis of the cylindrical surface, the distance being smaller than the first radius, the calibration hole being coaxial with the cylindrical surface;
- a standard posture information acquisition step of observing at least one position of the calibration hole of the calibration standard, using a first camera, and acquiring posture information of the calibration standard, the calibration standard having been rotated in the standard rotation step, the first camera having an optical axis parallel to the first direction;
- a standard posture control step of aligning an axis of the calibration hole with the rotation axis, based on the posture information of the calibration standard acquired in the standard posture information acquisition step;
- a probe posture information acquisition step of acquiring probe posture information indicating a relative position of an axis of the probe with respect to the rotation axis;
- a probe posture control step of aligning the axis of the probe with the rotation axis, based on the probe posture information acquired in the probe posture information acquisition step;
- a probe moving step of moving the probe based on the first radius, in a second direction orthogonal to the first direction, the axis of the probe having been aligned with the rotation axis in the probe posture control step; and
- a standard detection step of rotating the calibration standard using the workpiece rotation unit, and detecting the cylindrical surface and the flat surface using the probe moved in the probe moving step, the axis of the hole of the calibration standard having been aligned with the rotation axis in the standard posture control step.

10. The magnification calibration method for the inner surface shape measurement device according to claim 9, wherein
the probe is a non-contact probe having a second radius in the second direction, and
in the probe moving step, the probe is moved from a position of the rotation axis to a position apart in the second direction by a sum of the first radius, the second radius, and a working distance of the probe.

11. The magnification calibration method for the inner surface shape measurement device according to claim 9, wherein
the standard posture information acquisition step includes:
an observation control step of observing, using the first camera, a first position and a second position of the calibration hole of the calibration standard at a first rotation angle of the workpiece rotation unit, and the first position and the second position of the calibration hole of the calibration standard at a second rotation angle of the workpiece rotation unit, the second position being a position different from the first position in the first direction, the second rotation angle being an angle different from the first rotation angle;
a position-and-tilt calculation step of calculating a position and a tilt of the calibration hole from coordinates of the observed first position and the observed second position of the calibration hole at the first rotation angle of the workpiece rotation unit, and from coordinates of the observed first position and the observed second position of the calibration hole at the second rotation angle of the workpiece rotation unit; and
an output step of outputting hole information as posture information of the calibration standard, the hole information including the calculated position and tilt of the hole.

12. The magnification calibration method for the inner surface shape measurement device according to claim 11, wherein
the standard detection step detects positions on the side surface between the first position and the second position in the first direction, using the probe.

13. The magnification calibration method for the inner surface shape measurement device according to claim 9, wherein
a probe posture information acquisition unit that is rotatable integrally with the workpiece rotation unit acquires the probe posture information from at least three circumferential positions on a rotation trajectory centered on the rotation axis, in the probe posture information acquisition step.

14. The magnification calibration method for the inner surface shape measurement device according to claim 13, wherein,
in the probe posture information acquisition step, the probe posture information is acquired from four circumferential positions spaced apart from each other by 90 degrees on the rotation trajectory.

15. The magnification calibration method for the inner surface shape measurement device according to claim 13, wherein
the probe posture information acquisition unit includes a second camera configured to image the probe.

16. The magnification calibration method for an inner surface shape measurement device according to claim 9, wherein
the calibration standard includes a light guide hole in a second end surface, the light guide hole being coaxial with the cylindrical surface and communicating with the calibration hole, the second end surface being different from the first end surface and being orthogonal to the axis of the cylindrical surface.

17. The magnification calibration method for an inner surface shape measurement device according to claim 16, wherein
the standard posture control step includes an incident step of causing light emitted from a light source to be incident on the light guide hole.

18. The magnification calibration method according to claim 9, wherein the hole has an inner diameter of 500 µm or less.

19. An inner surface shape measurement device for measuring an inner surface shape of a hole formed in a workpiece, the device comprising:
- a workpiece rotation unit configured to rotate a workpiece, in which a hole is formed, around a rotation axis parallel to a first direction;
- a workpiece adjustment unit capable of adjusting posture of the workpiece;
- a probe, having an elongated shape that can be inserted into the hole, the probe configured to detect the inner surface shape of the hole;
- a probe adjustment unit capable of adjusting posture of the probe;
- a probe moving unit capable of moving the probe in the first direction and a second direction orthogonal to the first direction;
- a standard rotation controller configured to rotate a calibration standard around the rotation axis using the workpiece rotation unit, the calibration standard including a cylindrical surface with a first radius on a side surface, the calibration standard including a flat surface parallel to an axis of the cylindrical surface, the calibration standard including a calibration hole on a first end surface orthogonal to the axis of the cylindrical surface, the flat surface having a distance from the axis of the cylindrical surface, the distance being smaller than the first radius, the calibration hole being coaxial with the cylindrical surface;
- a standard posture information acquisition unit configured to observe at least one position of the calibration hole of the rotated calibration standard, using a first camera, and acquire posture information of the calibration standard, the first camera having an optical axis parallel to the first direction;
- a standard posture controller configured to align an axis of the calibration hole with the rotation axis using the workpiece adjustment unit, based on the acquired posture information of the calibration standard;
- a probe posture information acquisition unit configured to acquire probe posture information indicating a relative position of an axis of the probe with respect to the rotation axis;
- a probe posture controller configured to align the axis of the probe with the rotation axis using the probe adjustment unit, based on the acquired probe posture information;
- a probe movement controller configured to move the probe based on the first radius, in the second direction, using the probe moving unit, the axis of the probe having been aligned with the rotation axis; and
- a standard detection controller configured to rotate the calibration standard using the workpiece rotation unit, and detect the cylindrical surface and the flat surface using the moved probe, the axis of the hole of the calibration standard having been aligned with the rotation axis.

20. The inner surface shape measurement device according to claim 19, wherein the hole has an inner diameter of 500 μm or less.

* * * * *